Oct. 16, 1934.   R. S. CONDON ET AL   1,976,984
GEAR CUTTING MACHINE
Filed March 2, 1931   23 Sheets-Sheet 1

INVENTORS
Robert S. Condon
Albert P. Schauseil
their ATTORNEY

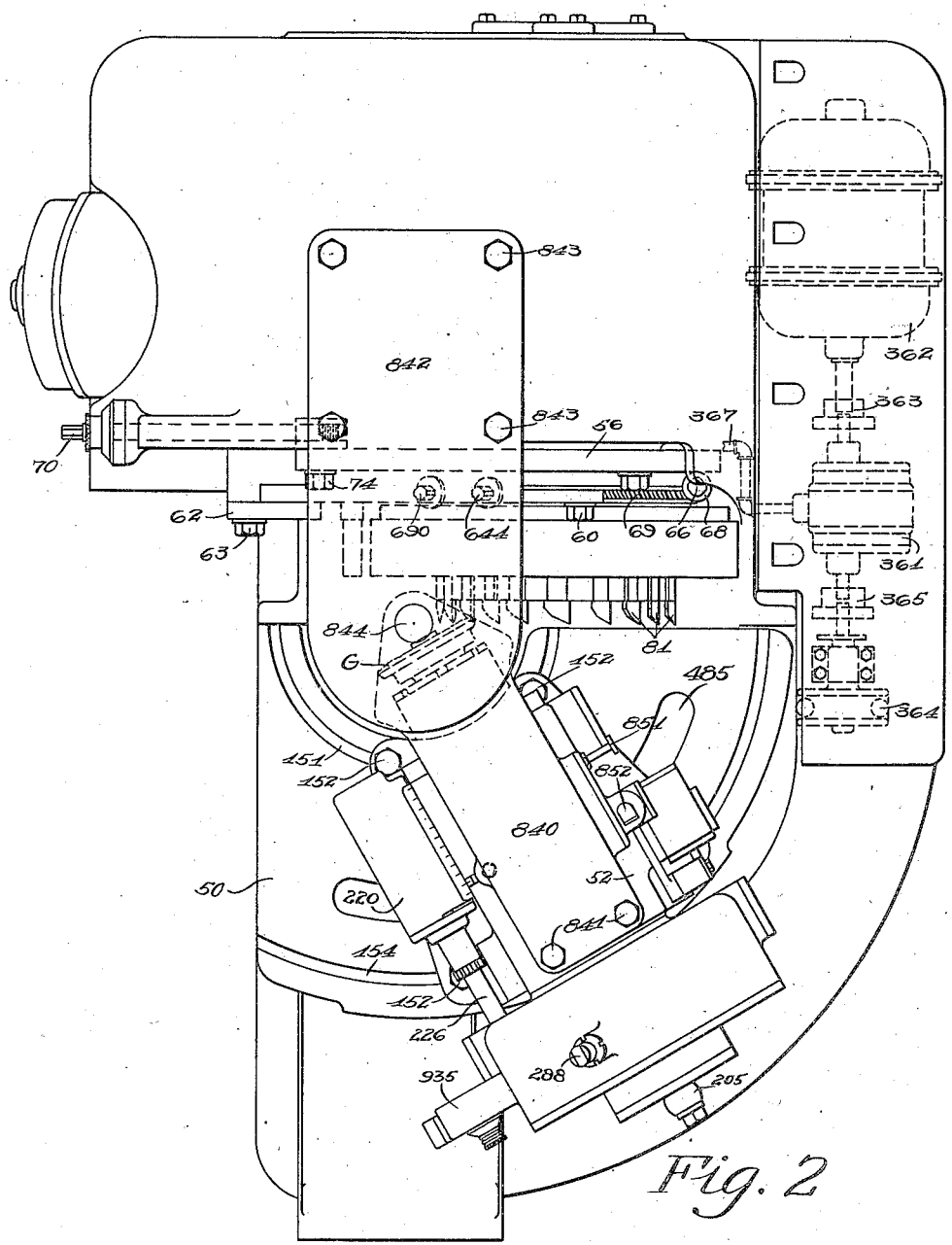

Oct. 16, 1934.   R. S. CONDON ET AL   1,976,984
GEAR CUTTING MACHINE
Filed March 2, 1931   23 Sheets-Sheet 5

INVENTORS
Robert S. Condon
BY Albert P. Schauseil
their ATTORNEY

Oct. 16, 1934.    R. S. CONDON ET AL    1,976,984
GEAR CUTTING MACHINE
Filed March 2, 1931    23 Sheets-Sheet 6
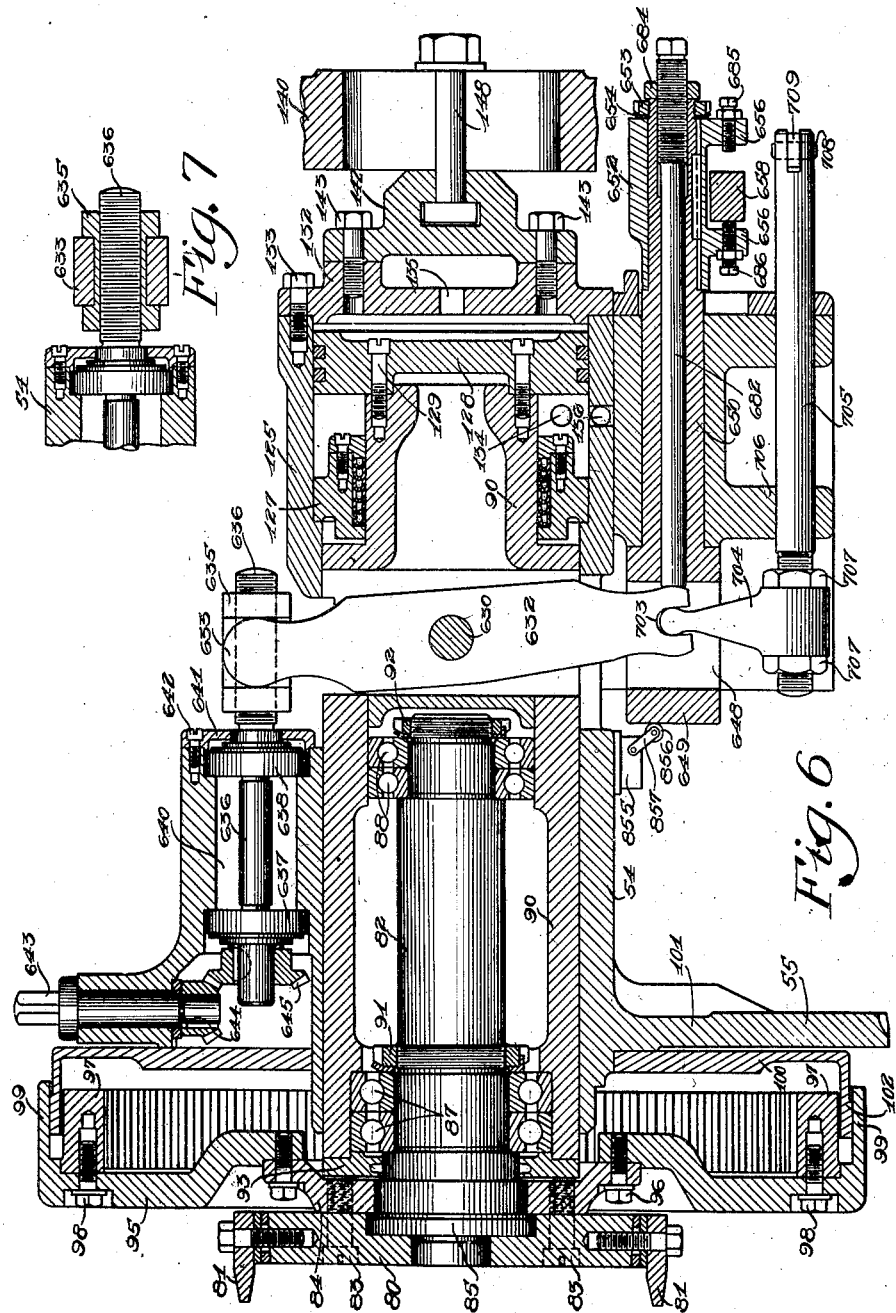
INVENTORS
Robert S. Condon
BY Albert P. Schauseil
their ATTORNEY

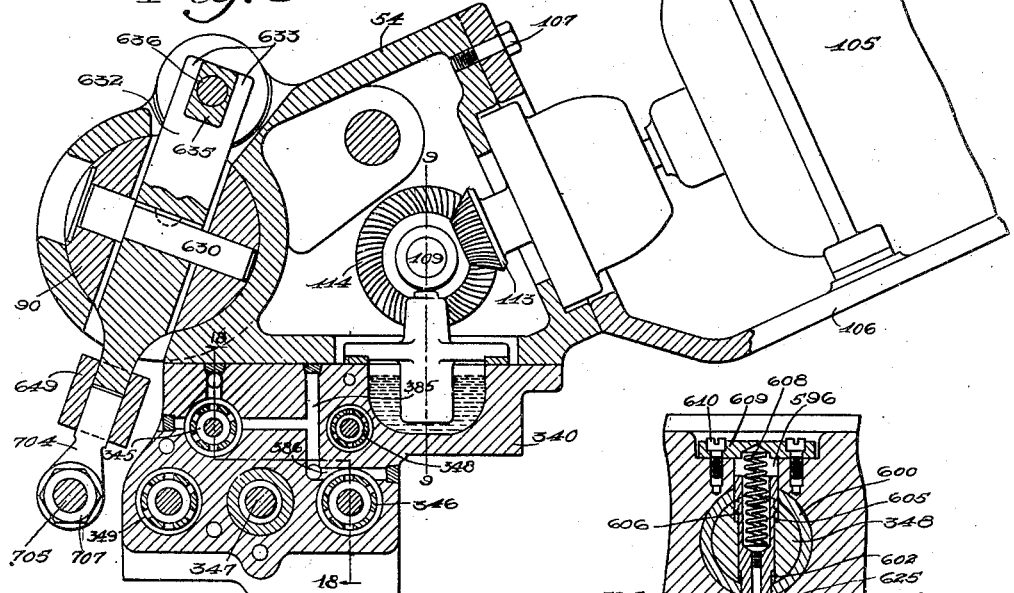
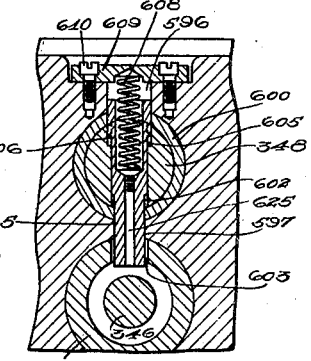
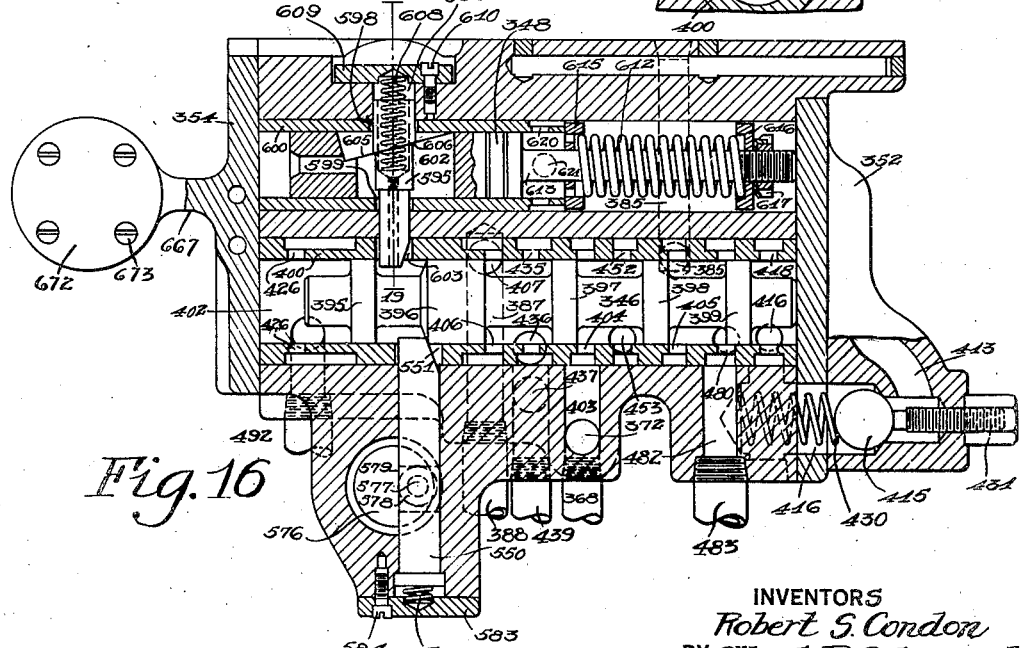

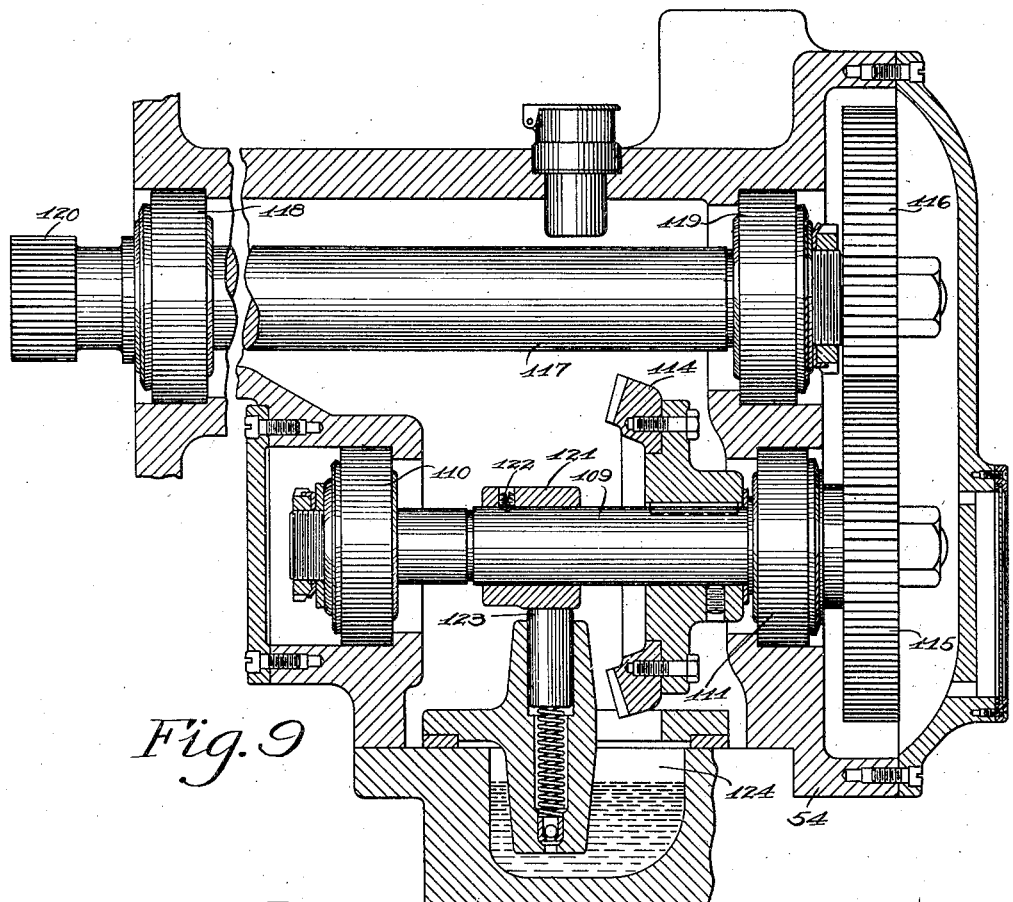
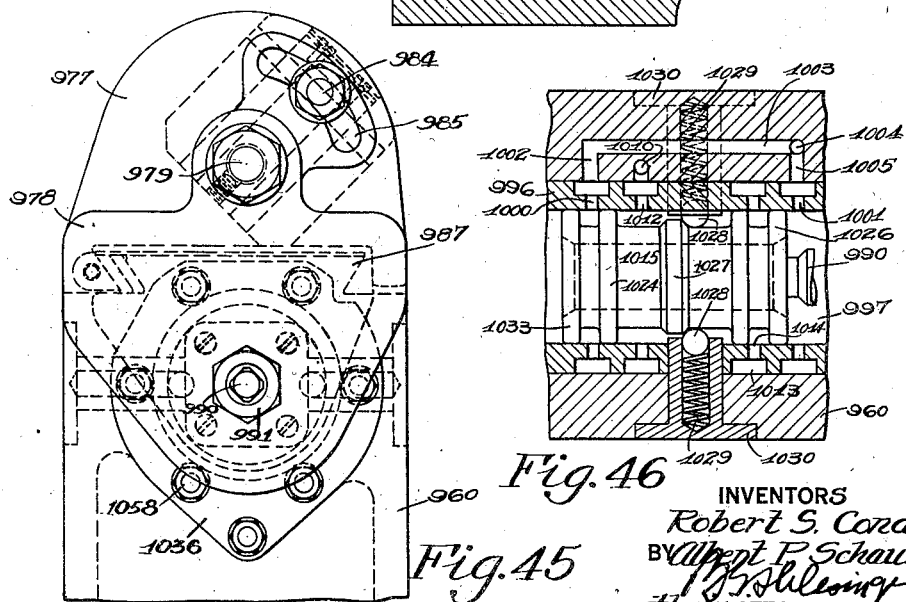

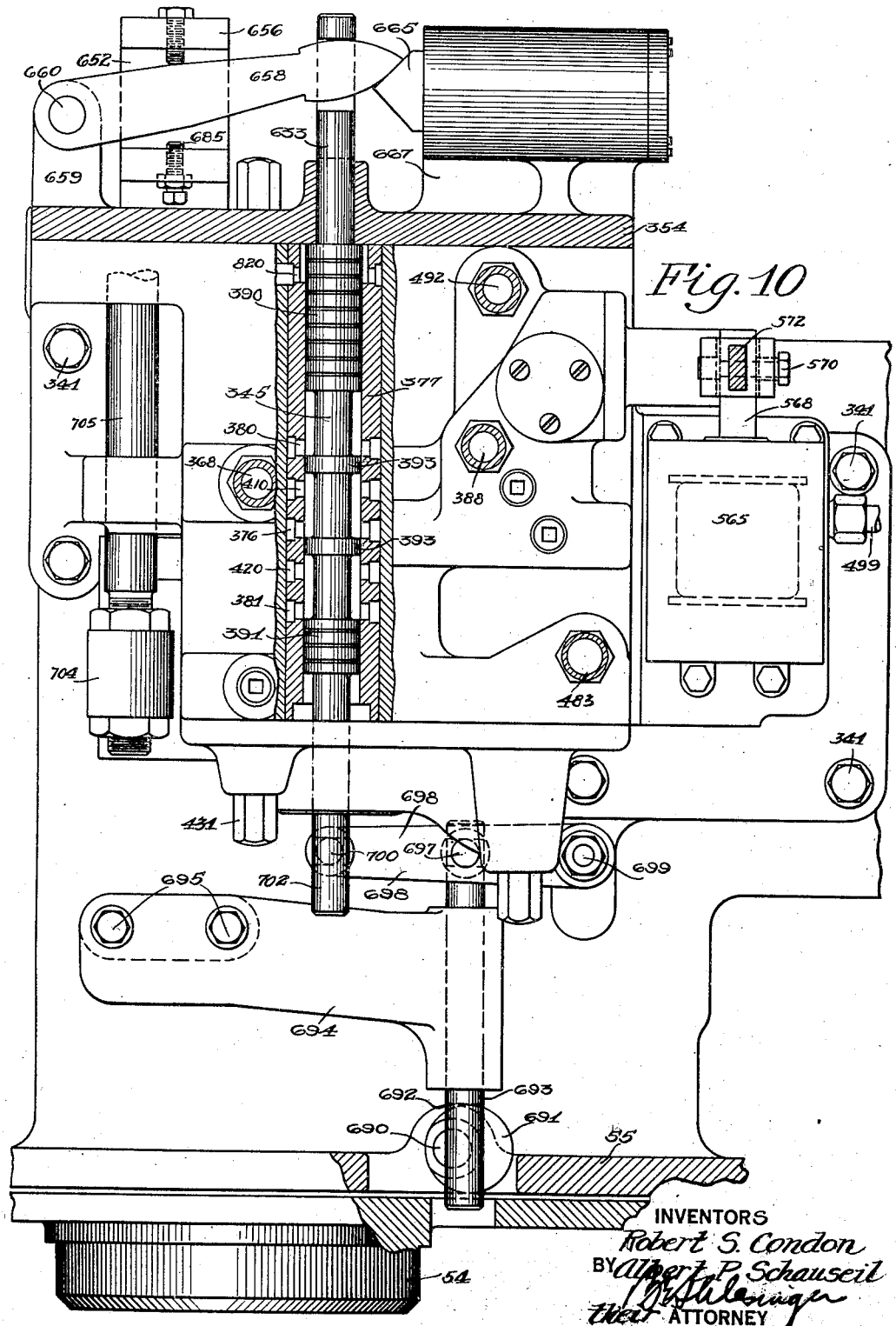

Oct. 16, 1934.  R. S. CONDON ET AL  1,976,984
GEAR CUTTING MACHINE
Filed March 2, 1931  23 Sheets-Sheet 10

INVENTORS
Robert S. Condon
Albert P. Schauseil
BY
their ATTORNEY

Oct. 16, 1934.   R. S. CONDON ET AL   1,976,984
GEAR CUTTING MACHINE
Filed March 2, 1931   23 Sheets-Sheet 11
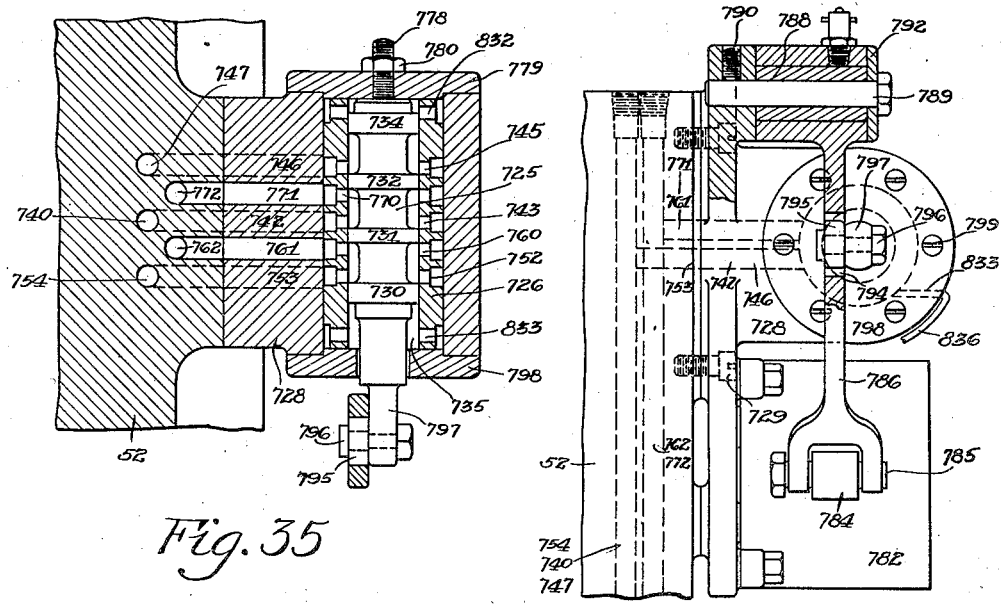
Fig. 35
Fig. 36
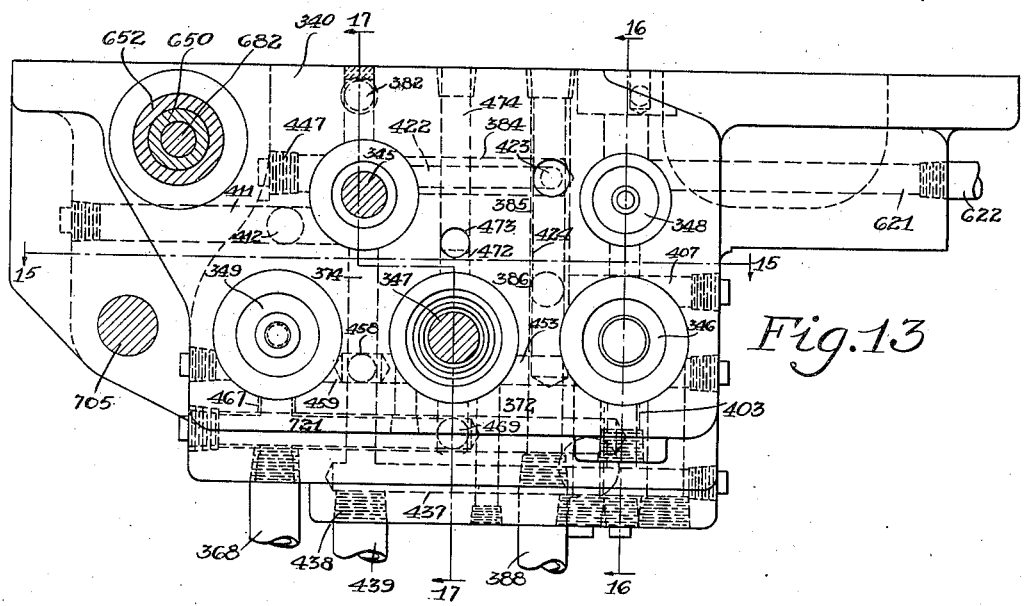
Fig. 13
INVENTORS
Robert S. Condon
BY Albert P. Schauseil
their ATTORNEY Oct. 16, 1934.　　R. S. CONDON ET AL　　1,976,984
GEAR CUTTING MACHINE
Filed March 2, 1931　　23 Sheets-Sheet 12
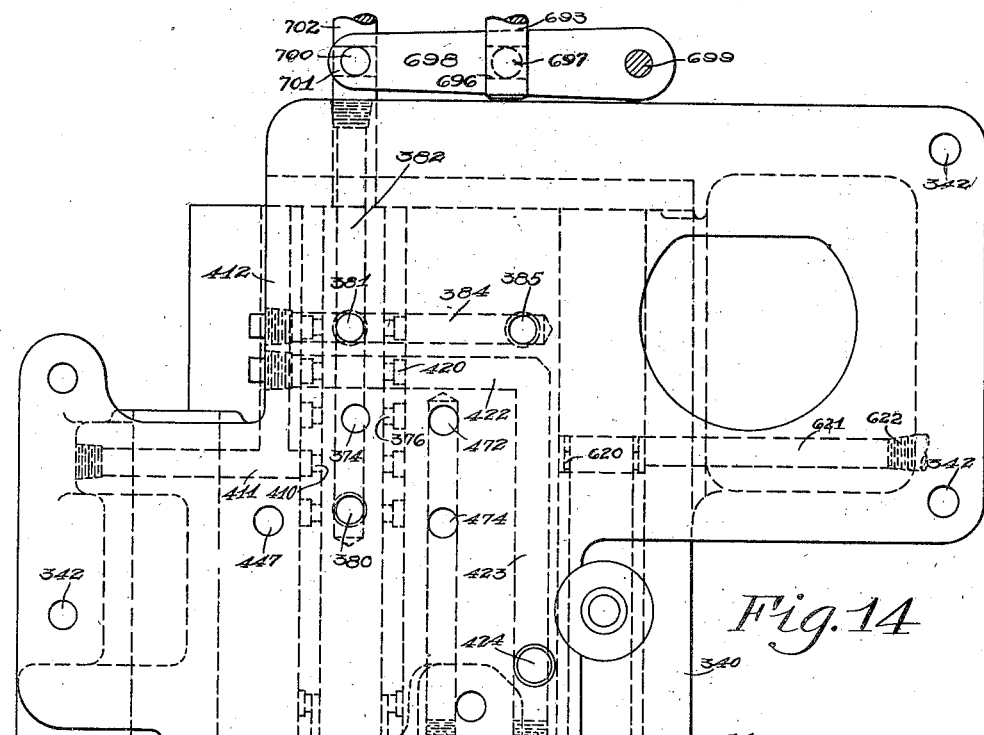
Fig. 14
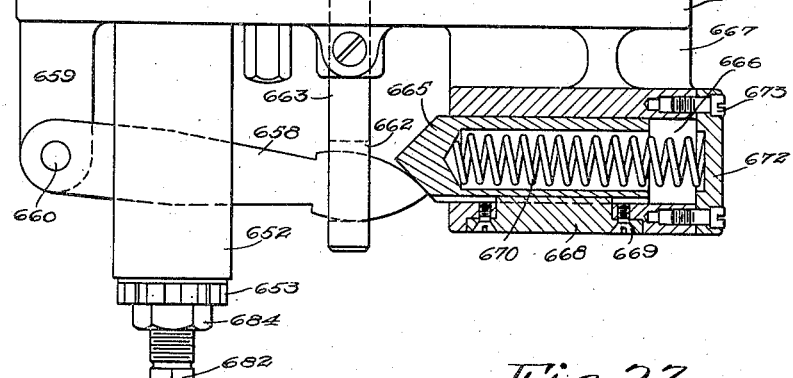
Fig. 23
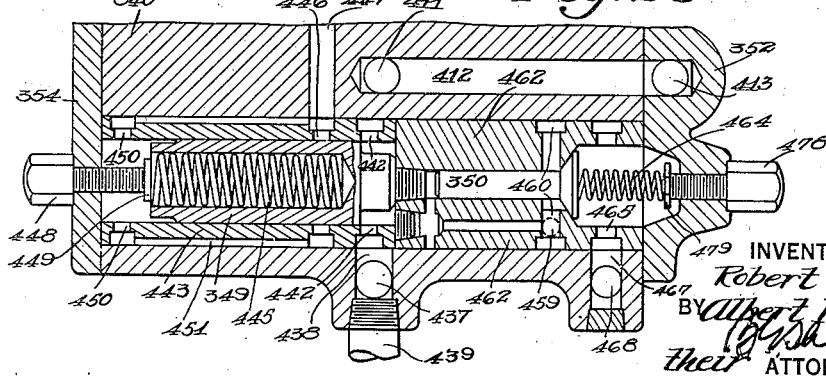
INVENTORS
Robert S. Condon
Albert P. Schauseil
BY
their ATTORNEY Oct. 16, 1934.   R. S. CONDON ET AL   1,976,984
GEAR CUTTING MACHINE
Filed March 2, 1931   23 Sheets-Sheet 14
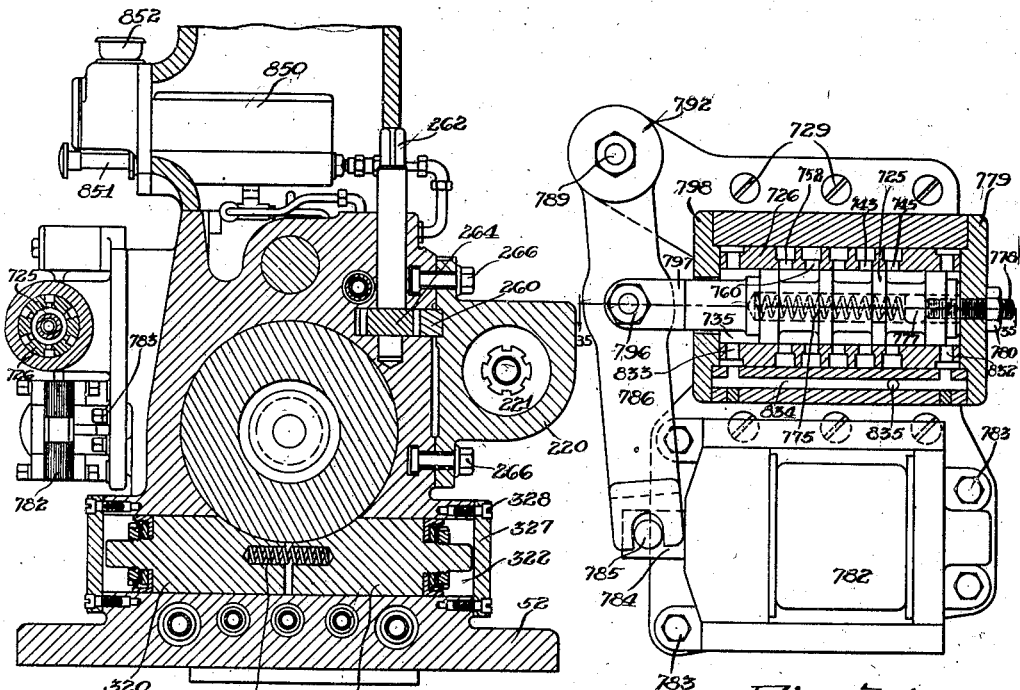
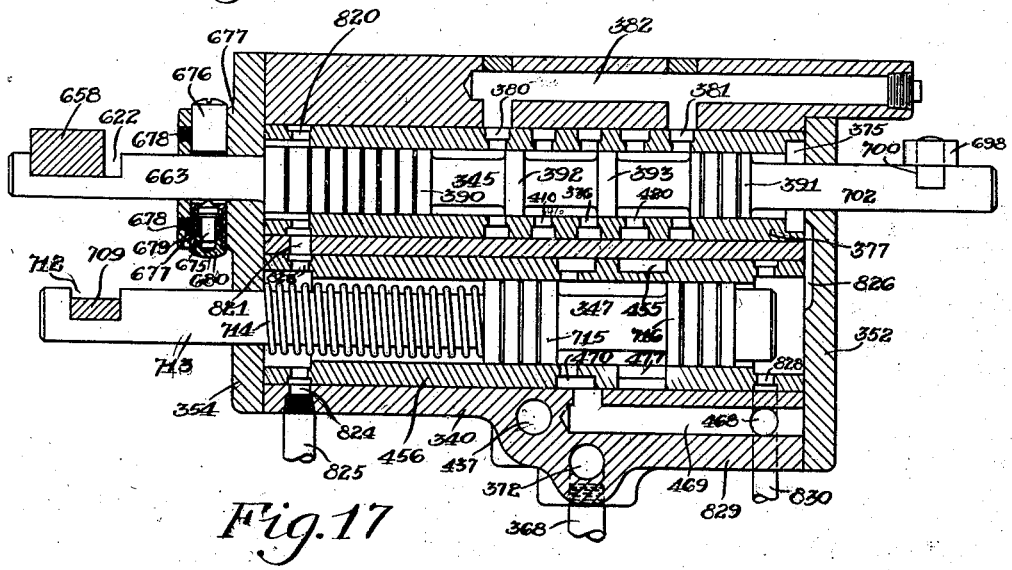
INVENTORS
Robert S. Condon
BY Albert P. Schauseil
their ATTORNEY Oct. 16, 1934.    R. S. CONDON ET AL    1,976,984
GEAR CUTTING MACHINE
Filed March 2, 1931    23 Sheets-Sheet 15

INVENTORS
Robert S. Condon
BY Albert P. Schauseil
their ATTORNEY

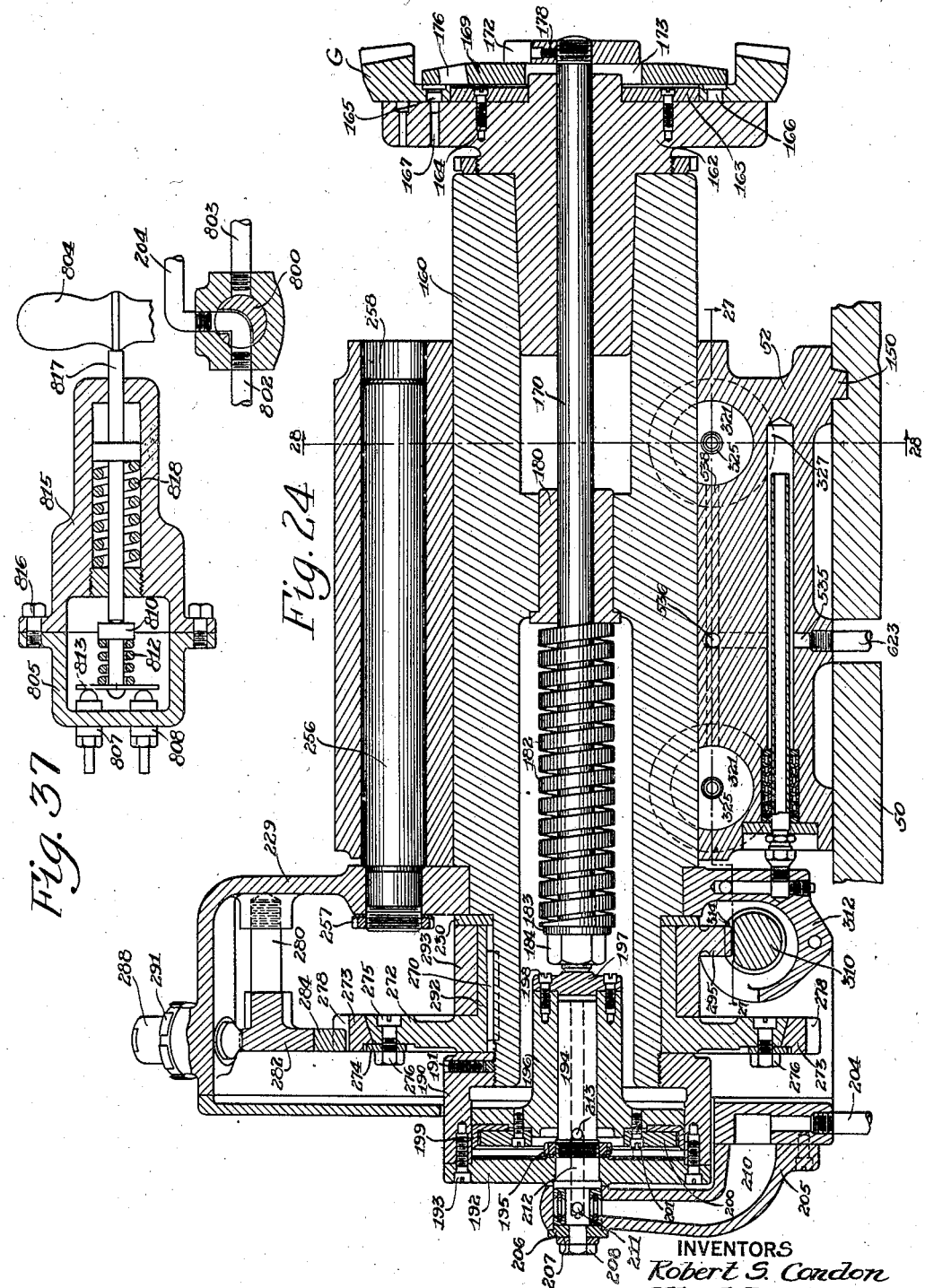

Oct. 16, 1934.   R. S. CONDON ET AL   1,976,984
GEAR CUTTING MACHINE
Filed March 2, 1931   23 Sheets-Sheet 17

INVENTORS
Robert S. Condon
Albert P. Schauseil
BY
their ATTORNEY

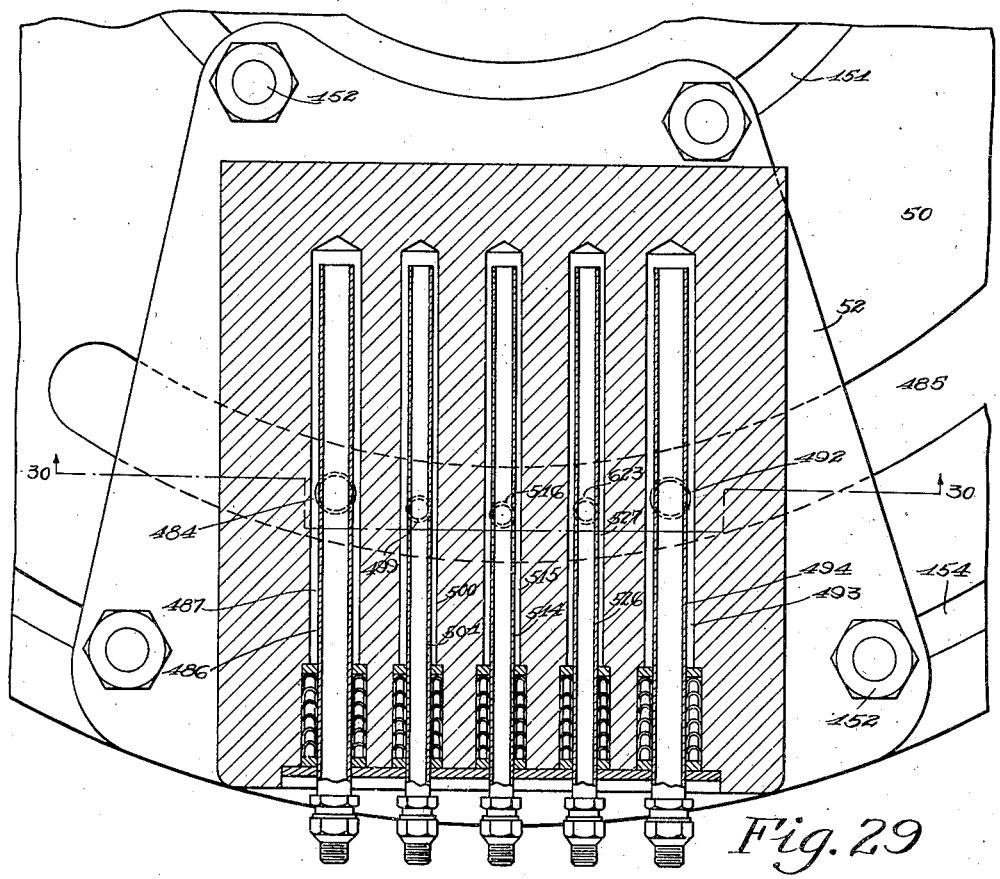

Oct. 16, 1934.  R. S. CONDON ET AL  1,976,984
GEAR CUTTING MACHINE
Filed March 2, 1931  23 Sheets-Sheet 19
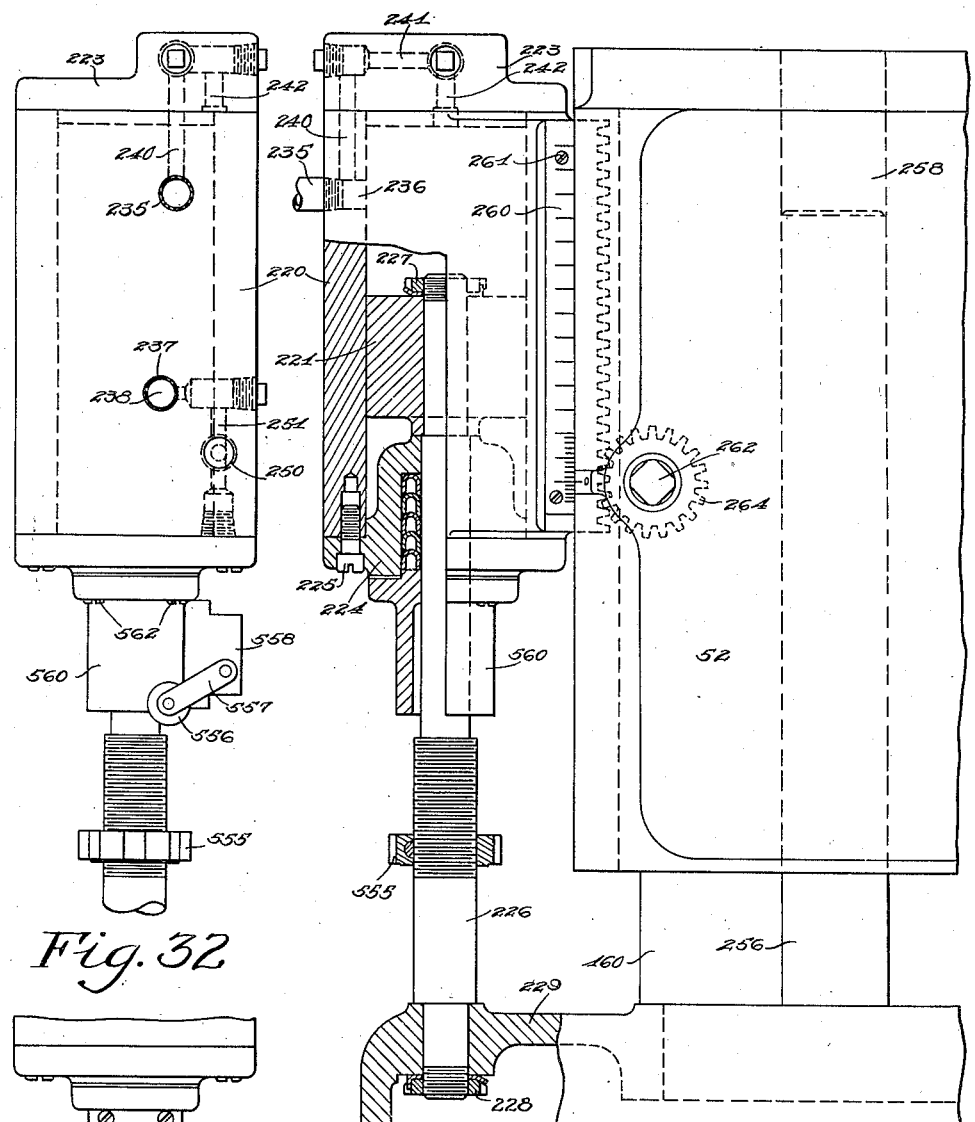
Fig. 32
Fig. 31
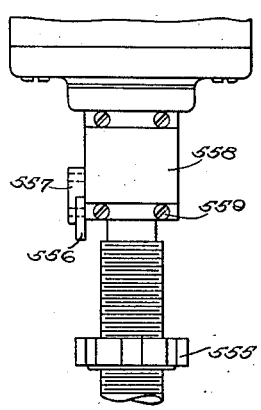
Fig. 33
INVENTORS
Robert S. Condon
BY Albert P. Schauseil
their ATTORNEY Oct. 16, 1934.   R. S. CONDON ET AL   1,976,984
GEAR CUTTING MACHINE
Filed March 2, 1931   23 Sheets-Sheet 21

INVENTORS
Robert S. Condon
BY Albert P. Schauseil
their ATTORNEY

Oct. 16, 1934.   R. S. CONDON ET AL   1,976,984
GEAR CUTTING MACHINE
Filed March 2, 1931   23 Sheets-Sheet 23

INVENTORS
Robert S. Condon
BY Albert P. Schauseil
their ATTORNEY

Patented Oct. 16, 1934

1,976,984

UNITED STATES PATENT OFFICE 1,976,984

GEAR CUTTING MACHINE

Robert S. Condon and Albert P. Schauseil, Rochester, N. Y., assignors to Gleason Works, Rochester, N. Y., a corporation of New York Application March 2, 1931, Serial No. 519,327

39 Claims. (Cl. 90—4)

The present invention relates to machines for producing gears and particularly to gear cutting machines of the intermittent indexing type. In a still more specific aspect, the present invention relates to machines for roughing or form-cutting longitudinally curved tooth bevel and hypoid gears. In this latter aspect, the present invention may be regarded as an improvement upon the invention of Patent No. 1,351,200 issued August 31, 1920 to E. W. Bullock et al.

The primary purposes of this invention are to provide a faster and more rigid gear cutting machine and one which will be more nearly foolproof in operation. To these ends, provision has been made for hydraulic operation of the feed and indexing mechanisms and further an interlock has been provided between these mechanisms which insures that the indexing operation will be completed before feeding can start and that the indexing operation cannot start until the cutter has been withdrawn from the work. Beyond this, means is provided for automatically moving the work to loading position and dechucking it when the cutting operation has been completed.

A purpose of the invention is to provide, also, a gear cutting machine on which gears may not only be cut but also chamfered and this without any appreciable increase in the time of the cutting operation and without appreciable complication in the construction of the machine or its operation. When the chamfering attachment is used, the chamfering mechanism is preferably interlocked with the feed and indexing mechanisms so that no one of these operations can start until the other has been completed.

The invention comprises, also, certain other improvements in construction which will hereinafter be more fully described and the novel features of which will be pointed out in the claims at the end of the specification.

In the drawings:

Figure 2 is a plan view of this machine;

Figure 6 is a sectional view through the cutter support taken at right angles to the view of Figure 5 and showing further details of the drive, the reciprocating mechanism and the adjustments for the cutter and for its stroke;

Figure 7 is a sectional view showing a detail of the means provided for adjusting the cutter to take up for cutter wear;

Figure 8 is a sectional view through the cutter support taken transversely of the views of Figures 5 and 6, and showing further details of the cutter drive and of the feed mechanism and showing, also, in transverse section, the hydraulic control block which contains the valve mechanism that governs the operation of the machine;

Figure 9 is a section on the line 9—9 of Figure 8 on an enlarged scale, showing still further details of the drive to the cutter;

Figure 10 is a side view partly in section, of the cutter support showing particularly details of the control valve, of the load and fire mechanism for automatically operating the same, and of the means for manually operating the same. This view is a view looking upward at the parts shown in Figure 6;

Figure 13 is an end elevation of the hydraulic control block proper;

Figure 14 is a plan view of this control block;

Figure 16 is a sectional view through the control block taken on the line 16—16 of Figure 13 looking in the direction of the arrows;

Figure 17 is a sectional view through the control block taken on the line 17—17 of Figure 13, looking in the direction of the arrows;

Figure 25:
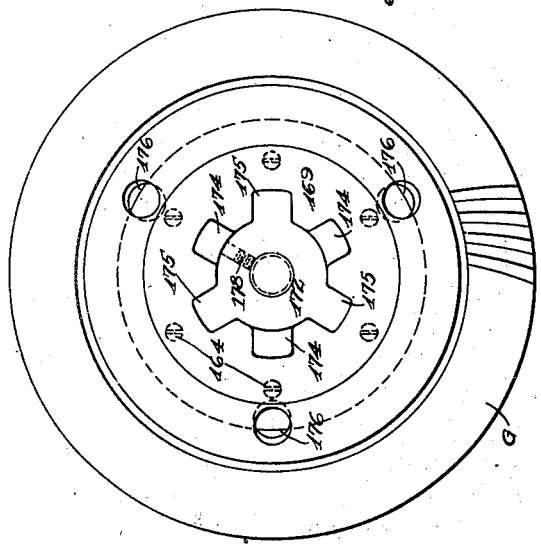
Figure 18:
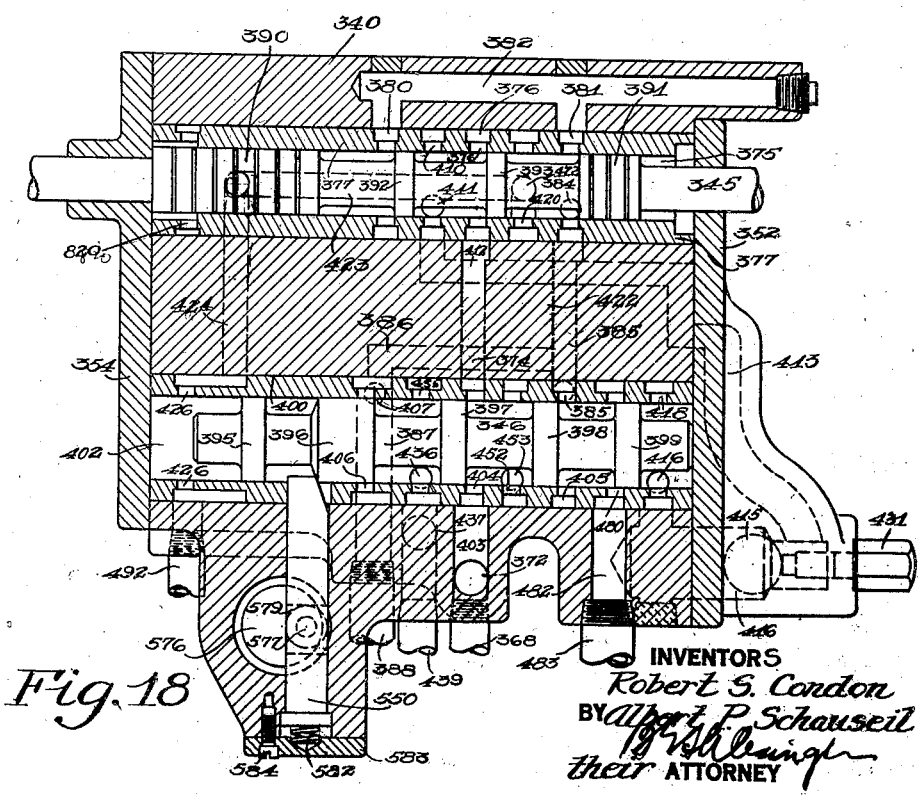
Figure 15:
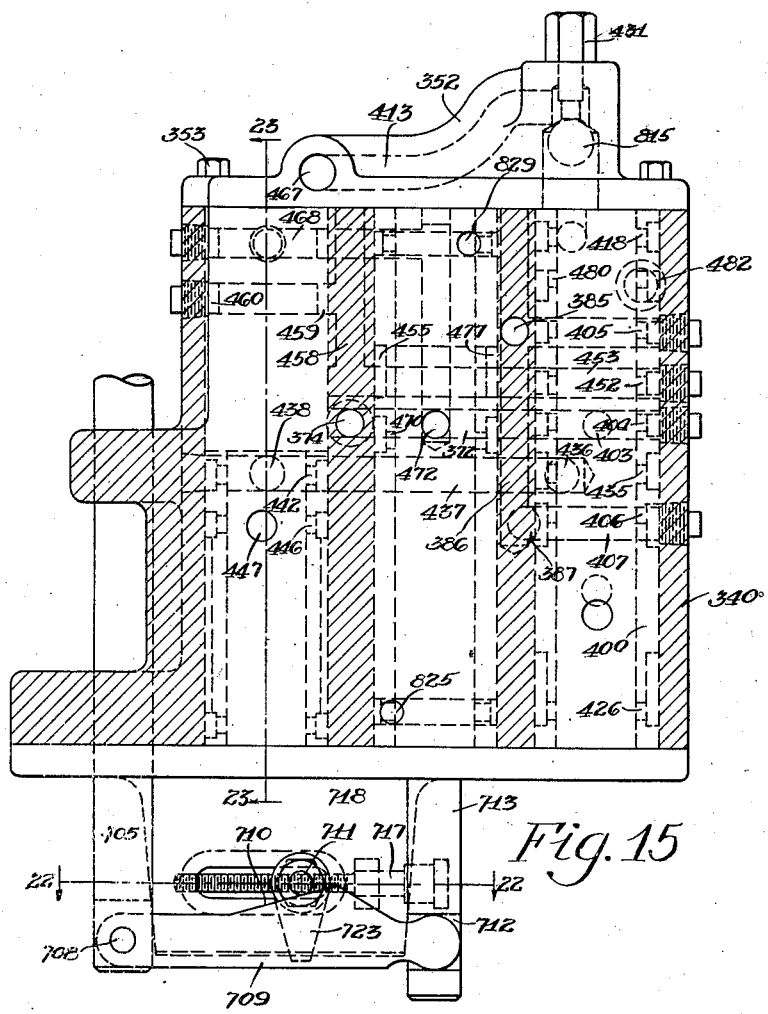
Figure 15 is a sectional view through this block taken on the line 15—15 of Figure 13, looking in the direction of the arrows.
Figure 22:
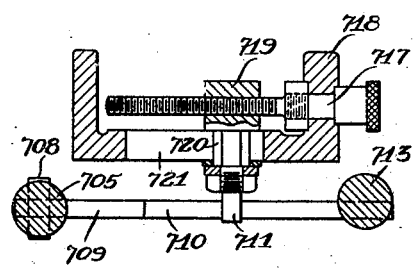
Figure 26:
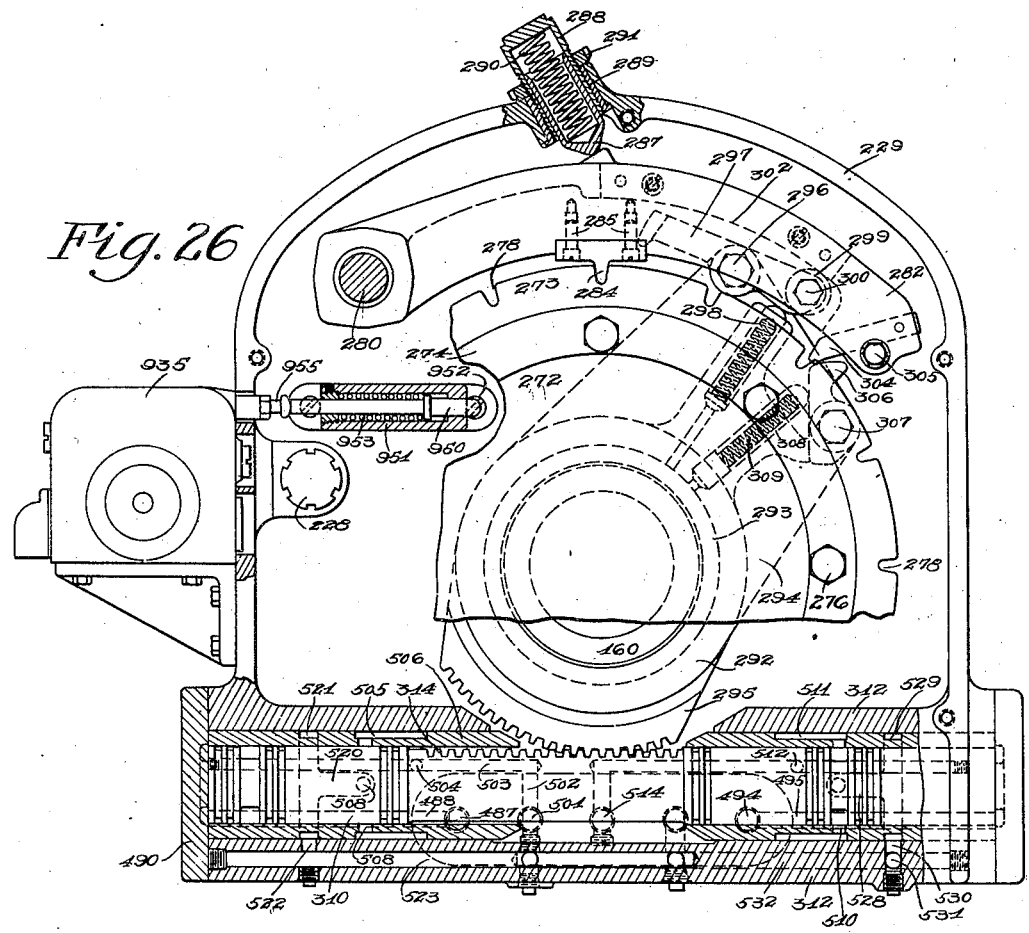
Figures 20, 21:
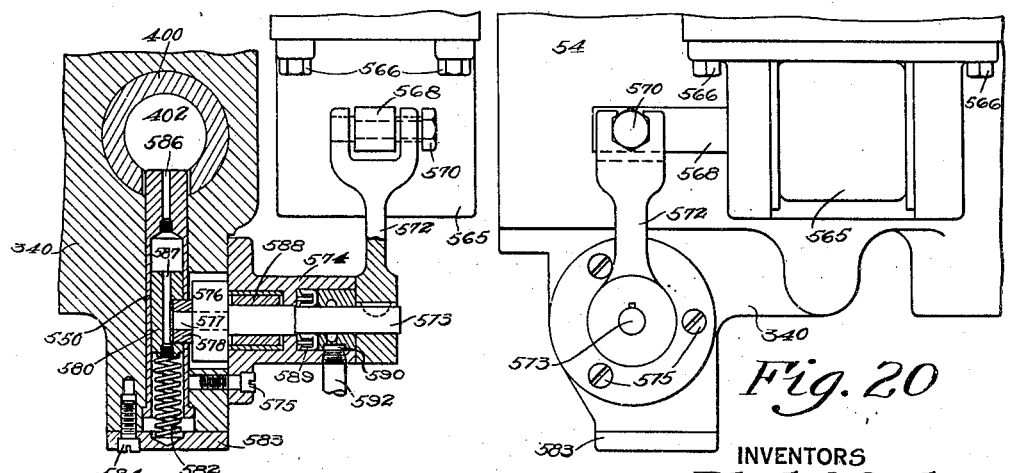
Figure 27:
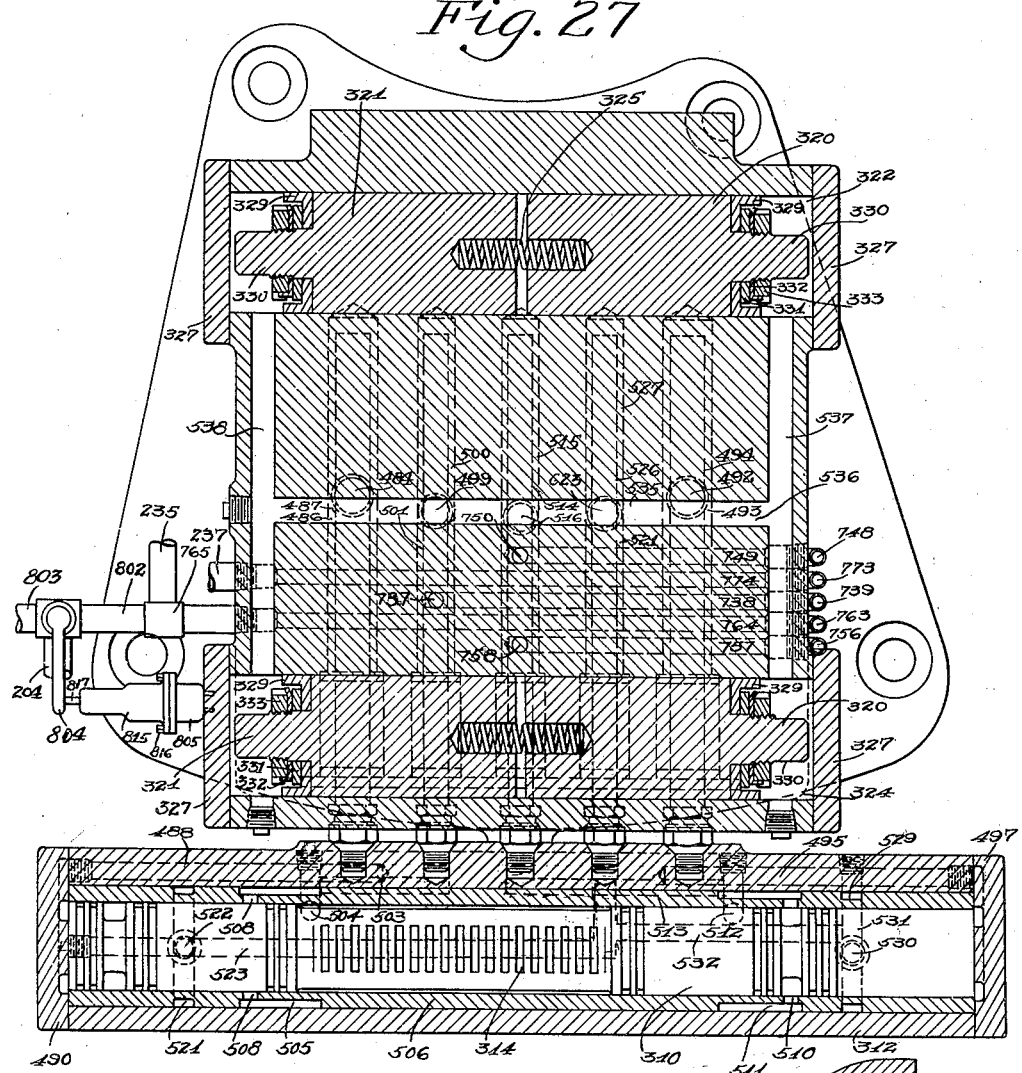
Figures 38, 39:
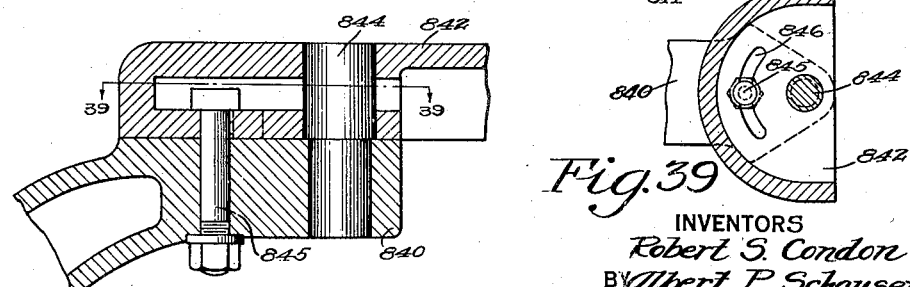
Figure 40:
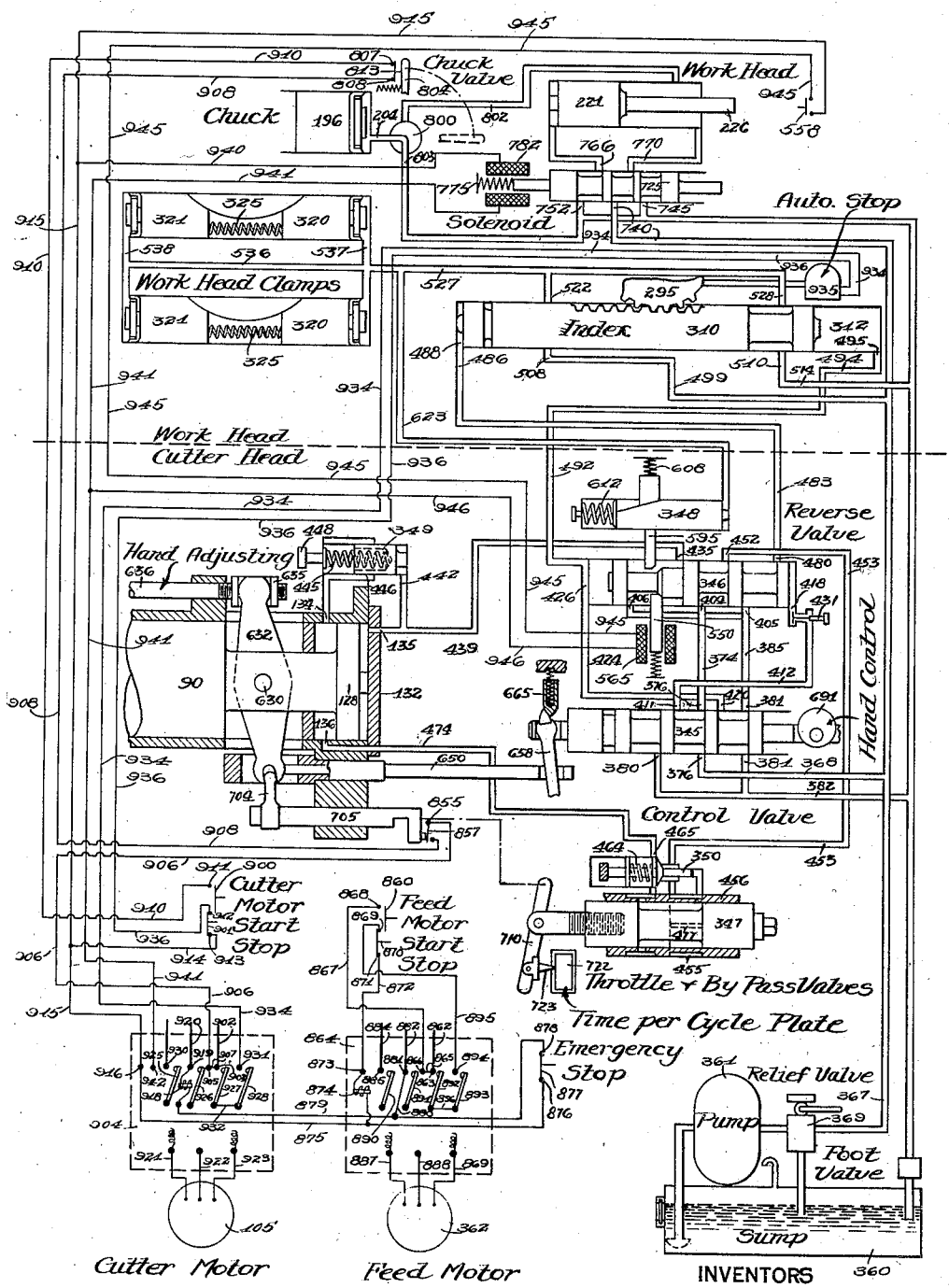
Figure 41:
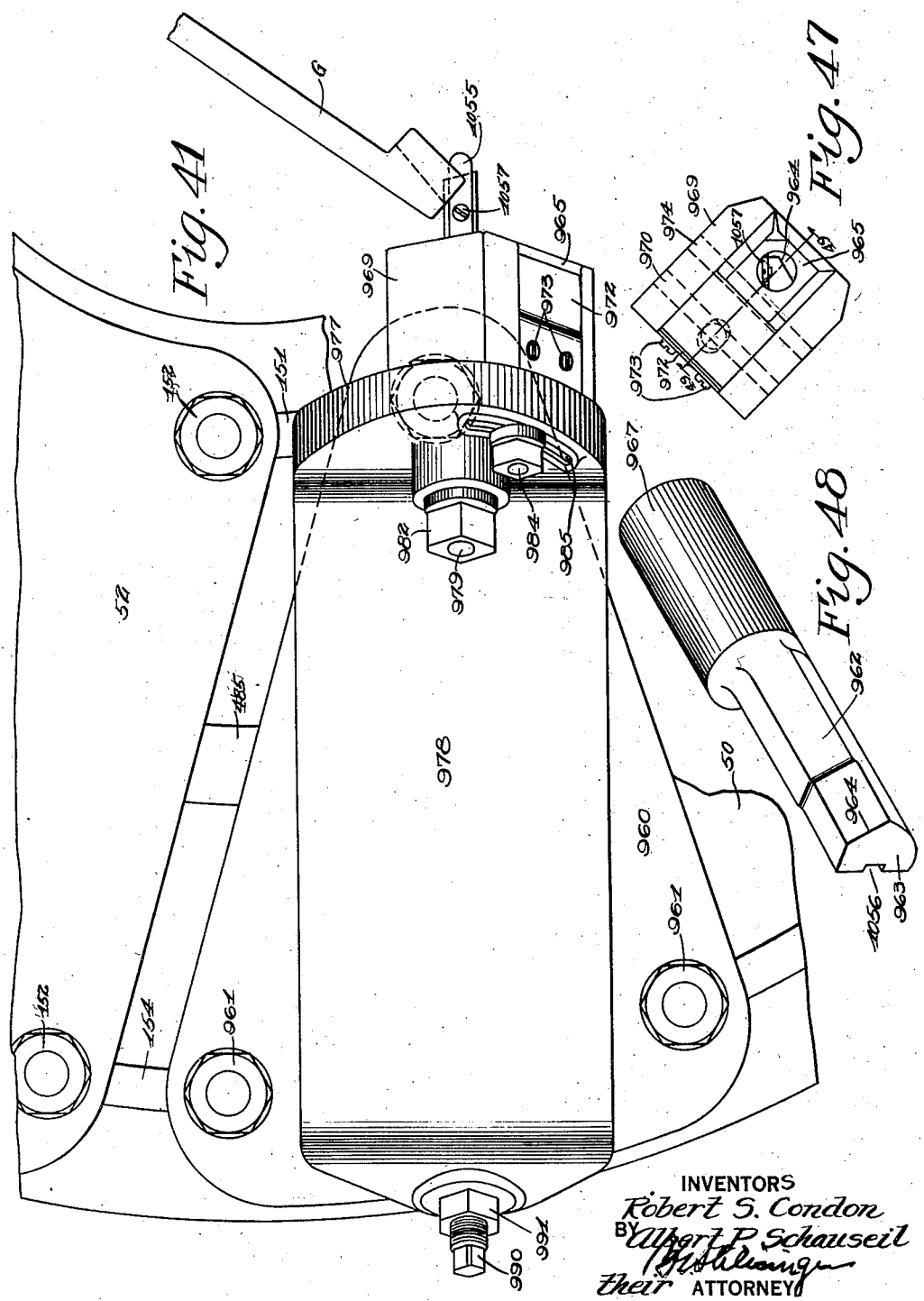
Figure 42:
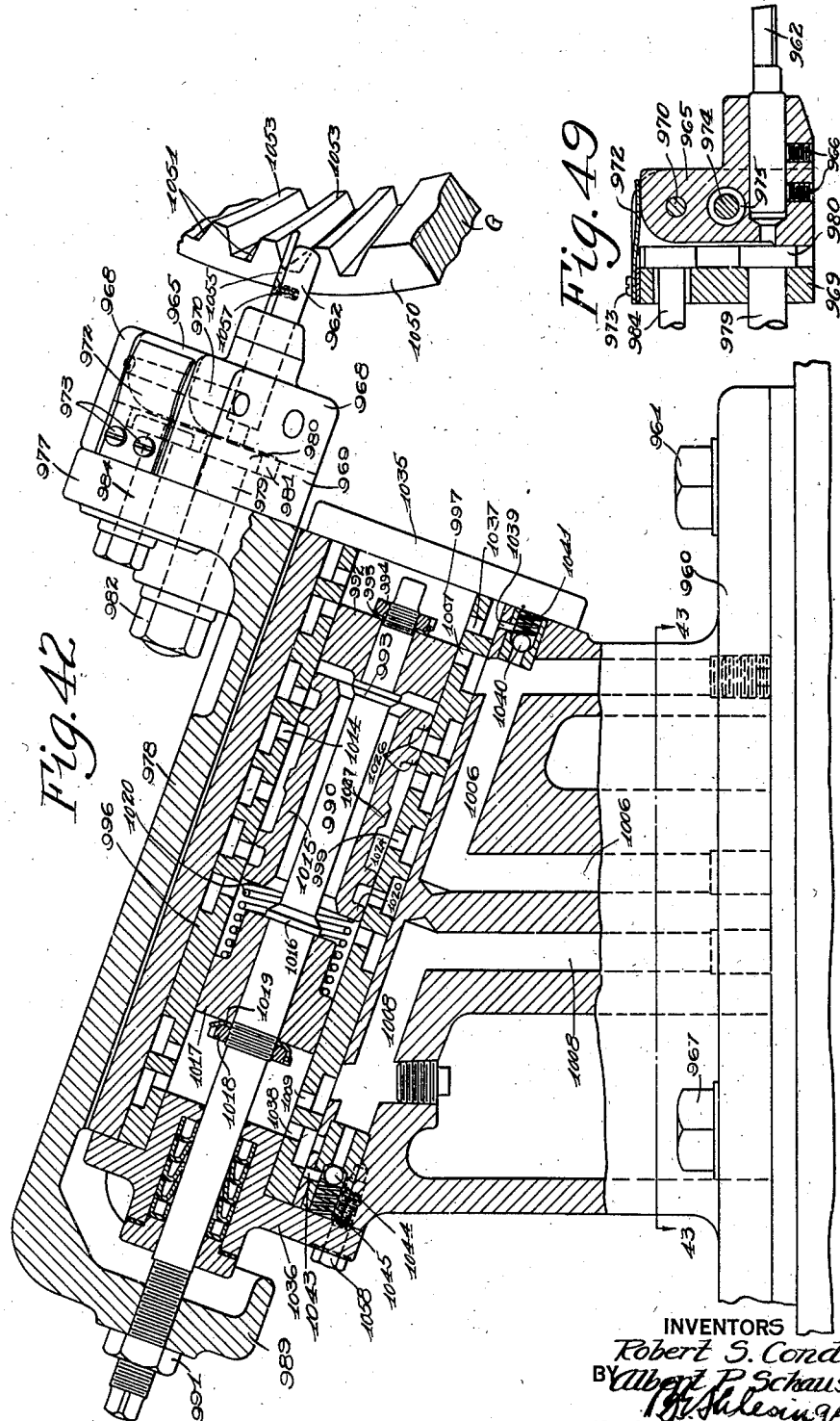
Figure 43:
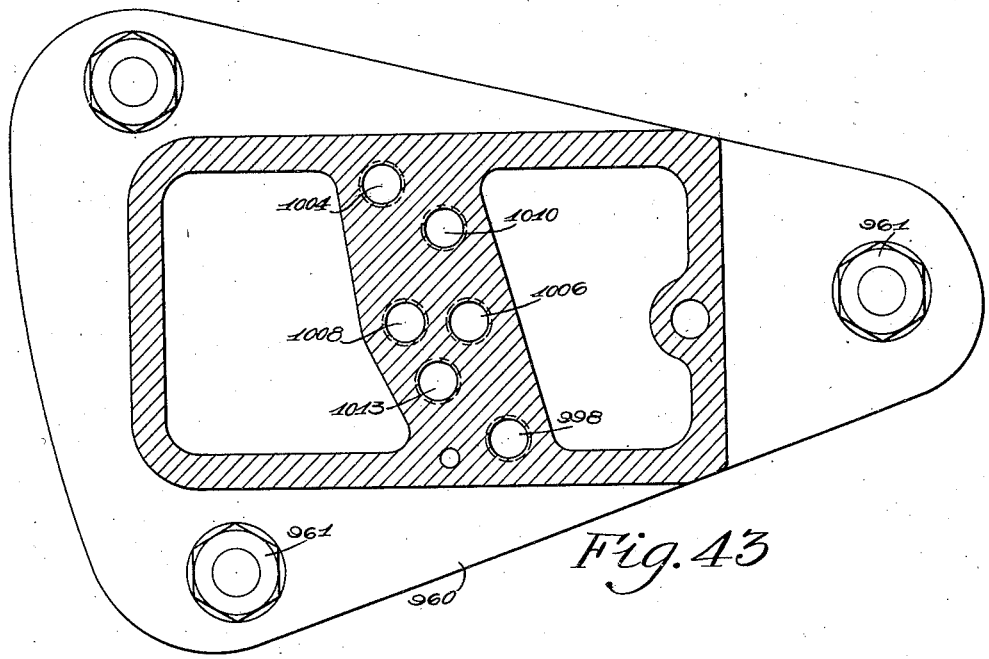
Figures 44, 50:
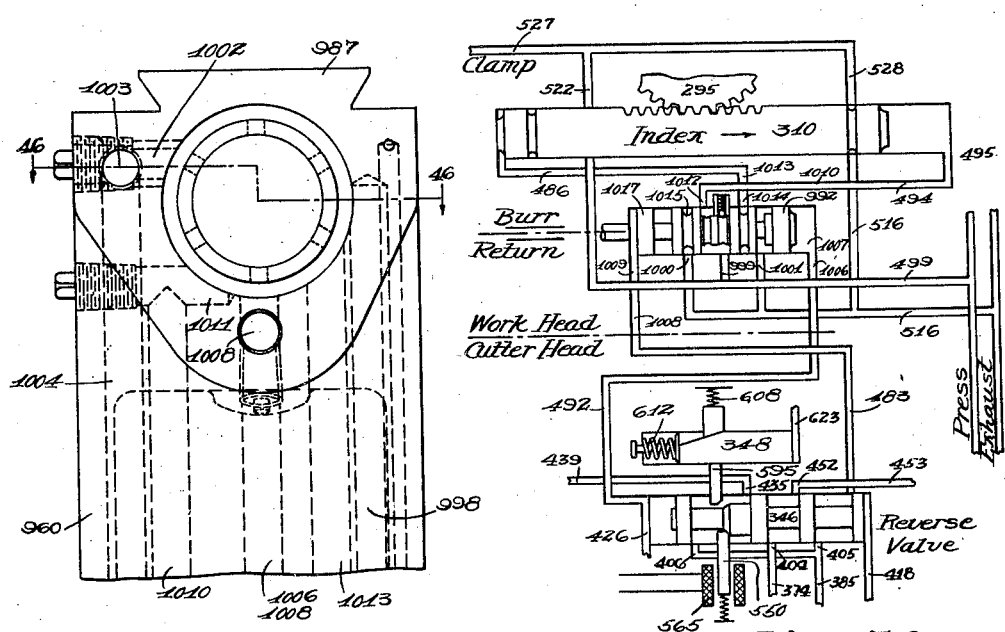

Figure 18 is a sectional view through the control block, showing the connection between the control valve and the reverse valve. The section through the control valve is the same as that of Figure 17 while the section through the reverse valve is the same as that of Figure 16. The view might be considered a section on the line 18—18 of Figure 8, looking in the direction of the arrows;

Figure 19 is a sectional view on the line 19—19 of Figure 16 showing details of the construction of one of the plungers which lock the reverse valve and of the release for the same;

Figure 20 is a side view of the solenoid and of the parts operated thereby which operate the other locking-stop of the reverse valve;

Figure 21 is a view at right angles to Figure 20, showing in section, this locking stop and the parts connecting the same with the solenoid;

Figure 22 is a section on the line 22—22 of Figure 15, looking in the direction of the arrows;

Figure 23 is a section on the line 23—23 of Figure 15, looking in the direction of the arrows;

Figure 24 is a vertical sectional view through the work spindle and work head of the machine;

Figure 25 is an end view showing details of the means for clamping a gear blank on the work spindle;

Figure 26 is an end view, with parts broken away, of the indexing mechanism of the machine;

Figure 27 is a horizontal sectional view of the work head, taken on the line 27—27 of Figure 24, looking in the direction of the arrows;

Figure 28 is a vertical sectional view through the work head on the line 28—28 of Figure 24 looking in the direction of the arrows;

Figure 29 is a horizontal sectional view through the work head on the line 29—29 of Figure 30, looking in the direction of the arrows and showing also in plan a portion of the supporting base or frame of the machine;

Figure 30 is a section on the line 30—30 of Figure 29;

Figure 31 is a fragmentary view, partly in plan and partly in section, showing the fluid-pressure operated mechanism for moving the work spindle into and out of cutting position;

Figure 32 is a side elevation of the mechanism shown in Figure 31;

Figure 33 is a fragmentary view taken at right angles to Figure 32 and showing the switch which controls the cutter motor and the parts for operating the same;

Figure 34 is a view showing the valve and solenoid which control the movements of the work head piston, the valve being shown in section;

Figure 35 is a section through the valve and the adjacent part of the work head, the section being taken on the line 35—35 of Figure 34;

Figure 36 is an end elevation of the parts shown in Figure 34;

Figure 37 is a fragmentary view, showing details of the three-way valve that controls the work-chucking mechanisms and showing the safety switch employed in conjunction with the same;

Figure 38 is a view in vertical section showing details of the construction of the overhead tie which connects the cutter and work support;

Figure 39 is a section on the line 39—39 of Figure 38 but on a somewhat smaller scale;

Figure 40 is a diagrammatic view illustrating the operation of the machine;

Figure 41 is a fragmentary plan view of the work end of the machine, showing the attachment mounted thereon for chamfering or burring the teeth of the gears after they are cut;

Figure 42 is a side elevation of the chamfering attachment with parts broken away to show the operating mechanism therefor in section;

Figure 43 is a section on the line 43—43 of Figure 42, looking in the direction of the arrows;

Figure 44 is a fragmentary end view of the support or head on which the burring mechanism is mounted, the view being taken from the rear of same;

Figure 45 is an end view of the upper portion of this head showing the burring tool slide mounted thereon. The view is from the same end as shown in Figure 44;

Figure 46 is a fragmentary sectional view through the operating and control mechanism of the chamfering attachment, the section being taken generally at right angles to Figure 42, as on the line 46—46 of Figure 44.

Figure 47 is a front view of the chamfering mechanism;

Figure 48 is a perspective view of the chamfering tool;

Figure 49 is a section on the line 49—49 of Figure 47; and

Figure 50 is a diagrammatic view, supplemental to Figure 40, illustrating the operation of the machine when provided with the burring or chamfering attachment.

The machine shown in the drawings represents a preferred form of the invention as embodied in a machine for roughing or cutting in a non-generating operation longitudinally curved tooth tapered gears. There is no rolling motion provided. The tool and blank are mounted on a tool support and a work head, respectively, which, once adjusted, are secured directly to the base or frame of the machine. The tool support has an angular and a lateral adjustment on the base of the machine, the same as in the Bullock et al. patent above mentioned, for the purpose of setting the cutter in accordance with the spiral angle of the teeth to be cut in the blank.

The work head is adjustable angularly on the base to set the blank in accordance with the root angle of the teeth to be cut in the same while the blank spindle is slidably adjustable in the work head for cone distance.

The tool used is a rotary face mill gear cutter. It is secured to a spindle that is journaled in a sleeve which is reciprocable in the tool support. The cutter is driven from an electric motor through suitable gearing and produces both the lengthwise tooth curves and the profile shape of the gear teeth by its rotation in engagement with the blank. The reciprocating movement of the sleeve is hydraulically operated and controlled and is for the purpose of imparting an alternate movement of feed and withdrawal to the cutter to cut a tooth slot in the blank on the feed stroke and move the cutter away from the blank on the return stroke to permit indexing of the blank. The reversal of direction of movement of the cutter and the speed of this movement is controlled directly from the movement of the sleeve itself.

The indexing mechanism for the blank is of the notched plate type and is hydraulically operated. During cutting, the work spindle is locked against rotation by the indexing mechanism and by a pair of clamps which operate directly on the work spindle. The clamps are actuated into clamping position by fluid pressure.

One of the principal features of the machine is the provision of a hydraulic interlock between the feed mechanism, the clamps and the indexing mechanism. This interlock serves to prevent absolutely start of the feed movement until the indexing operation has been completed and the work spindle has been locked up and it serves, also, to prevent absolutely start of the indexing operation until the cutter has been withdrawn from engagement with the blank and the work spindle is released.

In the operation of the machine, the alternate cutting and indexing operations proceed until the required number of teeth have been cut in the blank. Then a control device functions and the work is automatically moved clear of the cutter to its loading position and simultaneously the completed blank is automatically dechucked. Thus the operator can remove the completed work piece and chuck a new blank with a minimum loss of time. The return of the work spindle into operative position with a new blank chucked thereon is effected automatically when the cutter motor is restarted after the chucking operation has been completed. The return of the work spindle to operative position, in turn, starts the cycle of alternate cutting and indexing anew.

There are a number of safety features incorporated in the machine besides the interlock already referred to. Before the cutter motor can be started, the cutter must be in withdrawn position. This prevents possibility of breakage or damage to the cutter through starting up of the machine with the cutter in engagement with the work. When the stop mechanism functions on completion of a gear, the cutter motor is stopped, thus insuring against injury to the operator during removal of the completed work piece and chucking of a new blank. It is possible, also, to arrange the machine so that in order to start it, the operator must use both hands to manipulate different control devices. He is thereby prevented from attempting to adjust the blank or the tool while the tool or blank are moving into engagement, an attempt which always entails possibility of injury to the operator.

The machine may be provided with a burring or chamfering attachment for burring or chamfering the outer ends of the gear teeth alternately with the cutting and indexing operations. In the preferred construction, the burring operation is hydraulically interlocked with the cutting and indexing operations and burring does not take place until cutting is finished and indexing does not start until both cutting and burring have been finished.

Referring to the drawings by numerals of reference and particularly first to Figures 1 to 4 inclusive, 50 indicates the base or frame of the machine. The tool mechanism is mounted in a column or upright 51 formed integral with the base 50. The work spindle is journaled in a work head 52 which is adjustably mounted on the base or frame 50 of the machine

Construction and adjustments of cutter support 54 designates the cutter support. This support is formed at its front end with a flange 55 which is generally triangular in shape, as clearly shown in Figure 3. The support is mounted for angular adjustment on a slide 56, being movable angularly about a pivot pin or stud 57 (Figs. 3 and 5) that passes through the flange 55 of the support and is secured by the nut 58 in the slide 56. The support 54 is secured in any position of its angular adjustment on the slide 56 by the T-bolts 60 which engage in the arcuate T-slot 61 formed in the face of the slide 56 and by the gib 62 which overlaps the face of the small leg of the flange 55. The gib 62 is secured to the slide 56 by the bolt 63 and the screws 64. The T-slot 61 is curved about the axis of the pin or stud 57 as a center and the gib 62 and the contiguous portion of the flange 55 are curved above this axis as a center.

Angular adjustment of the tool support 54 on the slide 56 is effected by rotating the shaft 66 which is journaled in the slide 56 and carries a worm 68 (Figs. 2 and 3) that meshes with a worm wheel segment 69 that is cut into the periphery of the flange 55 of the cutter support. The slide 56 is suitably graduated adjacent the T-slot 61 in order to enable angular adjustment of the tool support on the slide to be made accurately.

The slide 56 is laterally adjustable on the face of the column 51. This adjustment is effected by rotation of the screw shaft 70 which is journaled in the column 51 and which threads into a nut 71 that is secured by screws 72 to the back of the plate 56. The plate 56 is secured in any adjusted position on the face of the column 51 by T-bolts 74 which pass through the slide 56 and engage in the parallel T-slots 75 formed on the face of the column 51. The face of the column 51 is graduated adjacent the upper T-slot 75 to permit the adjustment of the slide 56 on the column to be made accurately and if desired, also, a graduated dial may be secured to the shaft 70 for this same purpose.

The angular adjustment of the tool support 54 upon the slide 56 and the lateral adjustment of the slide 56 upon the column 51 are for the purpose of adjusting the cutter so that it will cut teeth of the desired spiral angle on the blank. These adjustments are the same as employed in the machine of Bullock et al. above mentioned.

The plate or slide 56 has a large central opening 77 formed therein and the column 51 is hollow. The tool support 54 extends through the opening 77 into the column 51.

Cutting tool and its drive

Figure 5:
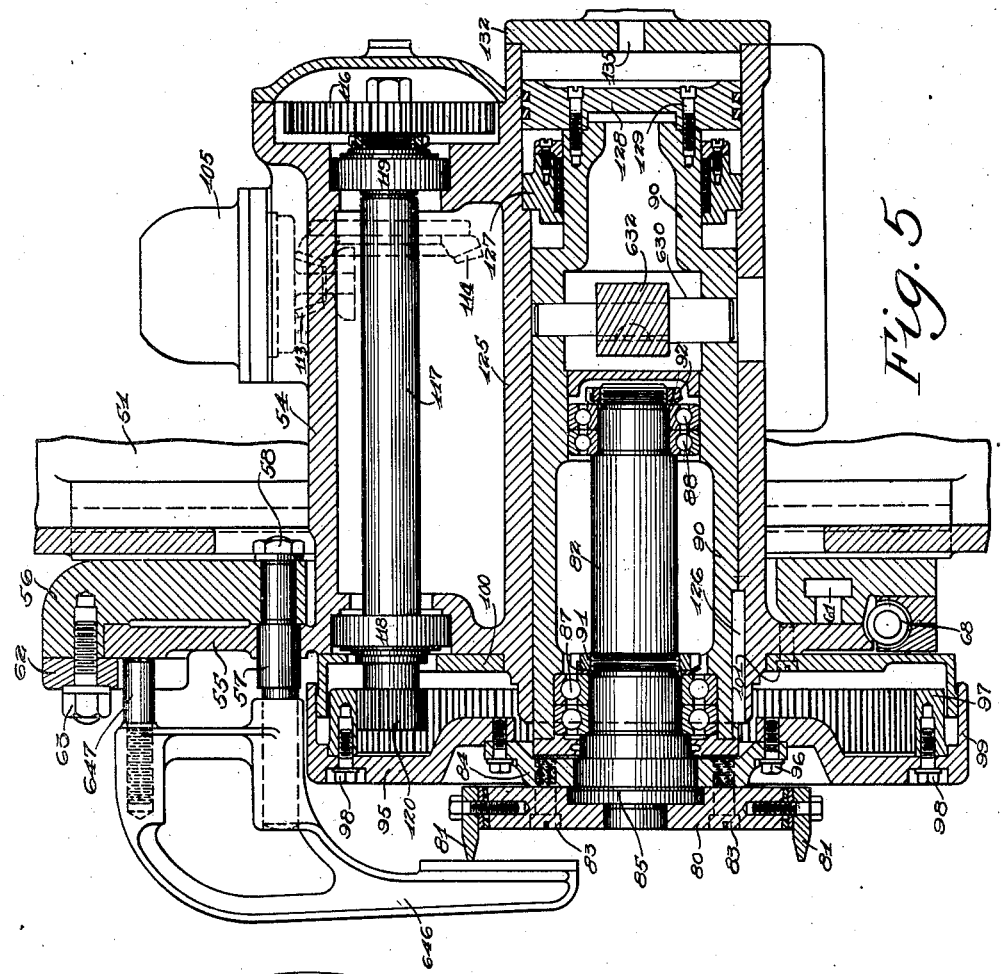
Figure 5 is a sectional view through the cutter support, showing parts of the drive to the cutter and of the mechanism for reciprocating the same to effect the alternate feed and withdrawal motions.

The cutting tool employed on the machine shown in the drawings is a face mill gear cutter of standard construction. The cutter 80, which is provided with a plurality of annularly arranged cutting blades 81, is mounted upon the cutter spindle 82 (Figs. 5 and 6). It is secured in position thereon by the screws 83 which thread into a plate 84 that surrounds the cutter spindle 82 and engages behind a collar 85 formed on the spindle 82.

The cutter spindle 82 is journaled in anti-friction bearings 87 and 88 mounted in a sleeve 90. Nuts 91 and 92 serve to hold the bearings 87 and 88, respectively, against shoulders formed on the spindle 82 to prevent axial movement of the bearings relative to the spindle. A disc 93 is secured to the inner end of the sleeve 90 in front of the bearings 87. This is all standard spindle construction and forms no part of the present invention.

95 designates a circular plate or drum which is secured by screws 96 to the plate 84. 97 designates an internal gear which is secured by screws 98 to the rear face of the drum 95. The periphery of the internal gear 97 is spaced from the internal wall of the flange 99 of the drum 95.

The sleeve 90 is mounted in the cutter support 54 for reciprocable movement therein in the direction of the axis of the cutter spindle 82 as will be hereinafter more particularly described. The cutter and the sleeve 90 are partially guided and supported in this movement by a drum member 100 which is secured by screws 101 to the face of the flange 55 of the tool support 54. The annular side wall 102 of the drum engages internally the side wall 99 of the drum 95.

The cutter 80 is rotated continuously on its axis to effect the cutting operation. The drive to the cutter is from a motor 105 (Figs. 3, 5 and 8) which is mounted upon a bracket 106 that is secured by bolts 107 to the cutter support 54. The motor 105 drives a shaft 109 (Fig. 9), which is journaled on suitable anti-friction bearings 110 and 111 in the tool support 54, through a pair of spiral bevel gears 113 and 114. The pinion 113 has a coupled connection with the motor 105 and the gear 114 is keyed to the shaft 109. The shaft 109 carries a spur gear 115 which meshes with and drives a spur gear 116 that is secured to a shaft 117 which is journaled in anti-friction bearings 118 and 119 in the tool support 54 in parallelism with the shaft 109. The shaft 117 carries at its inner end a spur pinion 120 (Figs. 3 and 5) which meshes with and drives the internal gear 97 and through the internal gear, the cutter. The internal gear 97 is of longer face as compared with the face width of the drive pinion 120 so that the drive to the cutter is maintained throughout the whole of the reciprocating movement of the sleeve 90.

There is a cam 121 (Fig. 9) secured by a set-screw 122 to the shaft 109. This cam operates, during rotation of the shaft 109, a plunger pump 123 of standard construction to pump lubricating oil out of the reservoir 124 in the cutter head to various parts of the cutter spindle drive.

Cutter feed mechanism

The sleeve 90 is reciprocated for the purpose of imparting to the cutter an alternate movement of feed and withdrawal with reference to the gear blank to be cut. On the feed stroke, the cutter cuts a tooth slot in the blank of the required depth and on the return stroke, the cutter is withdrawn from the blank a sufficient distance to enable the blank to be indexed. The tool support 54 is formed with a suitable cylindrical guide portion 125 in which the sleeve 90 reciprocates and the sleeve 90 is held against rotation in the guide portion 125 by a key 126 (Fig. 5).

The sleeve 90 is reciprocated by fluid-pressure. The sleeve is of reduced diameter at its inner end, passing through a stuffing-box 127, (Figs. 5 and 6). The stuffing-box may be of any suitable construction. It is secured by screws, not shown, to a shoulder formed internally in the sleeve-guide 125. There is a piston 128 secured to the inner end of the sleeve by screws 129. The inner end of the cylindrical guide portion 125 of the tool support 54 serves as a cylinder in which the piston 128 reciprocates. The inner end of the guide 125 is closed by a cap 132 which is secured to the guide by screws 133. Fluid pressure is admitted to and exhausted from one side of the piston 128 through ports 134 and 136 (Fig. 6) drilled in the cylindrical guide portion 125. Fluid pressure is admitted or exhausted from the other side of the piston 128 through a port 135 which is drilled in the cap 132.

Rear brace for tool support

To assist in carrying the weight of the tool support 54 and of the parts mounted therein and thereon, a brace 140 (Figs. 4 and 6) may be secured to the column 51 at its rear end by screws or bolts 141. There is an arm or bar 142 secured by bolts 143 to the cap 132 of the cylinder 125. This arm 142 is provided with a longitudinal T-slot 145. The brace 140 is provided with two parallel elongated slots 146 and 147. T-bolts 148 and 149 pass through these slots, respectively, and engage in the T-slot 145 of the arm 142. Thus the rear end of the tool support may be supported by the brace 140 in any adjusted position of the tool support.

The means which effects and controls the reciprocation of the sleeve 90 will be described later. We wish first to describe the work spindle and its mounting.

Work head adjustment

As already stated, the work head 52 is adjustable angularly on the base 50 of the machine. This adjustment is for the purpose of setting the blank in accordance with the root angle of the gear teeth to be cut. This angular adjustment can be effected by sliding the work head on the base of the machine and for this purpose, the work head is provided with an arcuate tongue 150 (Fig. 24) that engages in an arcuate T-slot 151 (Figure 2) formed in the upper face of the base 50 of the machine. The work head is secured in any adjusted position on the base 50 by bolts 152 (Figs. 1 and 2) which engage in the T-slot 151 and in a T-slot 154 also formed in the upper face of the base of the machine. The two T-slots 151 and 154 are curved about the same center which lies in the cutting plane of the machine and which corresponds to the apex of a bevel gear blank when such a blank is to be cut.

Chucking mechanism for the work

Figure 1:
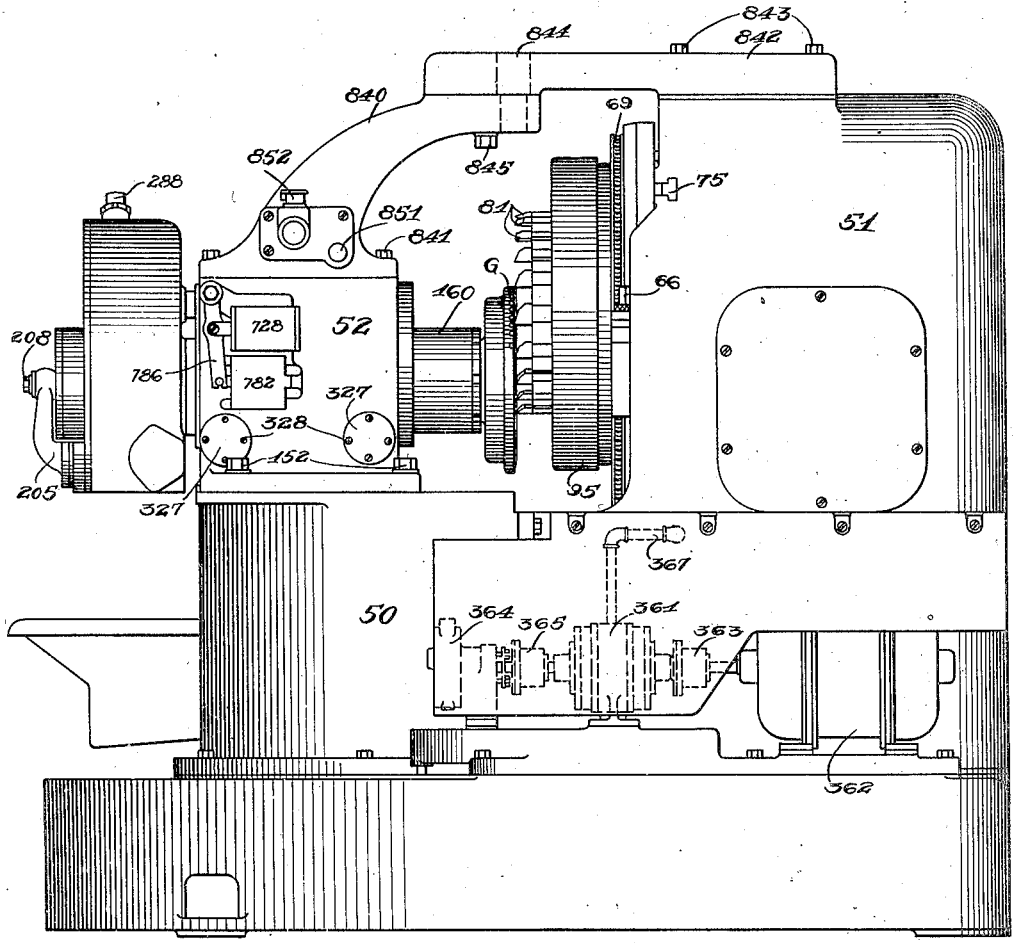
Figure 1 is a side elevation of a spiral bevel and hypoid gear cutting machine built according to a preferred embodiment of this invention.

The work spindle is designated at 160 (Figs. 1 and 24). It is rotatably and slidably mounted in the work head 52.

The gear blank G to be cut may be secured to the work spindle 160 in any suitable manner. In the drawings, the blank is shown mounted upon an arbor 162 which has a tapered stem that has a press-fit in a correspondingly tapered portion of the bore of the work spindle. The blank G is centered on the arbor by a centering disc 163 which fits over the nose of the arbor, surrounding the same, and which is secured to the arbor by screws 164. The gear blank G is held against rotation on the arbor by a pin 165 which engages in one of a series of holes 166 formed in the gear blank and in one of a series of holes 167 formed in the arbor.

The gear blank is clamped on the arbor by a clamping disc 169 and by a draw-bar 170 that is provided with a three-eared head 172. The clamping disc 169 has a central opening 173 from which extend three equi-spaced openings 174 (Fig. 25). The head 172 of the draw bar is formed with three equi-spaced ears 175 similar in shape to the openings 174 and adapted to pass through the openings 174 when the ears are in registry with the openings 174. When the clamping disc is rotated, however, so that the openings 174 are out of registry with the ears 175, as shown in Figure 25, and the draw-bar 170 is drawn back the gear blank is securely clamped to the arbor 162 and to the work spindle 160. The clamping disc 169 is provided with three spaced finger grip openings 176 so that the operator of the machine can grasp the disc 169 and readily turn the same to move its openings 174 into or out of registry with the ears 175 of the head 172.

The three-eared head 172 is threaded onto the draw bar 170 and is secured thereon against rotation by the set-screw 178.

The draw-bar 170 slides axially in the bore of the work spindle and in the bore of the arbor 162 and in the bore of a nipple 180 which is mounted in the bore of the work spindle. The nipple 180 may be press-fitted into a reduced portion of the bore of the work spindle or it may be secured in the bore of the work spindle in any other suitable manner so that it will not move relatively to the work spindle. The draw-bar 170 is normally urged into clamping position by a heavy coil-spring 182 which is interposed between the nipple 180 and a washer 183 that is mounted on the draw-bar at its inner end. The washer 183 is held in position by a nut 184 that threads onto the inner end of the draw bar. The chuck is released by application of fluid pressure to the inner end of the draw-bar 170 to move the draw bar forward against the resistance of the spring 182.

190 designates a cup-shaped member which is threaded onto the rear end of the work spindle 160 and is secured against rotation relative thereto by the set screw 191. The rear end of this cup-shaped member 190 is closed by a cap 192 which is secured to the cup-shaped member 190 by screws 193. The cap 192 is formed with a central opening through which passes a stud 194. The cap 192 is clamped between a shoulder or collar formed on the stud 194 and a nut 195 which is threaded on the stud.

The stud 194 serves as a support and guide for a piston 196 that slides in the cylinder formed by the cup-shaped member 190 and the cap 192. A hardened cap 197 is secured by screws 198 to the inner end of the piston 196. This cap 197 contacts with the rear end of the draw-bar 170. A suitable cup-washer 199 is secured by the disc 200 and screws 201 to the piston 196 to prevent leakage of the hydraulic motive-fluid along the piston.

Fluid under pressure is admitted to the rear face of the piston 196 and to the rear face of the cap 197, which is secured to the same, when it is desired to release the chuck. This causes the piston and cap to be moved forward, forcing the draw-bar 170 forward against the resistance of the spring 182 and enabling the operator to remove the clamping disc 169.

The pressure-fluid is conveyed to the piston and cap from a flexible hose 204 that is connected to an arm 205 which is mounted on the stud 194 and is held thereon by a disc 206, washer 207 and nut 208. The arm 205 is bored to provide a duct 210 that communicates through the opening 211 with a duct 212 drilled longitudinally in the stud 194. The duct 212 runs through the stud 194 to its front end. There is also an opening 213 which communicates with this duct within the cylinder formed by the cap 192 and the cup-shaped member 190 and at the rear of the piston 196.

The use of a hydraulic-release for a spring operated chuck is not new, but the construction employed in the present machine is novel and more efficient than constructions heretofore employed. It permits of application of fluid-pressure not only to the rear face of the piston 196 but also the rear face of the head 197 of the piston whereby the pressure fluid may operate over the maximum area, thereby increasing the amount of power which may be applied. With this construction, heavier springs may be employed for chucking and released so that the efficiency of the whole chucking mechanism is increased.

*Mechanism for moving work spindle to and from operative position*

The blank is moved from loading position into cutting position automatically and, after all of the teeth have been cut in the blank, is withdrawn again to loading position automatically to permit removal of the completed work-piece and chucking of a new blank. The mechanism for moving the blank from loading position into cutting position and back to loading position is hydraulically operated. It will be described now.

Adjustably secured to the work head 52 at one side of the same is a cylinder 220 (Figs. 2, 31, 32 and 33). There is a piston 221 reciprocable in this cylinder. The front end of the cylinder is closed by a suitable cap 223 which is secured to the cylinder in any desired manner. The rear end of the cylinder is closed by a cap 224 which includes a stuffing box of suitable construction. This cap 224 is secured to the cylinder by screws 225 (Fig. 31). The piston rod 226 which is secured to the piston 221 by a nut 227 passes through the cap 224 and the stuffing-box carried by the same.

This piston-rod is secured at its rear end by means of a nut 228 to the guard 229 that encloses the indexing mechanism of the machine. This guard is secured against a shoulder on the work spindle 160 (Fig. 24) by means of a clamping ring or washer 230 in such way that the work spindle and guard move together.

To withdraw the work spindle to loading position, the motive fluid is admitted to the front end of the piston 221 through the pipe 235 (Figs. 31 and 32) and the port 236. The motive fluid is admitted to the other end of the piston 221 through a pipe 237 and the port 238 to move the work into operating position.

The ports 236 and 238 are spaced substantial distances from the ends of the cylinder 220 and a by-pass is provided in connection with each line to exhaust the corresponding end of the cylinder when the piston 221 has moved in either direction in the cylinder far enough to close the port 236 or the port 238, as the case may be. Thus, the line 235 is connected with the very end of the cylinder 220 through the duct 240, the duct 241 and the duct 242. The ducts 241 and 242 are in the cover-plate 223 of the cylinder. The result of this construction is that when the piston 221 is moving forward, that is, toward the duct 242, it will first shut off the port 236. Then the motive fluid will have to by-pass through the duct 242, the duct 241 and the duct 240 to the line 235. Hence, the last portion of the forward movement of the piston 221 will be cushioned. On the other side of the piston, the cushioning is through the duct 250, the duct 251 and the duct 252 that leads to the line 237. The duct 250 opens into the cylinder 220 on the rear side of the piston 221.

To guide the spindle 160 in its movement to and from operating position, there is a bar provided at 256 (Figs. 24 and 31). This bar is secured to the index-guard by a nut 257. It slides in a cylindrical guide 258 formed in the work head.

*Means for adjusting work spindle*

The adjustment of the gear blank for cone-apex position is accomplished by adjustment of the cylinder 220 and with it the work spindle 160 relative to the work head 52. There is a rack 260 (Figs. 28 and 31) secured to the inner face of the cylinder 220. Journaled in the work head 52 is a stub-shaft 262. This shaft carries at its lower end a pinion 264 which meshes with the rack 260. The cylinder 220 is adjustably secured to the work head 52 by T-bolts 266 (Fig. 28) whose heads engage in parallel T-slots formed in the side face of the work head.

When the T-bolts 266 are loosened and the stub-shaft 262 is rotated, the cylinder 220 is adjusted axially relative to the work head, thereby adjusting the work spindle 160 axially in the work head to adjust the cone apex position of the gear blank to be cut. After adjustment, the T-bolts 266 are tightened up again, so that the hydraulic mechanism for moving the work spindle to and from loading position may function. The rack 260 is graduated, as clearly shown in Figure 31, to permit of accurately effecting the adjustment described.

Index mechanism

The machine shown in the drawings is for roughing or form cutting spiral bevel and hypoid gears without a generating roll. During the cutting operation, the work spindle is held stationary and it is only rotated for indexing. The indexing mechanism is of the notched-plate type and will now be described.

Keyed to the work spindle 160, as by means of a key 270 (Figs. 24 and 26), is a plate 272 having a beveled peripheral surface. 273 designates a notched ring which has a correspondingly beveled inner surface and which is removably secured to the plate 272 by an annular gib 274 which is held in position by the screws 275 and nuts 276. A ring 273 is selected which has a number of notches 278 equal to the number of teeth which it is desired to cut in the gear blank. The sleeve portion of the plate 272 acts as a spacer between the cup-shaped member 190 (Fig. 24) and the clamping disc 230 and serves to hold the disc 230 and the index guard 229 in position on the work spindle.

Pivotally mounted on a stud 280 that threads into the index guard 229 (Figs. 24 and 26) is a lever arm 282. The index locking dog 284 is secured to this lever arm by screws 285. The lever arm 282 is normally urged into position, where the locking dog 284 will engage in a notch 278 of the index ring 273, by a spring pressed plunger 287. This plunger slides in a thimble 288 that threads adjustably into a nut 289. The nut 289 fits into an opening provided therefor in the index guard 229. The coil spring 290 serves to hold the plunger 287 in engagement with the lever 282 and the locking dog 284 in engagement with the index ring. The nut 291 serves as a lock nut and as a means for adjusting the tension of the spring 290.

Journaled on the sleeve portion 292 of the plate 272 (Fig. 24) is a sleeve 293 with which is formed integral the arm 294 and the segment 295 (Fig. 26). Pivotally mounted at 296 on the arm 294 is a pawl 297. This pawl is continuously pressed into position to engage one of the notches 278 of the index ring 273 by a spring-pressed plunger 298 which is housed in the arm 294. The pawl 297 is held retracted from engagement with the index ring 273, as long as the locking-dog 284 is in engagement with this ring, by the cam surface 302 formed on the lever-arm 282 and which engages the roller 299 that is secured by the pin 300 to the tail of the pawl.

The lever arm 282 carries a pin 304 which is adjustably held in position therein by the clamping bolt 305.

There is a rocking cam member 306 pivotally mounted at 307 in the arm 294. This cam member is resiliently held in outward position, in position to engage the pin 304, by a plunger 308 which is housed in the arm 294 and is actuated by the coil spring 309.

The indexing mechanism is operated by movement of a piston 310 which reciprocates in a cylinder 312 formed integral with the index guard 229 (Figures 24, 26 and 27). There are rack teeth 314 cut into the upper side of the piston 310. These teeth mesh with the teeth of the segment 295 to rock the arm 294 about the work spindle when the piston 310 is reciprocated.

When the piston 310 is moved to the right from the position shown in Figure 26, the arm 294 is rocked to the left, bringing the cam member 306 into engagement with the pin 304. This rocks the lever arm 282 upwardly about its pivot stud 280 and withdraws the locking dog 284 from engagement with the index ring 273. The upward movement of the lever 282 disengages the cam surface 302 from the roller 299 and allows the pawl 297 to drop into engagement with that notch 278 of the index plate from which the locking dog 284 has just been withdrawn. In the continued movement of the piston 310 to the right, the pawl 297 ratchets the index ring 273 around in a counter-clockwise direction, the locking dog 284 meantime riding on the periphery of the index ring. When the index ring has been rotated far enough to bring the locking dog 284 into registry with another notch 278 of the index ring, the locking dog drops into this new notch, causing the cam surface 302 to engage the roller 299 and retract the pawl 297 from engagement with the indexing ring, thus completing the indexing operation.

The index mechanism is reset by movement of the piston 310 back to the position shown in Figure 26. On this movement, the cam 306 rocks on its pivot pin 307 out of the way of the pin 304 without lifting the lever 282.

The movement of the piston 310 is fluid-pressure operated and controlled. The mechanism which controls and operates the same will be described more particularly hereinafter.

Means for clamping the work spindle during cutting

As the work is stationary during cutting and as the teeth are cut simply by depthwise feed of the cutter, the work spindle is subjected during cutting to a greater torsional strain than is the case with a work spindle in a generating machine. In order to hold the work spindle rigidly during cutting and so to insure accuracy of tooth spacing in the gear which is to be cut, we have provided, in addition to the index lock-mechanism, an auxiliary clamping mechanism. This auxiliary clamping mechanism is in the form of two pairs of clamps which operate directly upon the work spindle.

Each pair of clamps comprises two clamping blocks 320 and 321 (Figs. 24, 27 and 28). The forward pair of blocks slide in a cylinder 322 formed in the work head 52 and the rear pair of blocks slide in a cylinder 324 formed in the work head parallel to the cylinder 322. The two blocks 320 and 321 of a pair are in alignment. The upper faces of these blocks at the adjacent ends of the blocks are turned on a circle to provide arcuate surfaces of the same curvature as the periphery of the work spindle 160. Thus, when the two blocks of a set are forced toward each other, they exert a clamping action on the work spindle to hold the work spindle rigidly against rotation. The blocks are normally urged into released position by springs 325. Each spring is interposed between the two blocks of a pair and is housed in aligned recesses formed in the opposed faces of the blocks of the pair.

The outer ends of the two cylinders 322 and 324 are closed by cap-plates 327 which are secured in position on the work head by screws 328. The clamping blocks 321 and 320 are forced into and held in clamping position by fluid pressure as will hereinafter be more particularly described. Leakage along the blocks is prevented by the cup-washers 329. These are secured in position on studs 330 formed integral with the blocks by the discs 331, lock washers 332 and nuts 333.

Hydraulic control block

The feed and withdrawal motions of the sleeve 90 which carries the cutter spindle, the speed of the feed, the lock-up and release of the work spindle, and the indexing operations are all controlled from a series of valves which are housed in a control-block 340 (Figs. 4, 8, 13, 14, 15, 16, 17 and 18). The control block 340 is secured to the cutter support 54 by bolts 341 (Fig. 12) which pass through holes 342 (Fig. 14) in the control block and thread into the cutter support.

The control block contains the control valve 345 (Figs. 10, 17 and 18), the reverse valve 346 (Figs. 16 and 18), the throttle valve 347 (Fig. 17), the reverse trip valve 348 (Fig. 16) and a pair of aligned valves comprising a sliding check valve 349 and a tappet valve 350 (Fig. 23).

Figure 12:
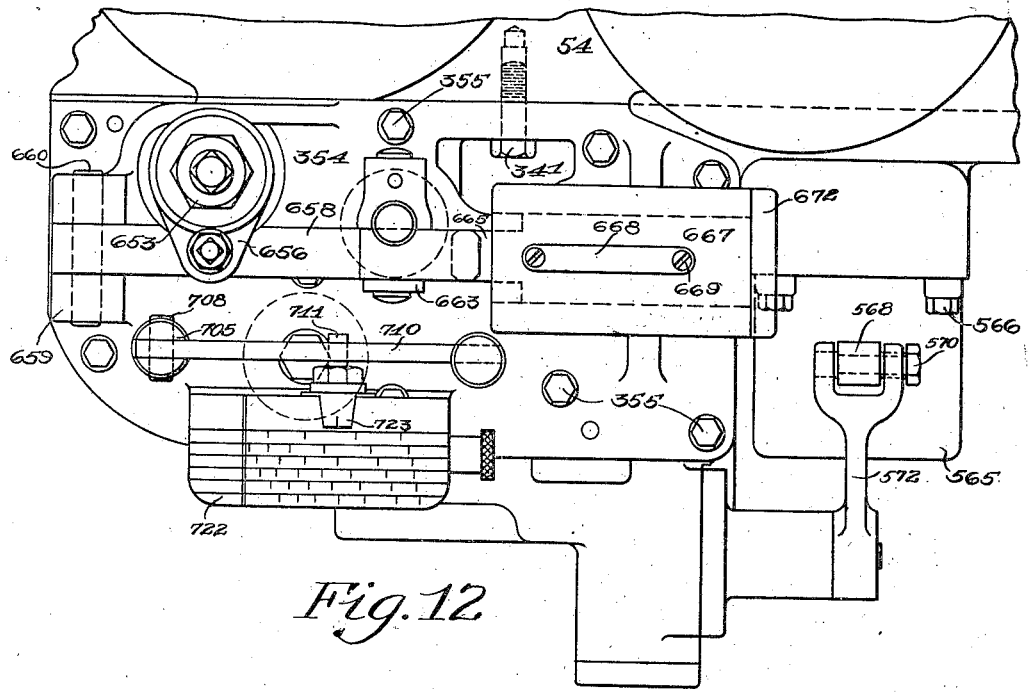
Figure 12 is a fragmentary end elevation of the cutter support, showing details of the mechanism for operating the reverse and control valves and for setting the throttle valve.

The inner end of the control block 340 is closed by a plate 352 which is secured in position by bolts 353. The rear end of the control block is closed by a plate 354 which is secured in position by bolts 355 (Figs. 12 and 15).

A suitable fluid medium such as oil is used for actuating the various fluid-pressure operated parts of the machine. The motive fluid is pumped from a sump 360 (Fig. 3) in the base of the machine by an oil pump 361 (Figs. 1 and 2) of any suitable construction, which is driven by the motor 362 through the flexible coupling 363. The motor 362 also drives the cutting oil or coolant pump 364 which is coupled by the flexible coupling 365 with the power pump 361. The cutting oil or coolant is conducted to the point of engagement of the cutter with the blank through suitable piping not shown.

Figure 4:
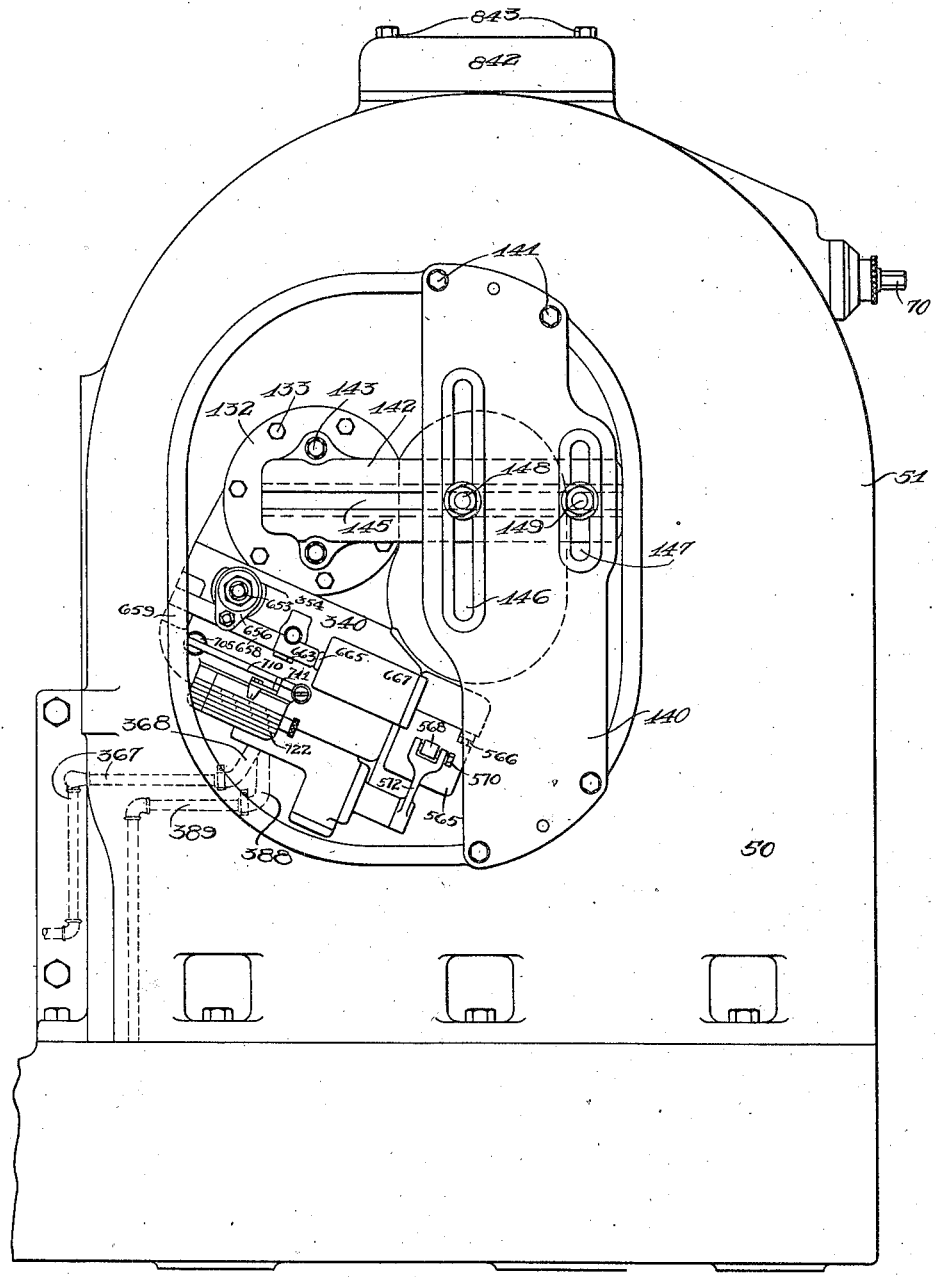
Figure 4 is an end elevation of the cutter end of the machine.

The motive fluid is conducted from the pump 361 to the control block 340 through piping 367 (Figs. 1, 2 and 4) and the flexible hose 368 (Figs. 4 and 16). A relief valve 369 (Fig. 40) of any suitable construction is provided in the line 367 and acts as a safety by-pass back to the sump.

Motive fluid flowing through the hose 368 enters the control block 340 through the duct 372 and a duct 374 which leads into the chamber 375 of the control valve 345, through ports 376 in the sleeve 377 which surrounds the control valve and in which the control valve slides (Figs. 13 and 18).

The motive fluid exhausts from the chamber 375 of the control valve through the ports 380 and 381 in the sleeve 377, the duct 382 in the control block which connects these ports at one side of the sleeve (Figs. 14 and 17), the duct 384 (Fig. 13) which leads from one of the ports 381, the duct 385 (Figs. 13 and 18), the duct 386, the duct 387 (Figs. 13 and 15), the flexible hose 388 and the piping 389 which leads back to the sump.

The control valve 345 is formed at its ends with guide surfaces 390 and 391, respectively, of enlarged diameter. These serve to guide the valve in its reciprocatory movement in the sleeve 377. Between these guide surfaces, the valve has two other spaced guide portions or collars 392 and 393.

The control valve 345 controls the movement of the reverse valve 346 while the reverse valve controls the movement of the sleeve 90 which carries the cutter spindle 82. The reverse valve is formed with five spaced collars or guide surfaces 395, 396, 397, 398 and 399. One of these, 396, has its rear face beveled off for a purpose which will appear hereinafter.

The reverse valve 346 is reciprocable in a sleeve 400. The motive fluid enters the chamber 402 (Figs. 16 and 18) of the reverse valve through the duct 372 which leads from the duct 374, the duct 403, and the ports 404 in the sleeve 400. The motive fluid exhausts from the chamber 402 through the ports 405 in the sleeve 400 which leads into the duct 385 and through the ports 406 which lead into a duct 407 that communicates with the return duct 387 (Figs. 15 and 18).

Connections between the control and reverse valves

The chamber 375 of the control valve 345 is connected with the chamber 402 of the reverse valve 346 through two lines which lead, respectively, to opposite ends of the reverse valve. One line leads from the ports 410 in the sleeve 377 through the ducts 411 (Figs. 14 and 18) and 412 in the control block to a duct 413 (Figs. 15 and 16) in the cover plate 352. Thence, it passes through the ball-check valve 415 (Figs. 16 and 18) in the cover plate 352 to a duct 416 that communicates with the chamber 402 through the ports 418 in the sleeve 400. The other line leads from the port 420 in the sleeve 377 (Figs. 13, 14 and 18) through the ducts 422, 423, and 424 and the ports 426 in the sleeve 400 into the valve chamber 402.

The ball-check valve in the line 413 to the front end of the reverse valve comprises the ball 415, a coil spring 430, which holds the ball resiliently in closed position and a screw 431 which threads into the cover plate 352 and which is adjustable to control the amount of opening of the check-valve.

It will be seen from the preceding description that by reversing the control valve 345, fluid pressure may be applied to one or the other end of the reverse valve 346 through the ports 418 or the ports 426 to move this valve in opposite directions.

The manner in which the reverse valve controls the movements of cutter feed and withdrawal The reverse valve 346 is connected with opposite sides of the piston 128 (Figs. 5 and 6) which reciprocates the sleeve 90 to alternately feed the cutter into depth and withdraw it for indexing.

On the feed side of the piston 128, the reverse valve 346 is connected with the cylinder 125 through the ports 435 in the sleeve 400, the duct 436, the duct 437, the duct 438 (Figs. 13, 15, 16, 18 and 23), the piping 439, and the port 135 (Fig. 6) in the cap 132 of the cylinder which houses the piston 128.

When the line just described is on supply, the motive fluid may also pass from the duct 438 through ports 442 (Fig. 23) in the sleeve 443 in which the check valve 349 slides. Normally this valve remains closed, but if the cutter strikes a hard spot in the blank, the pressure in the duct 438 will rise, forcing this valve open against the resistance of the coil spring 445 and the motive fluid will then by-pass through the ports 446 in the sleeve 443, the duct 447 in the control block, the ports 134 and 136 in the cylinder 125 and through the line 474 back to the sump, as will be described hereinafter. Thus, feed of the cutter against the blank is stopped and probable damage to the cutter is prevented.

The tension of the spring 445 of the check valve 349 (Fig. 23) can be adjusted by the screw 448 which threads into the end plate 354 of the control block, and against whose head 449, one end of the spring seats. To prevent oil, which may leak along the valve 349, from pocketing behind the valve and acting as a dash-pot to resist movement of the valve, ports 450 are provided in the sleeve 443 and these are connected with the duct 447 by the elongated peripheral groove 451 cut externally in the sleeve 443.

There is another line leading from the reverse valve to the cylinder 125 at the front end of the piston 128. This line includes the port 452 (Figs 15 and 18) in the sleeve 400 of the reverse valve and the duct 453 which leads from the reverse valve. Thence, the line passes around the cylindrical groove 455 cut in the sleeve 456 in which the throttle valve 347 slides (Figs. 15 and 17), into the duct 458. Thence, the fluid flows through the ducts 459 into the ports 460 (Figs. 15 and 23) in the sleeve 462 in which the tappet valve 350 slides.

When the line just described is on supply, the tappet valve 350 is forced open against the resistance of the spring 464. The pressure fluid then passes through the ports 465 in the sleeve 462 into the duct 467 (Figs. 13, 15 and 23), through the duct 468, and the duct 469 (Fig. 17) into the ports 470 in the sleeve 456 of the throttle valve 347. Thence the pressure fluid flows through the ports 470 into the duct 472 (Figs. 13, 14 and 15), the duct 473, and the duct 474 into the port 136 (Fig. 5) of the cylinder 125 thus applying fluid pressure to the front end of the piston 128 to cause the cutter to be withdrawn from engagement with the work.

When the port 136 is on exhaust, the motive fluid flows back through the line 474, the duct 473, the duct 472 and ports 470 into the chamber of the throttle valve. Thence, it flows back through the ports 470, duct 469, duct 468, duct 467 and ports 465 (Fig. 23) into the chamber of the tappet valve 350, but it cannot escape through the tappet valve for the tappet valve is forced closed both by the spring 464 and the pressure of the exhaust fluid. The exhaust fluid flows back, therefore, through the slot 477 in the sleeve 456 of the throttle valve (Fig. 17) to the duct 453 (Figs. 15 and 18) and thence through the ports 452 into the chamber 402 of the reverse valve. At this time, the area of the opening of the slot 477 is controlled by the throttle valve, as will be more fully explained hereinafter and the speed of movement of the piston 128 and of the cutter into depth is controlled by the movement of the throttle valve.

The tension of the spring 464 (Fig. 23) can be adjusted by the screw 478 which threads into the end plate 352 of the control block and against whose head 479, one end of the spring seats.

In the position shown in the figures, the duct 453 is on supply, the pressure fluid flowing from the ports 404 in the sleeve of the reverse valve Figs. 15, 16 and 18) through the chamber 402 and out the ports 452 into the duct 453. Thence it flows around the peripheral groove 455 in the sleeve 456 of the throttle valve 347 (Fig. 17), through the duct 458 (Fig. 15) and the duct 459 into the ports 460 (Fig. 23) in the sleeve 462 of the tappet valve 350. Thus, the tappet valve is forced open against the resistance of the spring 464. The motive fluid then flows through the ports 465 in the sleeve 462 into the duct 467 (Figs. 13, 15 and 23) whence it flows through the ducts 468 and 469 (Figs. 15 and 17) and the ports 470 in the sleeve 456 of the throttle valve into the duct 472 (Figs. 13, 14 and 15). Thence it flows through the duct 473, and the duct 474 to the port 136 (Figs. 5 and 6) leading to the front end of the piston 128. Thus, fluid pressure is applied to the front end of the piston 128 causing the cutter to be withdrawn from engagement with the work.

While this is taking place, the motive fluid is being exhausted from the rear end of the piston 128 through the port 135 in the cap 132 and the piping 439 into the duct 438 (Figs. 15, 18 and 23). As this is exhaust fluid, the spring 445 exerts enough pressure to hold the check valve 349 shut. The exhaust fluid flows, therefore, through the duct 437, the duct 436 and the ports 435 (Fig. 18) in the sleeve 400 of the reverse valve into the chamber 402 of the reverse valve.

Figure 18 shows the position of the reverse valve when the work head is at the loading position. When the work head is moved into operative position, the reverse valve 346 will be moved to the left, as will be hereinafter described, and the exhaust fluid then passes through the ports 406 into the line 388 leading back to the sump.

When the reverse valve is moved full to the left from the position shown in Figure 18, the pressure fluid will flow from the ports 404 through the chamber 402 of the reverse valve out the ports 436, the duct 437, the duct 438 (Figures 15, 18 and 23), and the piping 439 to the port 135 in the cap 132 of the cylinder 125 to force the piston 128 forward to feed the cutter into the work. At the same time, the pressure fluid flows from the duct 438 through the ports 442 in the sleeve 443 of the check valve 349, forcing the check-valve open against the resistance of the spring 445. Thence the pressure fluid passes through the ports 446 in the sleeve 443 into the duct 447 in the control block and thence through the port 134 in the cylinder 125 to apply a steadying resistance to the feed movement of the cutter.

The fluid exhausts from the port 136 through the line 474 (Figs. 13, 14, and 15), the duct 473, the duct 472 and the ports 470 into the chamber of the throttle valve 347 (Fig. 17). The exhaust fluid cannot escape through the duct 469, the duct 468, the duct 467 and the ports 465 of the tappet valve 350 (Fig. 23) for the tappet valve is forced closed both by the spring 464 and the pressure of the exhaust fluid. The exhaust fluid must flow back, therefore, through the opening 477 (Fig. 17) in the sleeve 456 of the throttle valve to the duct 473 (Figs. 15 and 18) and thence through the ports 452 into the chamber 402 of the reverse valve exhausting thence through the ports 405 to the sump.

The area of opening of the slot 477 (Fig. 17) is controlled all during the feed movement by the throttle valve 347 which is moved by the piston 128 in its feed movement, as will hereinafter be described. By throttling the exhaust and effecting the feed of the cutter through the differential of pressure existing on the two sides of the piston 128, the steady chatterless feed is obtained which is essential to a smooth cut.

Connections between the reverse valve and the index piston

The movement of the reverse valve controls the indexing operation and the clamping and unclamping of the work spindle in a manner which will now be described.

The chamber 402 of the reverse valve is connected with one end of the index piston 310 (Figs. 24, 26 and 27) through the ports 480 in the sleeve 400 of the reverse valve (Figs. 15 and 18) the duct 482, the piping 483 which is enclosed in the base of the machine, the flexible hose 484 (Figs. 29 and 30), which passes through the arcuate slot 485 in the base of the machine, and the duct 486 in the work head 52. There is a tube 487 which telescopes into the duct 486 and this tube is connected with a duct 488 (Figs. 26 and 27) that leads into the end-cap 490 that closes one end of the chamber 312 in which the index piston 310 reciprocates.

The chamber 402 of the reverse valve is connected with the opposite end of the index piston 310 through the ports 426 (Fig. 18), the piping 491 which is enclosed in the base of the machine, and the flexible hose 492 (Figs. 29 and 30) which passes upwardly through the slot 485 in the base 50 of the machine. Thence the connection is through the bore 493 in the work head 52, the tube 494 which telescopes in this bore and the duct 495 (Figs. 26 and 27) through the end-cap 497 that closes one end of the chamber 312 in which the index piston 310 reciprocates.

There is a supply line branching from the line 367 (Figs. 1 and 4) which leads directly from the fluid pump 361. This line is connected through the flexible hose 499 (Figs. 29 and 30) with the bore 500 in the work head. The tube 501 telescopes in this bore and leads into the duct 502 (Figs. 26 and 27) that connects with the duct 503. Thence the connection is through the duct 504 to the peripheral slot 505 cut in the sleeve 506 in which the index piston 310 slides. Thence it is through the ports 508 in the sleeve 506 into the chamber 312 of the index piston.

There is an exhaust line leading from the chamber 312 of the index piston 310 through the ports 510 of the sleeve 506, the peripheral slot 511 in the sleeve, the duct 512, the duct 513, the tube 514 (Figs. 29 and 30), the bore 515 into which the tube telescopes and the flexible hose 516 back to the sump.

How the index piston acts as a valve controlling the work spindle clamps

The index piston in its movement not only operates the index mechanism but acts, also, as a valve controlling the clamping and unclamping of the work spindle 160. Thus the chamber 312 of the index piston is connected through one of the ports 508 in the sleeve 506, (Figs. 26 and 27) with the duct 520. This duct leads into the peripheral groove 521 in the sleeve 506 and this groove connects with a duct 522 that leads into a duct 523. The duct 523 connects with a duct 524 which communicates through the tube 526 with the bore 527 of the work head (Figs. 29 and 30).

The chamber 312 of the index piston is also connected with the bore 527 through one of the ports 510 (Figs. 26 and 27), the duct 528, the peripheral groove in the sleeve 506, the duct 530, the duct 531 and the duct 532 which leads into the duct 524.

The bore 527 communicates through a duct 535 (Figs. 24 and 30) with a transverse duct 536 (Figs. 27 and 30). This duct 536 leads at opposite ends into ducts 537 and 538, respectively, which lead, respectively, to opposite ends of the two sets of clamping blocks 320 and 321.

As will be seen from the preceding description, when the reverse valve 346 (Fig. 18) has been moved far enough to the left, the pressure fluid coming from the chamber 375 of the control valve 345 through the line 413 will pass from the ports 418 through the ports 480 into the duct 482 (Figs. 15 and 18). Thence it will flow through the piping 483, the flexible hose 484 (Figs. 29 and 30), the duct 486 and the tube 487 into the duct 488 (Figs. 26 and 27). From the duct 488 it flows through the end cap 490 into the chamber of the index piston 310 forcing the index piston to the right from the position shown in Figures 26 and 27. This will cause the rack 314 to rotate the segment 295 and effect indexing of the work spindle.

As the index piston moves to the right, it uncovers the ports 508 in the sleeve 506, allowing the pressure fluid from both the line 504 and the duct 588 to flow through one of these ports into the duct 520. Thence it flows around the peripheral groove 521 in the sleeve 506 into the duct 522. Thence the pressure fluid flows through the ducts 523 and 524 (Figs. 26 and 27) into the tube 526 and bore 527 (Figs. 29 and 30). Thence it flows through the duct 535 (Fig. 24) into the ducts 536 (Fig. 27) and into the ducts 537 and 538, causing the two sets of clamping blocks 320 and 321 to engage and grip the work spindle.

The ports 508 are so located that the indexing operation will have been completed before the work spindle is locked up and clamped by the clamping blocks. Moreover, before the ports 508 are opened to supply, the port 510 in the sleeve 506 will have been closed, shutting off the line 532 which communicates with the bore 527. Thus, the line to the clamps will be closed to exhaust before it is put on supply.

The ports 510 remain closed throughout the rest of the movement of the index piston to the right. As this piston moves to the right, the fluid in the right end of the chamber 312 will exhaust through the line 495 (Figs. 26 and 27) the tube 494, the bore 493, the flexible hose 492 (Figs. 29 and 30) into the piping 491. Thence the flow is through the ports 426 (Fig. 18) of the reverse valve into the lines 424 and 423 (Figs. 14 and 18), whence the connection is through the ports 420 of the sleeve 377 of the control valve 345 and the ports 381 of this sleeve to the line 385 which leads back to the sump.

When, on the other hand, the right end of the index cylinder 312 is put on supply from the line 493 (Figs. 29 and 30) through the tube 494 and the duct 495 (Figs. 26 and 27), the index piston 310 is moved to the left back to the position shown in Figures 26 and 27. In its movement to the left it will first reset the indexing mechanism through rotation of the segment 295 and arm 294 back to the position shown in Figure 26. Then it will close the ports 508 in the sleeve 506, thus shutting off supply to the work spindle clamps 320 and 321. Immediately after that, it will open the ports 510 allowing the fluid to exhaust from the cylinders 322 and 324 through the ducts 537 and 538 (Figs. 24 and 27), the duct 536, the duct 535, the bore 527, the tube 526, the duct 524, the duct 532, (Figs. 26 and 27), the duct 531, the duct 530, the groove 529 and the duct 528. This allows the springs 325 to release the work spindle clamps 320 and 321, unclamping the spindle. Thus, the spindle is released so that it can be indexed on the

The lock plungers for the reverse valve and the means for releasing the same

When the work spindle is in loading position, the reversing valve 346 is locked in the position shown in Figures 16 and 18 by a stop-plunger 550. The inner end of this plunger is beveled to engage the beveled surface of the guide-portion 396 of the reverse valve.

The plunger 550 slides in a suitable hole drilled in the control block and through an opening 551 in the sleeve 400 that surrounds the reverse valve.

The locking up of the reverse valve by the plunger 550 is a safety measure, preventing operation of the feed or index mechanisms while the work spindle is at loading position. When the gear blank to be cut has been chucked on the work spindle, the cutter drive motor is started up and the work spindle is moved into operating position by movement of the piston 221 (Fig. 31) inwardly. In this movement, a nut 555, which is adjustably threaded on the piston rod 226, strikes the roller 556 (Figs. 32 and 33) carried by the switch arm 557 of a normally open electrical switch 558. This closes the switch. The switch is secured by screws 559 to a sleeve 560 that surrounds the piston rod 226. The sleeve is secured by screws 562 to the packing-box and cap 224 of the cylinder 220 in which the piston 221 slides.

The switch 558 is connected electrically with a solenoid 565 (Figs. 12, 20 and 21). This solenoid is mounted beneath the tool support 54, being secured thereto by bolts 566. The plunger 568 of the solenoid carries at its outer end a pin or bolt 570. The bolt 570 engages in slots in the furcated ends of an arm 572 which is keyed to a crank shaft 573. The crank shaft 573 is journaled in a bracket 574 which is secured by screws 575 to the control block 340. The inner end of the shaft 573 is formed as a crank-disc 576 and this carries the crank pin 577. There is a roller 578 carried by the crank pin which passes through a slot 579 formed in the plunger 550 and engages in a recess formed in an auxiliary plunger 580 housed in the bore 582 of the stop plunger 550.

The auxiliary plunger 580 is normally pressed upwardly by a coil spring 582 which is interposed between the bottom face of the plunger 580 and a cap-plate 583. The cap plate 583 is secured by screws 584 to the control block 340 and closes the bore in which the plunger 550 slides.

As clearly shown in Figure 16, the slot 579 is of greater width from top to bottom than the diameter of the roller 578 which is carried by the crank pin 577. When the electric switch 558 (Figs. 32 and 33) is closed, the solenoid 565 is energized. This causes the plunger 568 of the solenoid to be drawn to the right from the position shown in Figure 20, rocking the crank shaft 573.

In the out position of the work spindle, there is fluid pressure on the reverse valve 346 through the ports 418 (Fig. 18), tending to shift the valve to the left from the position shown in Figure 18. This pressure puts a friction load on the plunger 550. During the first portion of the movement of the crank shaft 573, the roller 578 carried by the crank-pin travels in the slot 579 of the plunger 550 without engaging the walls of the slot. This is due to the enlarged size of the slot 579. When the roller actually strikes the bottom wall of the slot 579, the crank shaft will have sufficient momentum under actuation of the solenoid to snap the plunger 550 quickly and easily out of engagement with the reverse valve.

The plunger 550 is held out of engagement with the reverse valve during the whole cycle of operations comprising alternate cutting and indexing which are required to cut the gear blank, for, as long as the work spindle remains in operative position, the nut 555 (Figs. 31, 32 and 33) will hold the arm 557 of the switch 558 closed, maintaining the solenoid 565 energized. The reverse valve 346, as will hereinafter be described, will have been returned to the position shown in Figure 16 before the work spindle is returned to loading position. When the work spindle is moved to loading position, the nut 555 travels away from the roller 556, releasing the switch arm 557 and opening the circuit to the solenoid 565. The upward thrust of the plunger 580 on the roller 576 under actuation of the spring 582 will then rotate the crank pin 577 back to its starting position, thus returning the plunger 550 to locking position.

The plunger 550 is drilled at 586 and the plunger 580 is drilled at 587 so that any oil which may have leaked from the reverse valve chamber along the sides of the plunger 550, will not pocket in the bore, in which the plunger 550 slides, but can escape back into the chamber of the reverse valve on the withdrawal motion of the plungers 550 and 580. If the oil were allowed to pocket in the bore in which the plunger 550 slides, this oil would act as a dash-pot on the withdrawal motion of the plungers and would, therefore, resist the withdrawal movement of the plungers and the device would not function properly.

The crank shaft 573 is journaled in anti-friction bearings 588 in the bracket 574 (Fig. 21). The bracket 574 is also drilled to provide a pocket in which a cup-washer 589 or other suitable packing may be placed to prevent leakage of oil from the reverse valve chamber 402 along the shaft 573. If leakage does occur, however, the oil returns to the sump through the opening 590 in the sleeve and a suitable conduit such as the tubing 592.

There is another lock-plunger for the reverse valve 346. This plunger is part of the interlock between the feeding and indexing mechanisms. It functions periodically during the operation of the machine to hold the reverse valve at the right (Fig. 16) and through it, to hold the cutter in withdrawn position until an indexing operation has been completed and the work spindle reclamped.

This second lock-plunger is designated at 595 in Figures 16 and 19. It slides in aligned holes 596 and 597 drilled in the control block 340. It passes through aligned openings 598 and 599 in the sleeve 600, in which the trip valve 348 slides and it passes through an elongated opening 602 in the trip valve. It enters the chamber 402 of the reverse valve 346 through a slot 603 in the sleeve 400. Its inner end is beveled and is adapted to engage the beveled end of the collar or guide surface 396 of the reverse valve 346. It is set a little out of line with the lock plunger 550 to allow of a slight movement, for a purpose hereinafter to be described, of the reverse valve 346 to the left from the position shown in Figure 16 after the plunger 550 is released.

The trip valve 348 is cut away, as clearly shown in Figures 16 and 19, adjacent the slot 602 to provide beveled or wedge surfaces 605 on either side of the slot 602. The lock-plunger 595 is formed with beveled shoulders 606 which ride on the beveled surfaces 605 of the trip valve. The plunger 595 is normally urged into locking position and its beveled shoulders 606 are held in engagement with the beveled surfaces 605 of the trip valve by the coil spring 608 which is interposed between the plunger and a cap 609. This cap 609 closes the opening 596 in the control block and is secured to the control block by screws 610.

The trip valve 348 is constantly urged to the right in Figure 16 by a coil spring 612. This spring is mounted on the stem 613 of the trip valve. It is interposed between a washer 615 and a washer 616. The washer 615 is mounted on the stem 613 of the trip valve and abuts the end of the sleeve 600. The washer 616 is mounted on the stem 613 of the trip valve and the tension of the spring 612 can be adjusted by the nut 617 which threads onto the stem of the trip valve and controls the position of the washer 616.

There are ports 620 in the sleeve 600 of the trip valve. These are connected by the duct 621 (Figs. 13 and 16), the piping 622 and the flexible hose 623 (Figs. 24, 27, 29 and 30) with the duct 535 that leads to the work spindle clamps 320 and 321. Consequently, when the duct 535 is on supply, the pressure fluid also flows to the trip valve through the line just described. This forces the trip valve 348 to the left against the resistance of the spring 312, withdrawing the plunger 595 from engagement with the reverse valve 346 and allowing the reverse valve 346 to go full over to the left from the position shown in Figure 16 to reverse the piston 128 (Fig. 6) and feed the cutter into the gear blank.

As already described, the line 535 to the work spindle clamps is not put on supply until the indexing operation has been completed and until the index piston 310 in its movement to the right in Figures 26 and 27 has opened up the ports 508. Thus, the lock-plunger 595 (Fig. 16) cannot be withdrawn from locking position with reference to the reverse valve 346 until the indexing of the work spindle has been completed. At the same time that the plunger 595 is being withdrawn, the work spindle clamps are being locked up because the pressure fluid flows from the duct 535 (Figs. 26 and 27) simultaneously to the work spindle clamps and to the port 620 (Fig. 16) in the trip valve sleeve 600. Thus, while the reverse valve is being released the work spindle is being clamped and before the cutter engages the blank, the work spindle will be rigidly and securely held against rotation.

The plunger 595 is drilled, as indicated at 625 (Fig. 19) so that oil which leaks from either the chamber of the reverse valve 346 or the chamber of the trip valve 348 along the plunger 595 can escape back into the chamber of the reverse valve when the plunger is moved to released position. This prevents formation of a dash-pot in the hole 596 and thus insures free, easy and quick release of the plunger 595.

*How the reverse valve is shifted automatically in the feed and withdrawal movements of the cutter*

The functioning of the machine is controlled primarily by the movement of the reverse valve 346 and the movement of this valve is controlled primarily by the positioning, that is, by the movement of the control valve 345 (Fig. 18). The movement of the control valve 345 is controlled by the movement of the piston 90 (Figs. 5 and 6), that is, by the movement of the cutter itself into and out of depth. This will now be described.

Pivotally mounted in the piston 90 at a point intermediate its length is a pin 630 (Figs. 5, 6 and 8). Keyed to this pin is a lever 632. One end of this lever is held in fixed position during the operation of the machine. The other end moves about this fixed end as a fulcrum, the power being applied at the center of the lever through the pin 630 from the movement of the piston or sleeve 90.

The fixed end of the lever is furcated to provide a pair of ears 633 (Figs. 6, 7 and 8). These engage in recesses formed at either side of a block 635 which is really a nut adjustable on the threaded outer end of a shaft 636. The shaft 636 is journaled in anti-friction bearings 637 and 638 in a bore 140 drilled in the cutter support 54. The shaft extends through an opening in a cap 641 which closes the bore 640 and is secured by screws 642 to the cutter support 54, the threaded end of the shaft extending outside the bore 640.

The shaft 636 is rotatable by rotating a stub-shaft 643 which is journaled in the cutter support 54. There is a bevel gear 644 keyed to this stub-shaft and this bevel gear meshes with a bevel gear 645 keyed to the shaft 636. By rotation of the shaft 643, therefore, the nut or block 635 can be adjusted along the shaft 636 to thereby adjust the position of the fixed end of the lever 632. This adjustment is for the purpose of adjusting the cutter axially after sharpening to compensate for the reduced height of the cutting blades. Once adjusted, however, the position of the block 635 remains fixed during the ensuing operation of the machine.

A cutter-height gage 646 (Fig. 5) of standard construction is furnished with the machine for the purpose of setting the cutter to correct cutting depth. This gage is constructed to pivot on the stud 57 and carries a guiding stud 647 that engages the inner surface of the arcuate gib 62.

The free end of the lever 632 moves in a slot 648 (Fig. 6) in the head 649 of a bar 650. This bar is mounted for sliding movement in a hole drilled in the tool support 54. There is a member 652 secured to the rod 650 at its rear end for movement with the bar. The member 652 is secured against a shoulder on the bar by a nut 653 and a lock washer 654.

This member 652 is provided with a pair of spaced depending ears 656. These straddle a lever 658 (Figs. 12, 14 and 10) which is pivotally mounted between ears 659 formed on the end plate 354 of the control-block 340. The pin 660 acts as a pivot for this lever.

The free end of the lever 658 engages in a slot 662 (Figs. 10, 14 and 17) of the stem 663 of the control valve 345. This stem 653 extends through an opening in the end plate 354 of the control block.

It will be seen, then, that as the sleeve 90 moves in and out to feed the cutter into depth and withdraw it again, respectively, the lever 632 (Fig. 6) will be moved back and forth to contact with the front or rear wall alternately, of the slot 648 in the bar 650, thus shifting the bar 650 back and forth. This shifts the lever 658 (Figs. 12, 14 and 17) about its pivot 660, reversing the control valve 345 to reverse, in turn, the reverse valve 347. As stated, the reverse valve 347 controls the feed and withdrawal motions of the sleeve 90. Thus the sleeve 90 is reversed from its own movement.

A load and fire mechanism is provided to make the reversal of movement of the reverse sharp and instantaneous. This load and fire mechanism includes a plunger 665 (Figs. 12 and 14) which has an outer V-shaped end. The plunger 665 slides in an opening 666 formed in an extension or lug 667 cast integral with the coverplate 354 of the control block. The plunger 665 is held against rotation in the opening 666, and guided in its sliding movement therethrough by a key 668 which is secured by screws 669 in a slot in one side wall of the extension or lug 667. The plunger 665 is continuously urged outwardly by a coil spring 670 that is interposed between the plunger and the cap 672. This cap closes one end of the opening 666 in which the plunger slides. It is secured in place by screws 673.

The free end of the lever 658 is generally V-shaped and rides on the V-shaped end of the plunger 665. When the lever 658 is carried over the tip of the plunger 665 in the movement of the lever in either direction, the plunger snaps out behind it reversing the control valve 345 instantaneously.

To prevent coasting of the control valve, a slight load is put on it by a pair of spring pressed plungers 675 (Fig. 17). These plungers are housed in thimbles 676 which are secured in lugs 677 by set screws 678. The lugs 677 are formed integral with the cover plate 354 and extend on either side of the opening through which the stem portion 663 of the control valve extends. The plungers 675 are forced outwardly into engagement with the stem portion 663 of the control valve by springs 679. The tension of these springs can be adjusted by adjustment of the nuts 680 which thread into the thimbles 676.

Adjustment for depth of cutter feed

The length of the stroke of the sleeve 90 can be adjusted by adjustment of the rod 682 (Fig. 6). This rod fits in a hole drilled in the bar 650 and its rear end is threaded to thread internally into the bar 650. It is locked in any adjusted position by the lock-nut 684. Adjustment of the rod 682 changes the effective length of the slot 648 in the head of the bar 650 and so changes the stroke of the sleeve 90.

Adjusting screws 685 which thread into the ears 656 of the member 652 (Figs. 6 and 10) are also provided. These allow of a limited movement of the bar 650 after the lever 632 has engaged the front or rear wall of the slot 648 in the bar 650 before the bar starts to pull on the lever 658. This prevents the whole load from being applied instantaneously to the lever 632.

Hand control for the control valve

It may be desirable at times to reverse the control valve independently of the operation of the machine as, for instance, to run the work or cutter spindle out before the machine has completed its cycle of operation. For this purpose, a hand control is provided. This will be described now.

Figure 11:
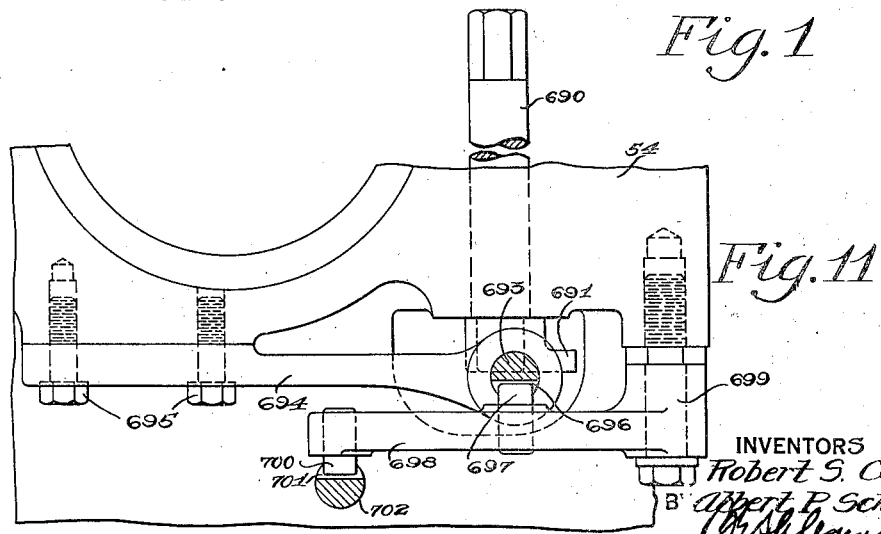
Figure 11 is a fragmentary view at right angles to Figure 10 showing details of the means for manually operating the control valve.
Figure 3:
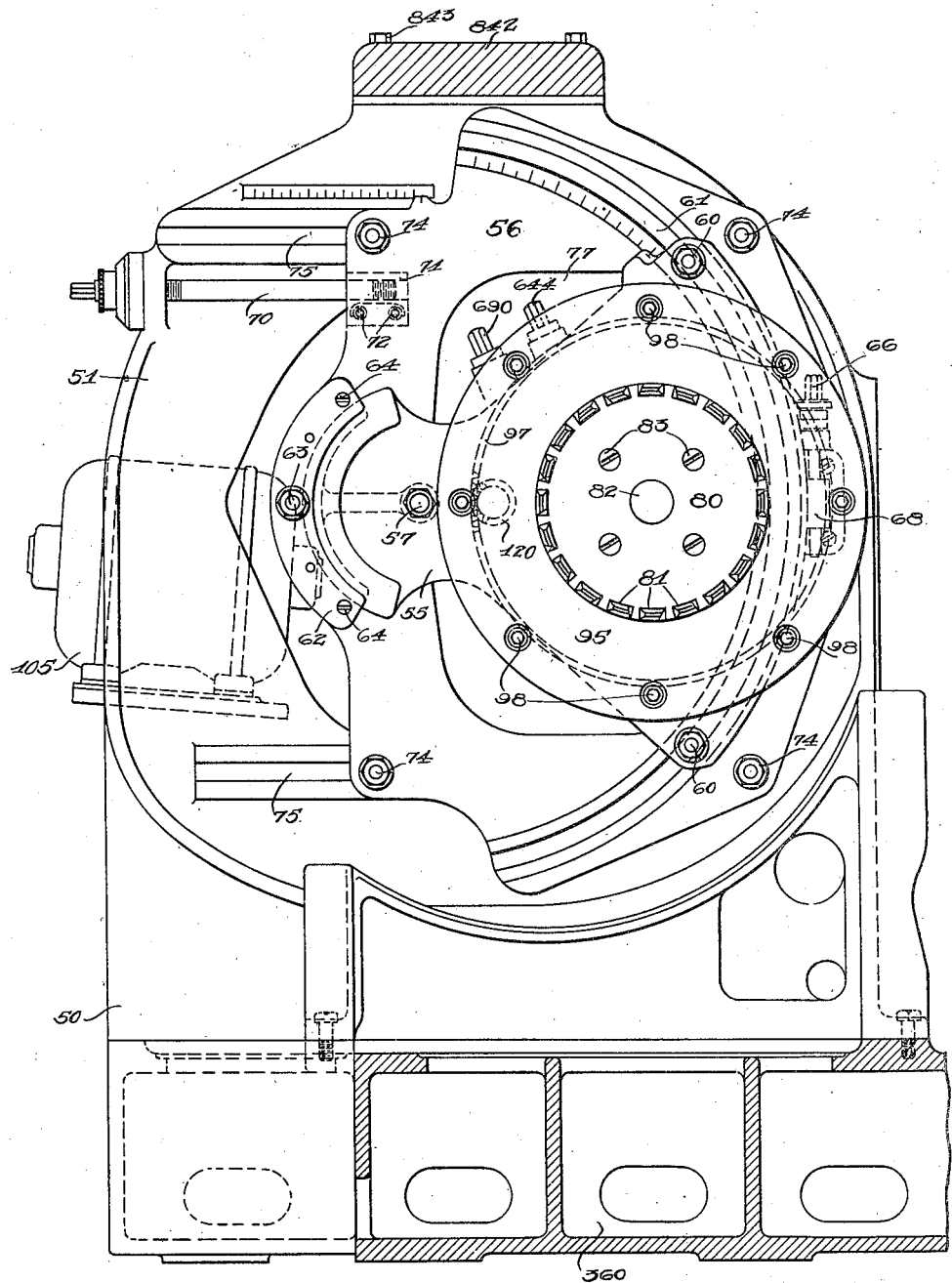
Figure 3 is a transverse vertical sectional view taken in the cutting plane of the machine and showing in end elevation the cutter, its support and the various cutter adjustments.

690 (Figs. 2, 3 and 11) designates a stub-shaft which is suitably journaled in the tool support 54. There is a disc 691 secured to the inner end of this shaft eccentrically of the axis of the shaft (Figs. 10 and 11). This disc engages in a slot 692 in a rod 693 which slides in a guide 694 that is secured by screws 695 to the side of the tool support. At its inner end, the rod 693 is slotted at 696 to engage a pin 697 that is mounted in a lever 698. The lever 698 is pivoted on a stud 699 (see also Figure 14) which is threaded into the tool support. The lever 698 carries at its free end a pin 700. This pin engages in a slot 701 in the stem 702 which extends from the front end of the control valve (Figures 10 and 17).

When the shaft 690 is rotated, the eccentric disc 691 moves the rod 693 to rock the lever 698 about its pivot and this movement, in turn moves the control valve.

Mechanism which operates the throttle valve

Not only does the movement of the sleeve 90 control the operation of the control valve 345 but it controls, also, through the throttle valve, the rate of the feed movement. The manner in which it does this will now be described.

The free end of the lever 632 is recessed at 703 to engage over the rounded trip of a lug 704 (Figs. 6 and 8). This lug is mounted on a rod 705 which slides in bearings 706 formed on the tool support 54. The lug 704 is adjustably held in position on the rod 705 by the nuts 707 which thread onto the rod at opposite sides of the lugs. At its rear end, the rod 705 is pinned by the pin 708 to a lever 709 (Figs. 12, 15 and 22). The lever 709 is formed with a cam surface 710 which engages a pin 711. The pin 711 forms a fulcrum for the lever. The free end of the lever 709 is rounded and engages in a slot 712 which is formed in the stem 713 of the throttle valve 347 (Fig. 17).

The throttle valve is normally open under actuation of the spring 714 which is interposed between the end plate 354 of the control block and the guide portion 715 of the valve but when the sleeve 90 moves forward to feed the cutter into depth, the lever 632 (Fig. 6) moves the rod 705 forward, rocking the lever 709 (Figs. 13 and 22) about its fulcrum pin 711, drawing the throttle valve rearwardly against the resistance of the spring 714. This causes the guide portion 716 (Fig. 17) of the throttle valve to gradually reduce the area of the opening through the slot 477 in the sleeve 456 of the valve. Thus the exhaust from the cylinder 125 (Fig. 6) is throttled gradually slowing up the feed of the cutter as it cuts more and more into depth, that is, as it takes its heaviest cut.

On the withdrawal motion of the sleeve 90, the spring 714 serves to move the throttle valve 347 back quickly to the right to quickly open the slot 477 to its full width, allowing the cutter to be withdrawn quickly from engagement with the work.

The rate of feed of the cutter for cutting gears of different tooth depths can be adjusted by adjusting the pin 711 along the cam surface 710 of the lever 709. The adjustment is effected by rotating the screw 717. This screw rotates in a bracket 718 which is formed integral with the back-plate 354 of the control block. The screw threads into the headed lower end 719 of the pin 711. There is a guide block 720 secured to the pin 711 between its ends and this block slides in a slot 721 in the bracket 718, guiding the pin in its adjustment. To assist in making the adjustment accurately, a chart 722 is secured to the rear end of the bracket 720 (Fig. 12). A finger 723 is secured to the pin 711 by a nut 724. This finger is provided with a downwardly bent end and a zero mark is provided on the downwardly bent portion of the finger to read against the chart 722.

The valve which controls the movement of the work spindle into and out of operative position The movement of the work spindle to and from operative position is controlled by a valve 725 (Figs. 34, 35 and 36) which slides in a sleeve 726. The sleeve 726 is mounted in a chamber bored in a bracket 728 secured by screws 729 to one side of the work head 52. The valve 725 is formed with spaced collars or guide portions 730, 731, 732 and 734.

Fluid under pressure flows into the chamber 735 of the valve 725 from the tube 501 (Fig. 27) which, also, supplies pressure fluid to the work spindle clamps as described above. The connection from the tube 501 is through the duct 737, the duct 738, the pipe 739 (Figs. 27 and 30), the duct 740 (Figs. 35 and 36), the duct 742 and the ports 743 in the sleeve 726.

Fluid exhausts from the chamber 735 of the valve 725 through the ports 745 in the sleeve 726, the duct 746, the duct 747, the pipe 748 which connects with the same, the duct 749, the duct 750 and the bore 515 (Figs. 27, 29 and 30) through which the fluid also exhausts from the work head clamps. From the bore 515, the motive fluid returns to the sump, as already described.

Fluid also exhausts from the chamber 735 of the valve 725 through the ports 752 in the sleeve 726, the duct 753, the duct 754, the pipe 756 (Figs. 27, 29 and 30) which is connected with the duct 754, the duct 757 and the duct 758 which connects with the bore 515.

The valve chamber 735 is connected through the ports 760 in the sleeve 726 (Figs. 35 and 36) with the duct 761. This duct connects with a duct 762 which connects in turn through the pipe 763 with a duct 764 (Figs. 27 and 30) which runs all the way through the work head. There is a T 765 connected in the line 764 and the flexible hose 235 (Figs. 31 and 32) leads from this T to that end of the piston 221 which, when on supply, operates to move the work spindle to loading position.

The valve chamber 735 (Figs. 35 and 36) is connected through the ports 770, the duct 771, the duct 772, and the pipe 773 with the duct 774 which runs all the way through the work head (Figs. 27 and 30). The flexible hose 237 is connected to the duct 774. This hose leads to that end of the piston 221 (Figs. 31 and 32) which, when on supply, operates to move the work spindle into operative position.

The valve 725 is constantly urged to the left (Fig. 34) by a coil spring 775 which is interposed between the valve and a block 777 which fits into a bore in the valve. The tension of the spring 775 may be adjusted by the screw 778 which abuts one end of the block 777 and which threads through an opening in the cover-plate 779 that closes one end of the valve chamber 735. A locknut 780 is provided to hold the screw in any adjusted position.

The valve 725 is moved to the position shown in Figure 34 and Figure 35 by energizing a solenoid 782 which is secured by bolts 783 to one side of the work head 52. The plunger 784 (Figs. 34 and 36) of this solenoid is connected by a pin 785 with the forked lower end of a lever 786.

This lever 786 is mounted at one end through anti-friction bearings 788 on a stud 789 which is secured by a set-screw 790 in the plate 728. A washer 792 holds the bearings 788 in position. The lever is formed intermediate its ends with an elongated slot 794 and is connected by means of the block 795 which engages in the slot and by the bolt 796 with the stem 797 of the valve 725. The stem 797 projects through an opening in the cover plate 798 that closes the rear end of the chamber 735 of the valve. This cover plate is secured in position by the screws 799.

The solenoid 782 is energized when the cutter motor is started as will be described more particularly hereinafter. When the valve 725 is in the position shown in Figures 34 and 36, fluid under pressure will flow from the pressure line 742 (Fig. 35) through the ports 743 in the sleeve 726, the ports 770 in this sleeve, the duct 771, the duct 772, the pipe 773, the duct 774 (Fig. 27) and the line 237 (Figs. 31 and 32) to the rear end of the piston 221 to move the work spindle into operative position. At the same time, the fluid exhausts from the cylinder 220 through the line 235, the T 765, the duct 764, (Fig. 27), the pipe 763, the duct 762, the duct 761, and the ports 760 and 752 in the sleeve 726 (Figs. 35 and 36) into the exhaust line 753 from which it returns to the sump.

There is an automatic stop provided on the machine. When the required number of teeth have been cut in the blank, this stop trips, breaking the circuit to the solenoid 782 and de-energizing the same. The spring 775 then shifts the valve 725 rearwardly in the chamber 735, putting the line 761 on supply. The pressure fluid then flows through the duct 762, pipe 763, the duct 764, T 765 and hose 235 to the front end of the piston 221 to move the work spindle to loading position. At this time, fluid exhausts from the rear end of the cylinder 220 through the line 237, duct 774, pipe 773, duct 772, duct 771, and the ports 770 and 745 in the sleeve 726 into the duct 746 whence it returns to the sump.

*The three-way valve which controls the chucking mechanism and the operation of said valve*

There is a three-way valve 800 (Figs. 27 and 37) of any suitable construction connected with the T 765 by a pipe 802. This valve is also connected by the flexible hose 204 (Fig. 24) to the duct 210 which leads to the rear end of the chuck-release piston 196. The third line 803 from the valve 800 leads back to the sump.

When the work spindle is at loading position, the handle 804 of the valve 800 can be turned to connect the line 764, which at that time is on supply, as above described, with the hose 210 leading to the chuck piston 196. The connection is through the pipe 802 and T 765. The pressure fluid forces this piston forward against the resistance of the spring 182 and releases the chuck.

When the handle 804 of the valve 800 is turned to connect the line 210 leading from the chuck piston with the exhaust line 803, the fluid exhausts from the line 210 (Fig. 24) and the spring 182 returns the draw-rod to chucking position.

As a safety measure, a normally open swich 805 may be incorporated in the electrical circuit to the cutter motor 105. The arrangement may be such that in order to start the cutter motor, the switch 805 must be closed and that for this purpose, the handle 804 of the three-way valve 800 must be held in contact with the switch. Inasmuch as the operator requires one hand to press the starter button for the cutter motor and the other hand is holding the handle 804 in engagement with the switch 805, it will be seen, both his hands are busy and out of the way when the machine is being started. Thus the operator cannot get his hands in the way of any of the parts when the machine is being started. This safeguards him against injury.

One possible construction of safety device is shown in Figure 37. 807 and 808 indicate two terminals of the switch 805 which are connected electrically in the starting circuit to the cutter drive motor 105. 810 designates the push button of the switch. This button is normally pressed outwardly by the coil spring 812 to hold the switch open. There is a contact strip 813 connected to the button 810, which, when the button is pushed in, bridges the terminals 807 and 808 and completes the starting circuit to the cutter motor.

815 designates a housing which is secured by screws 816 to the case of the switch 805. The plunger 817 is housed in the housing 815 and normally pressed outwardly by the spring 818.

In order to start the cutter motor, it is necessary to force the plunger 817 inwardly to close the switch 805. This is done by moving the operating handle 804 of the three-way valve into position to engage the plunger 817. The operator needs only to hold the handle in position to engage the plunger 817 momentarily until the electrical control box hereinafter described functions. Then he can release the handle. The spring 818 is powerful enough to throw the handle clear of the switch when the handle is released. The spring might, in fact, be made powerful enough to act through a sufficient length of time to throw the handle around far enough to connect the line 210 leading to the chuck-piston with the line 754 leading to the valve 725, although ordinarily it will be preferred to use the construction shown in Figure 37. In this latter case, the operator throws the handle 804 over by hand, after the cutter motor has been started, in order to connect the lines 764 and 210.

During the working cycle of the machine, the line 764 will be on exhaust and the chucking mechanism will be operative under actuation of the spring 182 (Fig. 24). When the automatic stop functions, as above described, the valve 725 is shifted to move the work spindle to loading position and the line 764 is put on supply. The pressure fluid then flows through the line 764 (Figs. 27 and 30) and the line 210 to the chuck compressing the spring 182 and releasing the chuck. Thus by moving the valve handle 804 to the dotted line position shown in Figure 37 after the cutter motor had been started, the chuck will be released automatically when the automatic stop functions and while the work spindle is being withdrawn to loading position. This accelerates the handling of the machine because when the work spindle reaches loading position, the completed gear blank will have already been dechucked.

Leak returns

Leak returns are provided to conduct any fluid which may leak along the throttle or control valves back to the sump. Thus (Fig. 17) one end of the chamber 375 of the control valve 345 is connected by ports 820 in the sleeve 377 through a duct 821 with ports 823 in the sleeve 456 of the throttle valve 347. These ports 823 lead into a duct 824 which is connected by tubing 825 with the sump. The other end of the chamber 375 of the control valve 345 is connected, through a duct 826 formed in the end plate 352 of the control block, with the corresponding end of the chamber that houses the throttle valve 347. Ports 828 in the sleeve 456 of the throttle valve lead from this end of the throttle valve chamber into a duct 829 (Figs. 13 and 15). This duct is connected by tubing 830 with the sump. A leak return is also provided for the valve chamber 735 of the work spindle control valve 725 (Figs. 34 and 35). The two ends of the chamber 735 are connected by ports 832 and 833, respectively, in the sleeve 726 with a duct 834 which leads into a duct 835 that is connected (Fig. 36) with tubing 836 which leads back to the sump.

Overhead tie

An overhead tie or brace is provided with the machine to increase its rigidity. This brace connects the column 51 with the work head 52. It is made in two parts which are pivotally connected together at a point corresponding to the vertical center line of the machine.

One part 840 (Figs. 1 and 2) is secured by bolts 841 to the work head 52 above the work spindle. The other part 842 is secured by bolts 843 to the top of the column 51. The two parts are pivotally connected together by a pin or stud 844 (Figs. 38 and 39) and by a bolt 845 which passes through an opening in the arm 840 and through an arcuate slot 846 in the arm 842. The slot 846 is curved about the axis of the stud 844 as a center.

A one-shot system is provided for lubricating various inaccessible parts of the work head. The distributing chamber of this system is indicated at 850 in Figure 28. The system is operated by a plunger 851 (Figs. 1, 2 and 28) and is supplied through an oil cup 852.

Safety device preventing starting up of the machine with the cutter in engagement with the work As an additional safety device, means is provided which prevents starting of the machine with the cutter engaged with the work. This obviates possible breakage of the cutter which would be sure to occur were the machine to be started with the cutter in full depth position.

This safety device includes a switch 855 (Fig. 6) which is secured to the cutter support 54. This switch is a normally closed switch. It is incorporated in the starting circuit of the cutter motor and unless it is closed the cutter motor cannot be started. The switch 855 is so positioned that on the inward feed movement of the cutter, the head 649 of the bar 650 engages the roller 856 carried by the switch arm 857 and opens the switch. It will be seen, therefore, that when the cutter is in operative position, it is impossible to start the cutter motor, for the head 649 of the bar 650 is then holding the switch 855 open. To start the cutter motor, it is necessary to withdraw the cutter. Thus when the cutter is started, it is in withdrawn position.

Set-up of machine

To use the machine, the cutter is adjusted in accordance with the spiral angle of the gear teeth to be cut. This adjustment is effected by angular adjustment of the cutter support 54 on the plate 56 and by lateral adjustment of the plate 56 on the column 51. The angular adjustment of the cutter support is effected by rotation of the shaft 66 which carries the worm 68 (Figs. 2 and 3) that engages with the worm wheel segment 69 which is cut into the flange 55 of the cutter support. The lateral adjustment of the cutter support is accomplished by rotation of the screw shaft 70 which threads into the nut 71. After adjustment, the flange 55 of the cutter support is secured to the plate 56 by the bolts 60 and the gib 62 while the plate 56 is secured in adjusted position to the column 51 by the bolts 74. The work head 52 is adjusted angularly on the base 50 by hand and is secured in the required angular position conforming to the root angle of the teeth to be cut, by the bolts 152 which engage in the arcuate slots 151 and 154 (Fig. 2). It is to be noted that the hose 484, 499, 516, 623 and 492 (Figs. 29 and 30) pass through an arcuate slot 485 formed in the base of the machine concentric with the slots 151 and 154. Thus the work head 52 can be adjusted angularly without disturbing the hydraulic connections to the parts of the work head.

The work spindle 160 is adjusted axially in the work head in accordance with the cone-distance of the gear to be cut. This adjustment is effected by loosening the bolts 266 (Fig. 29) which secure the cylinder 220 to the work head 52 and by rotating the shaft 262 (Figs. 28 and 31) to cause the cylinder 220 and with it the work spindle 150 to be adjusted axially in the work head.

The overhead tie bolt 845 (Figs. 38 and 39) is loosened to permit the angular adjustment of the work head to be made and after this adjustment has been made, the two arms 840 and 842 of the tie are bolted together again to connect the work head rigidly with the tool column 51.

An index ring 273 is selected having a number of notches 278 corresponding to the number of teeth to be cut in the gear blank and this ring is secured to the plate 272 (Figs. 24 and 26) by the gib 274.

The cutter can be adjusted for depth of feed by adjustment of the rod 682 (Fig. 6). The rate of feed for the desired depth of tooth to be cut is then adjusted by rotation of the screw 717 (Figs. 15 and 22) to move the pin 711 along the cam surface 710 of the lever 709. This latter adjustment is determined from the chart 720.

*Electric circuit of machine*

When these and any other necessary adjustments, as, for instance, the adjustment of the cutter axially to compensate for wear, have been made, the machine is ready for operation. The operator first starts the feed motor 362 (Figs. 1, 2 and 40). This puts the fluid pressure pump 361 into operation.

The feed motor is started by pressing the start button 860 (Fig. 40). This is a normally open button of standard construction and may be mounted at any convenient point on the machine.

Pushing of the start button 860 in acts initially to close a circuit from the main line 862 through the terminal 863 of a magnetic controller 864 which may be of any suitable construction, the line 865, the terminal 866 of the controller, the line 867, the terminal 868 of the start-button, the terminal 869 common to the start-button and a stop-button 870, the terminal 871 of the stop-button, the line 872, the terminal 873 of the controller, thence through the winding 874 of an electro magnet mounted in the controller 864, the line 875, the terminal 876 of an emergency stop button 877, the terminal 878 of this button, the line 879, the line 880 and the terminal 881 of the controller to the main line 882. The third main line is designated at 884. It is connected to the controller 864 by the terminal 885.

The feed motor 362 is connected to the controller 864 by the lines 887, 888 and 889.

When the starter button 860 is pressed in, as described, the feed motor is started, the feed motor being connected to the circuit just described through connections contained within the controller. Simultaneously, the electro-magnet 874 is energized, causing the switch arms 890, 891, 892 and 893, which are connected together, to make contact, respectively, with the terminals 885, 881, 863 and 894 of the controller. When the operator releases the starter button 860, it springs open but the circuit through the feed motor 362 is now maintained from the main line 882 through the terminal 881 of the controller, the line 880, the line 879, the terminals 878 and 876 of the emergency stop button, the line 875, the coil 874, the terminal 873, the line 872, the terminals 871 and 869 of the stop button 870, the line 895, the terminal 894, the switch arm 893, the line 896, the switch arm 892, the terminal 863 to the main line 862. This operative circuit is maintained during the operation of the machine or until the normally closed stop-button 870 or the normally closed emergency button 877 is pushed out to break the circuit. With the feed motor in operation, fluid under pressure will be pumped to the various hydraulically operated parts of the machine.

The operator now starts the cutter motor 105 (Figs. 1, 5, 8 and 40). This is done by pushing in the start button 900 of a combined start and stop controller, of which the stop button is designated at 901 and which may be of any standard or suitable construction.

Closing of the start-button 900 closes the circuit from the main line 902 through the terminal 903 of a magnetic controller 904, which may be similar in construction to the controller 864 or of any other suitable construction. The circuit extends from the terminal 903 through the line 907, the terminal 905 of the controller and through the line 906 to the switch 855 (Figs. 6 and 40). Thence, the circuit extends through the line 908 to the switch 813 (Figs. 27, 37 and 40). Thence, the circuit extends through the line 910 to the terminal 911 of the start-button 900, the common terminal 912 of the start and stop buttons, the terminal 913 of the stop button, the line 914 and the line 915 to the terminal 916 of the controller 904. Thence, the circuit is through the line 875, the terminals 876 and 878 of the emergency stop-button 877, the line 879 to the coil 918 of an electro-magnet mounted in the controller 904. Thence, the circuit is through the terminal 919 of the controller to the main line 920.

The cutter drive motor 105 is connected to the controller 904 through the lines 921, 922 and 923. When the start button 900 is pushed in as described, the cutter motor 105 is connected in the circuit described through connections forming part of the controller 904 and so is started.

It will be noted that in order to start the motor 105, two things are essential. First, the cutter must be withdrawn from operative position far enough to allow the normally closed switch 855 (Fig. 6) to be closed and second the operator must hold the handle 804 of the three-way valve 800 in contact with the switch 813. The first named essential prevents damage to the cutter. The second named essential prevents injury to the operator for one of his hands must be upon the handle 804 of the three-way valve and the other hand is occupied, pushing in the start button 900.

The pushing in of the start button 900 starts the cutter motor 105 to drive the cutter and simultaneously it energizes the electro-magnet 918 to cause the switch-arms 925, 926, 927 and 928 to make contact with the terminals 930, 919, 903 and 931 of the controller 904. The button 900 is a normally open button and when the operator removes his hand from the button, it springs open.

The circuit is maintained, however, from the main line 902 through the terminal 903, the switch arm 927, the line 932, the switch arm 928, the terminal 931 and the line 934 to the automatic stop 935 (Figs. 26 and 40). Thence, the circuit is through the line 936, the terminals 912 and 913 of the stop button, the line 914, the line 915, the terminal 916 of the controller, the line 875, the terminals 876 and 878 of the emergency stop button 877, the line 879, the coil 918, and the terminal 919 to the other main line 920.

Thus it will be seen that the circuit to the cutter motor 105 is maintained after the operator releases the start button 906. It will be noted, also, that it is only necessary for the operator to hold the start button 900 closed and the operating handle 804 of the three-way valve engaged with the switch 813 long enough for the coil 918 to become energized and move the switch-arms 927 and 928 into contact with the terminals 903 and 931, respectively. Then the circuit to the cutter motor 105 will be maintained independently of the start-button 900 and of the position of the handle 804. It will be noted, also, that when the electro-magnet 918 has been energized, the circuit to the cutter 105 will be maintained independently of the position of the arm 857 (Fig. 6) of the switch 855. Hence, the cutter can feed into depth without affecting the circuit to the cutter motor.

It will be noted, also, that the operative circuit to the cutter motor 105 is maintained through the automatic stop 935 with the consequence that when this stop functions, the circuit to the cutter motor is broken and the cutter motor is stopped. This is an automatic operation and occurs only after the required number of teeth have been cut in the gear blank. To stop the cutter motor by hand, either the stop button 901 or the emergency stop button 877 may be pressed in. Both of these buttons are normally closed buttons. The emergency stop button is provided to permit stopping both the cutter and feed motors simultaneously. While the machine is in use, the feed motor runs continuously and it is only the cutter motor which is stopped by the automatic stop after a gear blank has been completed.

The automatic stop 935 may be of the construction described in the patent to Maxwell H. Hill, No. 1,577,121 of March 16, 1926 or of the construction described in the pending application of George E. Ford, No. 441,694 of April 4, 1930, or of any other usual or suitable construction. It is adjusted, before the machine is started, to function after the required number of teeth have been cut in the blank and break the circuit to the cutter motor.

Operation of the machine

When the cutter motor is started, the cutter is driven through the bevel gears 113, and 114, the shaft 109, the spur gearing 115 and 116, the shaft 117, the pinion 120 and the internal gear 97 (Figs. 8, 9 and 6).

When the circuit to the cutter motor 105 is closed, as above described, the solenoid 782 (Figs. 34, 36 and 40) is energized for this solenoid is connected with the line 915 by the line 940 and it is connected by the line 941 with the terminal 942 of the controller 904 (Fig. 40). The circuit between the lines 915 and 941 is made within the controller 904.

When the solenoid 782 is energized, the plunger 784 of the solenoid is pulled inwardly (Fig. 34) to force the valve 725 to the position shown in Figures 34 and 35 against the resistance of the spring 775. This is because the stem 797 of the valve is connected by the pin 796 to the pivoted lever 786 which is in turn connected to the plunger 784 of the solenoid.

When the valve 725 is in the position shown in Figures 34 and 35, fluid under pressure flows from the pump 361 through the line 367 (Figs. 1 and 4) and through the flexible hose 499 (Figs. 29 and 30) into the bore 500 in the work head. Thence, it flows through the duct 737, (Figs. 27 and 30), the pipe 739, the duct 740 (Figs. 35 and 36), and the ports 743 into the chamber 735 of the valve 725. Thence, the pressure fluid flows through the ports 770 (Figs. 35, 36 and 40), the duct 771, the duct 772, the pipe 773 (Figs. 27 and 30), the duct 774, and the line 237 (Figs. 31 and 32) to the rear end of the piston 221 to move the work spindle into operative position.

At the same time, the motive fluid is exhausting from the front end of the cylinder 220 through the line 235, the T 765, the duct 764, (Figs. 27 and 30), the piping 763, the duct 762 (Figs. 35 and 36), the duct 761 and the ports 760 into the chamber 735 of the valve 725. Thence, the exhaust fluid flows through the ports 752, the duct 753, the duct 754, the pipe 756 (Figures 27 and 30), the duct 757, and the duct 758 into the bore 515 of the work head. Thence it flows through the flexible hose 516 back to the sump.

The operator holds the handle 804 of the three-way valve in position to hold the switch 813 closed during the time the work spindle is moving into cutting position and until the operating circuit to the cutter motor 105 has been closed by energizing the electro-magnet as above described. Then the operator releases the handle 804 and the switch 813 is thrown open. The operator then throws the handle 804 over by hand to connect the line 764 (Figures 27 and 30) with the line 204 (Figure 24) that leads to the chuck-piston 196. This puts the chuck-piston on exhaust and allows a spring 182 to draw the draw-rod 170 rearwardly in the spindle 160 clamping the gear blank G to be cut securely to the work spindle.

As the work spindle moves into operative position, the nut 555 (Figures 31, 32 and 33) strikes the roller 556 carried by the switch arm 557, closing the switch 558. This closes a circuit from the line 915 (Figure 40) through the line 945 and from the line 941 through the line 946 to the solenoid 565 (Figures 20 and 21) energizing this solenoid.

The energization of the solenoid 565 causes the stop 550 (Figures 21 and 16) to be withdrawn from engagement with the reverse valve 346 for when the plunger 568 of the solenoid is drawn inwardly, the crank shaft 573 is rocked by the arm 572 to cause the roller 579 carried by the crank pin 577 to engage the slot 579 in the plunger 550 and withdraw the same.

As soon as the plunger 550 is withdrawn from engagement with the reverse valve 346, the reverse valve is moved to the left from the position shown in Figure 16 until it is stopped by engagement of the plunger 595 with the collar 396 of the valve.

The reverse valve is forced to the left by pressure fluid flowing from the hose 368 (Figures 16 and 18) through the duct 370, the duct 372, the duct 374, the ports 376 and 410 of the sleeve 377 of the control valve, the duct 411, the duct 412 (Figure 18), and the duct 413. This pressure fluid forces the ball-check valve 415 open and passes through the duct 416 and ports 418 into the chamber 402 of the reverse valve. At this time, the motive fluid is exhausting from the other end of the chamber 402 through the port 426, the duct 424, the duct 423, the ports 420 and 381 in the sleeve 377 of the control valve into the duct 382. Thence, the exhaust fluid flows through the duct 384 (Figure 13) into the ducts 385 and 386 (Figures 13 and 18), and the duct 387 to the flexible hose 388 which leads to the piping 389 and thence back to the sump.

When the reverse valve 346 has moved to the left as far as the stop 595 will allow, the port 480 will be opened to supply from the port 418 (Figures 16 and 18). The pressure fluid then flows through the duct 482 (Figures 15 and 18), the piping 483, the flexible hose 484 (Figures 29 and 30), the duct 486, the tube 487 and the duct 488 (Figures 26 and 27) into the chamber of the index piston 310, forcing this piston to the right from the position shown in Figures 26 and 27. This will cause the rack 314 to rotate the segment 295 which is connected to the arm 294.

As the arm 294 rotates, the cam 306 is carried into engagement with the pin 304, lifting the lever 282 upwardly and disengaging the dog 284 from the index ring 273. Immediately thereafter, the pawl 297 will drop into engagement with the index ring 273 and in the further movement of the index piston 310 to the right will ratchet the index ring around, indexing the work spindle.

In the rotation of the arm 294 to the left, as just described, it strikes the plunger 950 (Figure 26) which is housed in the housing 951 secured by screws 952 to the index guard 229. This plunger 950 is pressed by the spring 953 to the right. When the arm 294 or a lug carried by that arm strikes the plunger, it is moved to the left and pushes in the plunger 955 of the automatic stop 935.

The index piston 310 continues to move to the right after the indexing operation has been completed and in this further movement to the right, it uncovers the ports 508 in the sleeve 506. The ports 508 are connected with the bore 500 through the tube 501 (Figs. 27, 39 and 30), the duct 502, the duct 503 (Figures 26 and 27), the duct 504 and the peripheral slot 505 cut in the sleeve 506 of the index piston.

Thus when the ports 508 have been opened, the pressure fluid flows from both the lines 504 and 488 into the duct 520 (Figures 26 and 27). Thence it flows around the peripheral groove 521 in the sleeve 506 through the duct 522, the duct 523 and the duct 524 into the tube 526 and the bore 527 (Figures 29 and 30). Thence it flows through the duct 535 (Figures 24 and 30) into the duct 536 and into the ducts 537 and 538. The fluid pressure forces the clamps 320 and 321 (Figures 27 and 28) of each set together against the resistance of the springs 325, thus clamping the work spindle 160.

At the same time that the clamps 320 and 321 are being forced into clamping position, the pressure fluid flows from the duct 527 (Figures 29 and 30) through the flexible hose 623, the piping 622 and the duct 621 into the ports 620 (Figures 13 and 16) formed in the sleeve of the trip valve 348.

The pressure fluid forces the valve 348 to the left from the position shown in Figure 16 against the resistance of the spring 612. This forces the plunger 595 out of engagement with the reverse valve 346, for the beveled shoulders 606 of the plunger ride on the beveled surface 605 of the valve 348. The reverse valve 346 now moves freely to the left under pressure of the motive fluid on the right end of the valve.

It will be noted that before the reverse valve is released, the indexing operation will have taken place and that then the work spindle will have been clamped.

In the position shown in Figures 16 and 18 of the drawings, the ports 452 of the reverse valve 346 are on supply from the ports 404 and the supply lines 363. When the reverse valve is moved full to the left, the pressure fluid will flow from the ports 404 and ports 436 into the duct 437. Thence, it will flow through the duct 438 (Figs. 13, 15, 18 and 23), and the piping 439 to the port 135 (Figures 5 and 6) in the cap 132 of the cylinder 125, forcing the piston 128 forward to feed the cutter into the gear blank.

The feed movement is accomplished by exhausting the motive fluid from the front of the piston 128 through the ports 136. The exhaust fluid flows through the line 474 (Figures 13, 14 and 15), the duct 473, the duct 472, and the ports 470 into the chamber of the throttle valve 347 (Figure 17). Thence, the exhaust fluid flows through the opening 477 in the sleeve 456 of the throttle valve into the duct 453 (Figs. 16 and 18) and thence through the ports 452 into the chamber 402 of the reverse valve, exhausting thence through the ports 405 back to the sump.

As the cutter feeds into depth, the rod 705 (Fig. 6) is moved in its bearings 706 through its connection with the lever 632. Movement of the rod 705 causes the throttle valve 347 (Figure 17) to be moved rearwardly in its sleeve 456 against the resistance of the spring 714. This is because the stem 713 (Figures 15, 17 and 22) of the throttle valve is connected to the rod 705 by the lever 709.

As the throttle valve moves rearwardly in its sleeve, the guide-surface 716 of the throttle valve gradually reduces the area of the opening 477 in the sleeve 456, thereby gradually reducing the flow of exhaust fluid from the front end of the piston 128. This gradually reduces the rate of feed of the cutter into the gear blank, that is, the rate of feed of the cutter is reduced as the cutter goes into depth.

The feed continues until the lever 632 strikes the forward wall of the slot 648 in the head of the bar 650 (Fig. 6) and has shifted this bar far enough to cause one of the screws 685 to engage the lever 658 and this lever has been moved far enough to cause the load and fire plunger 665 (Figure 14) to throw the lever forward, thus reversing the control valve 345.

This moves the control valve 345 to the right from the position shown in Figures 17 and 18. The pressure fluid flowing from the hose 368 into the chamber 375 of the control valve will now flow through the ports 376 and 420 of this sleeve into the duct 422 (Figures 13 and 18), and thence through the ducts 423 and 424 and the ports 426 into the chamber 402 of the reverse valve, moving the reverse valve back to the right. At the same time, the motive fluid will exhaust from the ports 418 (Figures 16 and 18) in the sleeve 400 of the reverse valve through the ducts 416, 413, 412 and 411 and through the ports 410 into the chamber 375 of the control valve. Thence it will exhaust through the ports 381 and the line 282 back to the sump. The adjustment of the ball-check valve 413 by the screw 431 will control the speed of reversal of the reverse valve.

As the reverse valve 345 moves to the right (Figs. 16 and 18), the ports 452 in the sleeve 400 of the reverse valve are put on supply from the ports 404. The pressure fluid then flows through the duct 453 around the cylindrical groove 455 (Figure 17) in the sleeve 456 of the throttle valve 247, into the duct 458 (Figures 13 and 15). Thence it flows through the duct 459 and the ports 460 in the sleeve 462 (Fig. 24) of the tappet valve 350. The pressure fluid forces the tappet valve open against the resistance of the spring 464. It then passes through the ports 465 in the sleeve 462 into the duct 467 (Figs. 13, 15 and 24). Thence it flows through the ducts 468 and 469 (Figures 16 and 17) into the chamber 347 of the throttle valve through the ports 470 in the sleeve 456 of this valve. Thence the pressure fluid flows through the ports 470 into the duct 472 (Figures 13, 14 and 15) through the ducts 473, 474 and 475 and the ports 136 (Figures 5 and 6) to the front end of the piston 128. This causes the cutter to be withdrawn from engagement with the work.

At this time, the motive fluid is being exhausted from the rear end of the piston 128 (Fig. 6) through the port 135, the piping 439, the duct 438 (Figs. 15, 18 and 23), the duct 437, the duct 436, the ports 435 and 406 in the sleeve 400 of the reverse valve (Fig. 18) into the line 388 which leads back to the sump.

While the cutter is being withdrawn from the work, the pressure fluid is also flowing from the ports 426 (Figs. 16, 18 and 40) of the control valve into the piping 491. Thence it flows through the hose 492 (Figs. 29 and 30), the bore 493, the tube 494 and the duct 495 (Figs. 26 and 27) to the right end of the index piston 310.

This causes the index piston 310 to be moved to the left toward the position shown in Figures 26 and 27. In the first part of this movement, the rack 314 rocks the arm 294 away from the plunger 950 (Fig. 26) releasing this plunger and the plunger 955 of the automatic stop 935. This ratchets the trip mechanism of the stop forward. Thus after each cutting operation on the gear blank, the automatic stop is advanced and when the desired number of teeth have been cut in the blank, it functions.

As the arm 294 rocks further to the right, the cam 306 rides under the pin 304 without lifting the lever arm 282. The cam simply depresses the plunger 308. This resets the index mechanism.

In the further movement of the piston 310 to the left, the ports 508 in the sleeve 506 will be closed, thus shutting off the supply of pressure fluid to the work spindle clamps 320 and 321. Immediately after this, the ports 510 will be opened, allowing the pressure fluid to exhaust from the cylinders 322 and 324 (Figures 27 and 28) through the ducts 537 and 538 (Figures 27 and 30), the duct 536, the bore 527, the tube 526, the duct 524, the duct 532 (Figures 26 and 27), the duct 531, the duct 530, the groove 529 and the duct 528. Thence, the fluid exhausts through the ports 510 in the sleeve 506, the groove 511, the duct 512, the duct 514, the tube 513, the line 515 and the flexible hose 516, (Figs. 29 and 30) back to the sump.

At the same time that the clamps 320 and 321 are on exhaust, the line 623 (Figs. 24, 29, 30, 27 and 40) is put on exhaust. Thus, the motive fluid exhausts from the chamber of the trip valve 348 (Figs. 13 and 16) through the ports 620 and the piping 622 and the hose 623 into the bore 527 whence it returns to the sump through the line just described.

This allows the spring 612 to move the trip valve 348 to the right and the plunger 595 is returned into locking engagement with the reverse valve 346. The plunger 550 is held out of locking engagement with the reverse valve during the operation of the machine because the solenoid 565 acts continuously as long as the work spindle is in operative position. The sleeve 90 continues in its withdrawal movement until the lever 632 (Fig. 6) strikes the rod 682 and until after one of the screws 686 has engaged the lever 658 (Figs. 14 and 17) and has moved this lever far enough so that the load and fire plunger 665 has acted to swing the lever 658 to the position shown in Figure 14. This causes the control valve 345 to be returned to the position shown in Figures 17 and 18. This will put the line 413 leading from the control valve to the reverse valve back on supply and the pressure fluid will again pass through the ports 418 and 480 in the sleeve of the reverse valve 346 into the line leading to the index piston 310. This will cause the work spindle which has been unclamped to be indexed in the manner above described. Immediately after the indexing operation has been completed, the index piston 310 will open the line 527 leading to the work spindle clamps 320 and 321 to supply and the work spindle will be reclamped as above described. At this same time, the line 623 (Fig. 40) will be opened to supply and the trip valve 348 will be moved to the left (Fig. 16) as above described. This will withdraw the plunger 595 which has been holding the reverse valve 346 and the reverse valve 346 will now move to the left under pressure of the fluid flowing through the line 413. Movement of the reverse valve to the left will cause the piston 128 to reverse its direction and the cutter will once again feed into depth.

It will be noted that the feed cannot be started until the indexing operation has been completed and the work spindle has been clamped and that the indexing operation is not started until the cutter has been withdrawn from engagement with the blank.

The alternate cutting and withdrawing of the cutter for indexing proceeds until the desired number of teeth has been cut in the blank. Then the automatic stop 935 (Figs. 26 and 40), which has been advanced each time the index mechanism has been reset, functions. This breaks the circuit to the cutter motor 105 and stops the cutter motor.

It also breaks the circuit to the solenoid 782 and allows the spring 775 (Figs. 34 and 36) to return the valve 725 to its normal position, that is, to the left from the position shown in Figure 34. This puts the line 761 on supply from the bore 501 through the duct 737, the duct 738 (Figures 27, 28, 29, 30 and 35), the pipe 739, the duct 740, the duct 742 and the ports 743 and 745. The pressure fluid now flows through the ducts 162, the pipe 763, the duct 764, the T 765 and the hose 235 to the front end of the piston 221 (Figures 31 and 32). This causes the work spindle to be moved to loading position. At the same time, the pressure fluid passes from the line 764 through the T 765, the pipe 802 and the three-way valve 800 into the hose 204 leading to the chuck piston 196 (Fig. 24). The pressure fluid forces this piston 196 forward against the resistance of the spring 182 and releases the chuck.

Thus after the required number of teeth have been cut in the blank the work spindle is automatically withdrawn to loading position and the chucking mechanism is automatically released.

It remains only to be noted that at the time that the work spindle is being withdrawn by pressure on the front end of the piston 221, the fluid is exhausting from the rear end of the piston through the line 237 (Figs. 31 and 32), the duct 774, pipe 773, duct 772, duct 771, ports 770 and 745 in the sleeve 726 into the duct 746 whence it returns to the sump (Figs. 27, 29, 30, 34, 35 and 36).

The movement of the work spindle to loading position carries the nut 555 (Figs. 32 and 33) away from the roller 556 of the switch arm 557 and allows the switch 558 to open. This breaks the circuit to the solenoid 565 and releases the plunger 568 (Figures 20, 21 and 40). The upward thrust of the plunger 580 on the roller 576 under actuation of the spring 582 will then rotate the crank pin 577 back to its starting position, thus returning the plunger 550 into locking engagement with the reverse valve 346.

The parts are now all in the starting position and to cut a new gear, all that is required is to remove the completed work piece and position a new blank on the work spindle and restart the cutter motor.

*Chamfering mechanism*

In many cases, it may be desirable to chamfer the gears while they are being cut. For this purpose, a chamfering attachment is furnished with the present machine.

The chamfering mechanism is mounted upon a head or support 960 (Figs. 41, 42, 43, 44 and 45) that is removably and adjustably secured to the base 50 of the machine alongside the work head 52 by T-bolts 961 which engage in the arcuate T-slots 151 and 154.

962 designates the chamfering tool. The front face 963 of the tool (Fig. 48) is formed with a side rake to provide a side cutting edge designated at 964. The tool 962 is secured in a clapper-block 965 by set-screws 966. The set-screws 966 engage the cylindrical stem portion 967 of the tool and by releasing the set-screws, the tool can be adjusted angularly in the clapper block.

The clapper block 965 is pivotally mounted between ears 968 extending from the tool block 969. The taper pin 970 forms the pivot for the clapper block. The clapper block 965 is resiliently held against pivotal movement in the tool block 969 by a leaf-spring 972 which is secured by screws 973 to the tool block and which engages the upper end of the clapper block. There is a limited pivotal movement of the clapper block permitted, however, by the pin 974 which is mounted in the tool block and which passes through an enlarged opening 975 in the clapper block.

The tool block 969 is adjustably secured to the upwardly projecting portion 977 of a slide 978. The connection is through a stud 979 whose head 980 engages in a recess 981 in the tool block and whose stem portion passes through aligned openings in the tool block and the upturned portion 977 of the slide 978. The stud 979 is secured in position by a nut 982. The stud 979 forms a pivot about which the tool block 969 is angularly adjustable and the tool block is secured in any position of its angular adjustment by the T-bolt 984 which passes through an arcuate slot 985 in the upturned portion 977 of the slide 978 and whose head engages in the recess 981 of the tool block.

The slide 978 is formed to engage and slide on a dove-tailed guide 987 formed on the upper face of the support or head 960.

The slide 978 is operated by fluid pressure to effect the cutting and the return strokes of the tool 952. The slide 978 is formed with a downwardly turned end 989 at its rear. The piston rod 990 threads into this end and is secured against movement relative thereto by the locknut 991. The piston 992 is secured against the shoulder 993 formed on the rod 990 by a nut 994 and a lock washer 995.

The piston 992 reciprocates in a sleeve 996 which is mounted in a cylinder 997 bored in the head or support 960.

Fluid under pressure is admitted to the cylinder 997 through the duct 998 and the ports 999 in the sleeve 996. The duct 998 may be connected direct to a line leading from the supply pump 361 or it may be connected, as is preferable, with the line 499 (Figures 29 and 30) which also conducts the pressure fluid to the work spindle clamps 320 and 321 (see also Figure 40).

The motive fluid exhausts from the cylinder 997 through ports 1000 and 1001 in the sleeve 996 (Figures 42, 44 and 46). From the ports 1000 it flows through the duct 1002 and the duct 1003 into the duct 1004. From the port 1001 it flows through the duct 1005 into the duct 1004. The duct 1004 may be connected directly to the sump or, as is preferable, to the line 516 (Figures 29, 30 and 40) which, also, exhausts from the work spindle clamps 320 and 321.

When the chamfering mechanism is used, the lines 492 and 483 (Fig. 18) leading from the ends of the reverse valve chamber 402 are connected to the ends of the cylinder 997 which contains the piston 992 that actuates the chamfering mechanism. These lines 492 and 483 are not connected to the ends of the index cylinder 312, as is the case, when the chamfering mechanism is not employed.

When the chamfering mechanism is used, the line 492 is connected with the chamber 997 (Fig. 42) through the duct 1006 and the ports 1007 in the sleeve 996. The line 483 is connected with the cylinder 997 through the duct 1008 and the ports 1009 in the sleeve 996.

When the chamfering attachment is employed, the ends of the index cylinder 312 are connected with the cylinder 997. That is, the lines 494 and 496 (Figures 27, 29 and 30), instead of being connected to the lines 492 and 483, respectively, leading from the reverse valve 346, are connected to the cylinder 997 which houses the piston 992 that actuates the chamfering mechanism. The line 494 is connected to the duct 1010 which leads into the duct 1011 that communicates with the cylinder 997 through the ports 1012 in the sleeve 996. The line 486 to the other end of the index cylinder is connected to the duct 1013 which communicates with the cylinder 997 through the ports 1014 in the sleeve 996.

There is a valve 1015 mounted in the sleeve 996 to slide therein. 1017 designates the collar which is secured against the shoulder 1016 formed on the piston rod 990 by a nut 1018 and the lock washer 1019. A coil spring 1020 is interposed between the collar 1017 and one end of the valve 1015. The valve 1015 surrounds the piston rod 990 and is located between the collar 1017 and the piston 992.

The valve 1015 is formed with cylindrical guide surfaces or collars 1022 and 1023, 1024, 1025. There is also a cylindrical collar 1027 turned on the periphery of the valve 1015 at a point midway its length. Both sides of this collar 1027 are beveled.

The valve 1015 operates in conjunction with a load and fire mechanism which operates to throw the valve quickly in one direction or the other at the end of the movement of the piston 992 in one direction or the other to quickly reverse the piston. This load and fire mechanism comprises the balls 1028 which are disposed at opposite sides of the cylinder 997. These balls are adapted to engage the collar 1027 of the valve 1015. The balls are spring-pressed into engagement with the collar 1027 by coil springs 1029 which are housed in sleeves 1030 that are secured in the head 960 and extend through diametrically opposed openings in the sleeve 996.

Figures 46 and 49 show the position of the chamfering-control valve 1015 when the work head is at loading position. As soon as the work spindle has moved into operative position, the solenoid 565 is energized and the lock-plunger 550 is withdrawn from engagement with the reverse valve 346. This allows the reverse valve 346 to move to the left until it is stopped by the lock-plunger 595 as already described. The pressure fluid then flows from the chamber of the reverse valve through the line 483, the duct 1008 and the ports 1009 into the chamber 997 of the chamfering control valve. This forces the collar 1017 to the right compressing the spring 1020. When the collar 1017 contacts the valve 1015, the valve 1015 is moved to the right. This causes the balls 1028 to ride up on the forward beveled surface of the collar 1027. When the balls have ridden up on the periphery of the collar 1027, the spring 1020 which has been compressed, expands and shoots the valve 1015 sharply to the right, quickly forcing the piston 992 to the right, moving the slide 978 rearwardly and withdrawing the chamfering tool from cutting position.

In the new position of the valve 1015 shown in Figure 42, the pressure fluid flows from the duct 998 through the ports 999 and 1014 into the duct 113 whence it flows through the line 486 to the left end of the index piston 310 (Figs. 26 and 27) moving the index piston to the left and effecting an indexing operation. Just as is the case with the machine on which no chamfering mechanism is employed, the index piston then opens up, in its movement, the line to the work spindle clamp, allowing the work spindle to be clamped and the pressure fluid flows at the same time, also, to the reverse trip valve 348, withdrawing the lock plunger 595 and allowing the reverse valve to move full over to the left. This causes the cutter to move into depth.

It will be seen, therefore, that the chamfering tool is moved out of cutting position, that then the work spindle is indexed and then clamped and that then the cutting tool moves into depth to cut a tooth space in the blank.

The feed movement of the cutter continues until the control valve is reversed and in turn reverses the reverse valve, as already described. This causes the cutter to be withdrawn from the work. At the same time, the line 492 leading from the rear end of the reverse valve is put on supply through the ports 426. When the chamfering mechanism is employed, the motive fluid then flows through the duct 1006 and the ports 1007 into the chamber 997 of the chamfering control valve. This forces the piston 992 to the left from the position shown in Figure 42. This causes the slide 978 to be moved inwardly toward the gear blank and causes the chamfering tool 972 to effect the cutting stroke in which it chamfers the rear corner of one tooth of the gear blank G.

As the piston 992 is moving to the left, fluid exhausts from the left end of the cylinder 997 through the ports 1009, the ducts 1008 to the line 483 which leads back to the reverse valve 346.

In its movement to the left the piston 992 picks up the chamfering control valve 1015, moving it to the left. The balls 1028 ride up over the rear face of the collar 1027 and assist in moving this valve 1015 sharply to the left although this simply compresses the spring 1020 slightly.

When the valve 1015 has reached the position shown in Figure 46, the line 494 leading to the right end of the index piston 310 is put on supply from the duct 998 through the ports 999 and 1012. This moves the index piston 310 back to the left to the position shown in Figures 26 and 27, resetting the index mechanism and then opening the line to the work spindle clamps to exhaust, to release the work spindle. This also puts the trip valve 448 on exhaust, releasing the lock-plunger 595 to re-lock the reverse valve 346.

It will be noted that the chamfering takes place while the cutter is being withdrawn from engagement with the work. It will be noted, also, that the chamfering takes place before the work spindle clamps are released.

At the end of the withdrawal stroke of the cutter-carrying sleeve 90, the control valve is reversed, reversing the application of the pressure fluid to the reverse valve 346. As before, the pressure fluid now flows through the lines 483 and 1008 and the port 1009 into the rear end of the cylinder 997 and the chamfering tool 962 is withdrawn from operative position. Then the valve 1015 is shifted, allowing the pressure fluid to flow to the index cylinder 312 to index the blank and reclamp the work spindle. Then, as before, the reverse valve 346 is released by withdrawal of the plunger 595 and the cutter is fed into the gear blank.

From the preceding description, it will be noted that the chamfering does not start until the withdrawal of the cutter from the work has started and that the work spindle is not released until the chamfering operation on a tooth has been completed, and that the cutter is not fed into the gear blank again until after the chamfering tool has been withdrawn, the blank indexed and the work spindle locked up.

To cushion the movement of the collar 1017 and the piston 992, respectively, at the limits of their movement in opposite directions, respectively, the sleeve 996, is constructed so that when the piston rod 990 is moving to the right, oil will be entrapped between the piston and the end plate 1035 of the cylinder and that when the piston rod 990 is moving to the left, oil will be entrapped between the collar 1017 and the end plate 1036 of the cylinder. To this end, ports 1037 and 1038 are all provided in the sleeve 996. The ports 1037 lead to a duct 1039. A check-valve 1040 closes this duct 1039 off from the duct 1006, the valve member 1040 being resiliently held in position by the coil spring 1041.

The ports 1038 lead to a duct 1043. This duct 1043 is normally closed off from the duct 1008 by a trip valve 1044 which is resiliently held in position by the coil spring 1045.

When the piston rod 990 is moving to the right, the piston 992 will close off the ports 1007, shutting off exhaust from the cylinder 997 through the duct 1006. The fluid remaining in the right end of the cylinder will then be entrapped, for the ball valve 1040 will be closed both by the pressure of the spring 1041 and by the pressure of the fluid in the cylinder. This will act as a dash-pot and cushion the movement of the piston 992. When the piston 990 is moving to the left, the collar 1017 will close the ports 1009 and oil will become entrapped between the collar and the end plate 1036, the ball valve being seated both by the pressure of the spring 1005 and by the pressure of the spring 1045 and by the pressure of the fluid entrapped in the left end of the cylinder. The ball valves 1040 and 1044 are, of course, opened when the lines 1006 and 1008, respectively, are on supply.

The chamfering tool 962 may be adjusted to chamfer a tooth immediately after it has been cut. In this case, the chamfering tool would be set below the face mill cutter if the gear blank G in its indexing rotation were to be moved in the direction of the arrow 1050 (Fig. 42). Preferably, however, we set the chamfering tool 962 above the cutter for this same direction of indexing rotation. In this case, a tooth will not be chamfered until two tooth spaces of the gear blank G have been cut and it will be necessary to recut the first tooth space of the gear blank in order to complete the chamfering operation on all the teeth of the blank.

The chamfering cut simply removes the rear corners of the concave sides of the gear teeth. These are chamfered to remove the burr left by the cutting tool and also to remove a weak point or corner from the tooth which might, otherwise, be liable to break off in use and damage the gears. Thus, the corners 1051 of the teeth 1053 of the gear blank G will be cut away by the chamfering tool (Figure 42). In Figure 42, two teeth are shown chamfered, the chamfering tool is operating upon a third tooth while a fourth tooth space has been cut.

Where the chamfering tool 962 is set ahead of the face mill cutter, on the first cutting stroke of the chamfering tool, the chamfering tool is not opposite a tooth space of the blank for only one tooth space will have been cut and that will not yet have been indexed into alignment with the chamfering tool. To prevent injury to the chamfering tool on its first stroke, a spring-finger 1055 is secured to the tool 962, being held in a groove 1056 in the tool by screws 1057.

The finger 1055 extends out in front of the tool 962. On the first stroke of the chamfering tool, then, the finger 1055 will strike the gear blank G ahead of the chamfering tool and in the stroke of the tool slide 976, the clapper block 965 will, therefore, be rocker about its pivot pin 970, lifting the chamfering tool 962 safely out of the way. When the first and succeeding tooth spaces of the blank are indexed into alignment with the chamfering tool, however, the tool will take its chamfering cut. The stroke of the chamfering tool is a diagonal stroke and to secure the best results, the tool block can be adjusted to the desired angle on the slide 978. To secure the desired cutting stroke, moreover, the ways 979 are inclined downwardly, as clearly shown in Figure 42 from front to back of the support 960. The cylinder 997 is parallel to these ways.

The end caps 1035 and 1036 may be secured in any suitable manner to the support 960, as by means of screws 1058. A suitable stuffing-box 1059 is provided in the end cap 1036 to prevent leakage of the motive fluid along the piston rod 990 where the rod passes through the end cap.

While the invention has been described in connection with a machine for cutting spiral bevel gears in a non-generating or forming operation, it will be understood that many of the features of the invention are applicable to machines for cutting gears of other types, also, and to generating machines as well as to non-generating machines. Moreover, the feature of an interlock between an indexing mechanism and a feed motion has broad applications and is not limited to use on gear cutting machines. It may be applied, for instance, to machines for sharpening multiple-bladed cutters where the cutter requires to be indexed in order to sharpen all of its blades.

In general, it is to be noted that while a particular embodiment of the invention has been described, it will be understood that the invention is capable of various modifications and uses and that this application is intended to cover any variations, uses, or adaptations of the invention, following, in general, the principles of the invention and including such departures from the present disclosure as come within known or customary practise in the machine tool art and as may be applied to the essential features hereinbefore set forth and as fall within the scope of the invention or the limits of the appended claims.

Having thus described our invention, what we claim is:

1. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said last named means comprising a piston and a cylinder, one of which is secured to the sleeve, and means for applying fluid pressure alternately to opposite ends of the piston, a rocking lever pivotally connected to said sleeve, a movable valve controlling the direction of application of fluid pressure to opposite sides of said piston and means operatively connecting said rocking lever to said valve to reverse said valve at opposite ends of the movement of said sleeve.

2. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said last named means comprising a piston and a cylinder, one of which is secured to the sleeve, and means for applying fluid pressure alternately to opposite ends of the piston, and means operated by the sleeve for controlling the speed of its movement.

3. In a gear cutting machine, a work support, a work spindle journaled in the work support, a tool support, a sleeve reciprocable in the tool support, a cutter spindle journaled in said sleeve, means for reciprocating said sleeve in a direction axial of the cutter spindle to alternately feed the cutter into and withdraw it from engagement with the blank, said last-named means comprising a piston and a cylinder, one of which is secured to the sleeve and means for applying fluid pressure alternately to opposite ends of the piston, a rocking lever pivotally connected to said sleeve, a movable valve controlling the speed of movement of said piston during feed of the cutter into the work, and means operatively connecting said rocking lever to said valve.

4. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said last named means comprising a piston and a cylinder, one of which is secured to the sleeve and means for applying fluid pressure alternately to opposite ends of the piston, means operated by the sleeve for periodically reversing the direction of its movement, and separate means operated by the sleeve for controlling the speed of its movement.

5. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to feed the cutter alternately into and withdraw it from engagement with the blank, said last-named means comprising a piston and a cylinder, one of which is secured to the sleeve, and means for applying fluid pressure alternately to opposite ends of the piston, a rocking lever pivotally connected to said sleeve, a movable valve controlling the direction of application of fluid pressure to opposite sides of said piston, a separate valve controlling the speed of movement of said piston during feed of the cutter into the work, means operatively connecting said rocking lever to said first-named valve and separate means operatively connecting said lever to the second named valve.

6. In a gear cutting machine, a work support, a tool support, a sleeve reciprocable in the tool support, a cutter spindle journaled in the sleeve, means for rotating the cutter spindle, and means for reciprocating said sleeve in a direction axial of the cutter spindle to alternately feed the cutter into and withdraw it from engagement with the work, said means comprising a cylinder and a piston reciprocable therein, one of which is relatively fixed and the other of which is secured to the sleeve, a valve controlling the direction of application of fluid pressure to the ends of said piston, and means operated by the sleeve in its movement for operating said valve to cause periodic reversal of the sleeve movement.

7. In a machine of the class described, a tool support, a work support, means for imparting to one of said supports an alternate movement of feed toward and withdrawal away from the other support comprising a cylinder and a piston reciprocable therein, mechanism for indexing the work support during the periods of relative withdrawal, said last named mechanism comprising a second cylinder and a piston reciprocable therein, one of said two last-named parts being connected to the work support, a reverse valve controlling the operation of the first piston, means operable by movement of the movable support for operating said reverse valve, connections between said reverse valve and the second piston whereby said reverse valve controls the operation of the second piston, means operable to lock the reverse valve at one limit of its movement to cause the movable support to remain in withdrawn position during indexing, and hydraulically operable means controlled by the movement of the second piston for releasing said locking means when the indexing operation has been completed.

8. In a machine of the class described, a tool support and a work support, one of which is movable away from the other for removal of a completed work-piece and chucking of a new blank, withdrawal mechanism for effecting said movement, means for actuating the tool mechanism and means for stopping the last named means after a predetermined number of operations of the machine and for simultaneously rendering said withdrawal means operative to move the movable support to loading position.

9. In a gear cutting machine operating on a work-cycle which includes an alternate relative movement of feed and withdrawal between the tool and the work and indexing of the work during withdrawal, a tool support and a work support, one of which is movable for the purposes of said alternate movements of feed and withdrawal, and one of which is also movable toward and from operative position, means for effecting said feed and withdrawal movements, means for indexing the work support, tool mechanism mounted on the tool support, means for actuating the tool mechanism, means operable on actuation of the tool mechanism to bring said supports into operative relation, and means operable, when said supports are in operative relation, to start the cycle of operation of the machine.

10. In a gear cutting machine, a work support and a tool support, one of which is movable between loading and operative positions, means for effecting said movement comprising a cylinder and a piston reciprocable therein, a valve for controlling the movement of said piston, a solenoid for moving said valve in a direction to cause the pressure fluid to move said support to operative position, means for moving the valve in the opposite direction, tool mechanism mounted on the tool support, an electrical motor for actuating the tool mechanism and means connecting the motor electrically with said solenoid whereby, when said motor is started, said solenoid is energized.

11. In a gear cutting machine, a work support and a tool support, one of which is movable between loading and operative positions, means for effecting said movement comprising a cylinder and a piston reciprocable therein, a valve for controlling the movement of said piston, a solenoid for moving said valve in a direction to cause the pressure fluid to move said support into operative position, means for moving the valve in the opposite direction, tool mechanism mounted on the tool support, an electrical motor for actuating the tool mechanism, means connecting the motor electrically with said solenoid whereby, when said motor is started, said solenoid is energized and when said motor is stopped, said solenoid is de-energized.

12. In a gear cutting machine, a tool support and a work support, one of which is movable toward and from the other to effect a relative depthwise feed or withdrawal between the tool and the blank, means for producing said movement, means for imparting a cutting motion to the tool mechanism, and means preventing starting of said last-named means while the tool mechanism is in engagement with the blank.

13. In a gear cutting machine, a tool mechanism and a work support, fluid pressure operated means for producing an alternate relative movement of feed and partial withdrawal between said supports, means for indexing the work support during the periods of withdrawal, separate fluid pressure operated means for moving one of said supports an extended distance away from the other to loading position, and means operable after a predetermined variable number of alternate feed and withdrawal operations for actuating the last named means to effect withdrawal of said support to loading position.

14. In a gear cutting machine, a tool mechanism and a work support, means for actuating the tool mechanism to effect cutting of the blank, means for producing alternate relative movements of feed and withdrawal between the tool mechanism and the work support, and separate means operable during the periods when the tool mechanism and the work support are separated to first chamfer a previously cut tooth of the blank and then index the blank.

15. In a gear cutting machine, a tool mechanism and a work support, means for actuating the tool mechanism to effect cutting of the blank, means for separating the tool mechanism and the work support after each cutting operation, means for chamfering the teeth of the blank, means for indexing the blank, and fluid pressure operated means for controlling and interlocking the various operations of the machine so that chamfering does not occur until the cutter is clear of the work and indexing does not occur until both a cutting operation and a chamfering operation have been completed.

16. In a gear cutting machine, a tool mechanism and a work support, means for producing an alternate relative movement of feed and withdrawal between the tool mechanism and the work support, means for chamfering the teeth of the blank, fluid pressure operated means for actuating the chamfering mechanism, fluid pressure operated means for indexing the work support, and means whereby the means for actuating the chamfering mechanism controls the indexing operation.

17. In a machine for producing gears, a tool support, a work head, tool mechanism mounted on the tool support, a work spindle journaled in the work head, means for producing an alternate relative movement of feed and withdrawal between the tool mechanism and the work support such that tooth surfaces of the blank are cut on each feed movement, means for indexing the work spindle during the periods of withdrawal, and means separate from the first-named means for automatically moving the work spindle axially in the work head to move the work from operative position after a predetermined number of teeth have been cut in the blank.

18. In a machine for producing gears, a tool support, a work head, tool mechanism mounted on the tool support, a work spindle journaled in the work head, means for securing a gear blank to the work spindle, means for actuating the tool mechanism, means for producing an alternate relative movement of feed and withdrawal between the tool mechanism and the work support, such that tooth surfaces of the blank are cut on each feed movement, means for indexing the work spindle during the periods of withdrawal, means separate from the first-named means for automatically moving the work spindle axially in the work head to move the work from operative position after a predetermined number of teeth have been cut in the blank, and means operative on the last-named movement for releasing the work-securing means.

19. In a machine for producing gears, a tool support, a rotary face-mill gear cutter journaled in said tool support, a work head, a work spindle journaled in the work head, means for rotating the cutter, means for reciprocating the cutter spindle axially in the tool support to alternately feed the cutter into the blank for cutting tooth surfaces of the blank and withdraw the cutter from engagement with the blank, means for indexing the work spindle during the periods of withdrawal of the cutter, and means operative automatically after a predetermined number of teeth have been cut in the blank to move the work spindle axially in the work head to withdraw the work from operative position.

20. In a machine for producing gears, tool mechanism, a work head, a work spindle journaled in the work head, means for actuating the tool mechanism, means for producing an alternate relative movement of feed and withdrawal between the tool mechanism and the work support such that tooth surfaces of the blank are cut on the feed movement, means for indexing the work spindle during the periods of withdrawal, and means operative after a predetermined number of teeth have been cut in the blank to stop the tool mechanism and automatically move the work spindle axially in the work head to withdraw the work from operative position.

21. In a machine for producing gears, tool mechanism, a work head, a work spindle journaled in the work head, means for actuating the tool mechanism, means for producing an alternate relative movement of feed and withdrawal between the tool mechanism and the work head such that tooth surfaces of the blank are cut on the feed movement, means for indexing the work spindle during the periods of withdrawal, and means operative after a predetermined number of teeth have been cut in the blank to stop the tool mechanism and move the work from operative position.

22. In a machine for producing gears, tool mechanism, a work head, a work spindle journaled in the work head, indexing mechanism for the work spindle, means for clamping the work spindle against rotation after it has been indexed, fluid-pressure operated means including a piston reciprocable in a cylinder for operating the indexing mechanism, and connections between said cylinder and the clamping means whereby said piston acts as a valve controlling the operation of the clamping means.

23. In a machine for producing gears, a tool support, a sleeve reciprocable in the tool support, a cutter spindle journaled in the sleeve, means for rotating the cutter spindle, a cylinder and a piston reciprocable therein, one of which is secured to the sleeve and the other to the tool support, means for applying fluid pressure alternately to opposite sides of the piston to alternately feed the cutter into the work and to withdraw it from engagement therewith, means for indexing the work spindle during the periods of withdrawal, a separate piston and cylinder, one of which is secured to the work spindle and the other to the work head, and means for applying fluid pressure to opposite sides of the second piston to move the work spindle to and from operative position.

24. In a machine for producing gears, a tool support, a sleeve reciprocable in the tool support, a cutter spindle journaled in the sleeve, means for rotating the cutter spindle, a cylinder and a piston reciprocable therein, one of which is secured to the sleeve and the other to the tool support, means for applying fluid pressure alternately to opposite sides of the piston to alternately feed the cutter into the work and withdraw it from engagement therewith, means for indexing the work spindle during the periods of withdrawal, a second piston and cylinder, one of which is secured to the work spindle and the other to the work head, and means operative after a predetermined number of feed movements of the first piston to apply fluid pressure to one side of the second piston to withdraw the work spindle from operative position.

25. In a machine for producing gears, a work head, a work spindle rotatably and reciprocably mounted in the work head, a tool support, a sleeve reciprocable in the tool support, a cutter spindle journaled in the sleeve, means for rotating the cutter spindle, a cylinder and a piston reciprocable therein, one of which is secured to the sleeve and the other to the tool support, means for applying fluid pressure alternately to opposite sides of said piston to alternately feed the cutter into the work and withdraw it from engagement therewith, means for indexing the work spindle during the periods of withdrawal, a second piston and cylinder, one of which is secured to the work spindle and the other to the work head, means for applying fluid pressure to opposite sides of the second piston to move the work spindle to and from operative position, and means operative on movement of the work spindle to operative position for starting reciprocating movement of the first piston.

26. In a machine for producing gears, a work support, a work spindle rotatably and reciprocably mounted in the work support, a tool support, tool mechanism mounted on the tool support, means for automatically reciprocating one of said supports to effect alternate movements of feed and withdrawal between the tool mechanism and the work, means for indexing the work spindle during the periods of withdrawal, means for reciprocating the work spindle to move the work to and from operative position, and means for preventing operation of the automatic reciprocating mechanism when the work spindle is in inoperative position.

27. In a machine for producing gears, a work support, a work spindle rotatably and reciprocably mounted in the work support, a tool support, tool mechanism mounted on the tool support, means for automatically reciprocating one of said supports to effect alternate movements of feed and withdrawal between the tool mechanism and the work, means for indexing the work spindle during the periods of withdrawal, means for reciprocating the work spindle to move the work to and from operative position, a normally open electric switch forming part of the means for effecting movement of the reciprocable support, said switch being arranged so as to be open when the work spindle is in inoperative position, and means for closing said switch, when said spindle is moved to operative position, to permit automatic reciprocation of said movable support.

28. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said last-named means comprising a piston and cylinder, one of which is secured to the sleeve and the other to the tool support, a valve controlling the direction of application of fluid pressure to said piston, a lever pivoted on the tool support and connected to said piston to move therewith, and means connecting said lever with said valve whereby said valve is operated from the movement of said piston.

29. In a gear cutting machine, a work support, a work spindle journaled in the work support, a tool support, a sleeve reciprocable in the tool support, a cutter spindle journaled in the sleeve, means for rotating the cutter spindle, means for reciprocating said sleeve in a direction axial of the cutter spindle to alternately feed the cutter into and withdraw it from engagement with the blank, said last-named means comprising a piston and a cylinder, one of which is secured to the sleeve and the other to the tool support, means for applying fluid pressure alternately to opposite ends of the piston, a movable valve operable to control the rate of movement of the piston in the direction of feed, a lever pivoted on the tool support and connected to the piston to move therewith, and means connecting said lever to said valve to control the movement of said valve whereby to vary said rate throughout the feed movement.

30. In a machine for cutting gears, a work support, a tool support, tool mechanism mounted on the tool support, means for moving each support into operative position, electrically controlled means for actuating the tool mechanism, a normally open switch in the starting circuit of said actuating means and operative, when open, to prevent starting of the actuating mechanism, and means operable by one of said supports when in inoperative position for closing said switch.

31. In a machine for producing gears, a tool support, a work head, tool mechanism mounted on the tool support, a work spindle journaled in the work head, means for actuating the tool mechanism, means for reciprocating the work spindle in the work head to move the work to and from operative position, and means electrically connecting the tool actuating mechanism and said last-named means whereby when the tool actuating mechanism is started, the work spindle is moved to operative position.

32. In a machine for producing gears, a tool support, a work head, tool mechanism mounted on the tool support, a work spindle journaled in the work head, means for actuating the tool mechanism, means for reciprocating the work spindle in the work head to move the work to and from operative position, and means electrically connecting the tool actuating mechanism and said last-named means whereby when the tool actuating mechanism is stopped, the work spindle is moved to inoperative position.

33. In a machine for producing gears, a tool support, a work head, tool mechanism mounted on the tool support, a work spindle journaled in the work head, means for actuating the tool mechanism, means for reciprocating the work spindle in the work head to move the work to and from operative position, and means electrically connecting the tool actuating mechanism and said last-named means whereby when the tool actuating mechanism is started, the work spindle is moved to operative position and when the tool actuating mechanism is stopped, the work spindle is moved to inoperative position.

34. In a machine for cutting gears, a work support, a tool support, a sleeve reciprocable in the tool support, a cutter spindle journaled in the sleeve, a cylinder and piston, one of which is secured to the sleeve and the other to the tool support, means for applying fluid pressure alternately to opposite sides of said piston to feed the cutter alternately into the work and withdraw it from engagement therewith, means for indexing the work spindle during the periods of withdrawal, and means operated by the piston at the end of each withdrawal movement of the cutter for rendering said index mechanism operative.

35. In a machine for cutting gears, a work support, a tool support, a sleeve reciprocable in the tool support, a cutter spindle journaled in the sleeve, a cylinder and piston, one of which is secured to the sleeve and the other to the tool support, means for applying fluid pressure alternately to opposite ends of the piston to feed the cutter alternately into the work and withdraw it from engagement therewith, fluid pressure operated means for indexing the work spindle during the period of withdrawal, a valve controlling the operation of said fluid pressure operated means, and means operable by said piston for shifting said valve to cause operation of said index mechanism each time the cutter is fully withdrawn from the work.

36. In a machine for producing gears, a work support, a tool support, means for automatically reciprocating one of said supports through a limited distance to effect alternate relative movements of feed and withdrawal between the tool mechanism and the work, separate means for moving one of said supports through an extended distance between operating and loading positions, electrically operated means for controlling the first movement, electrically operated means controlling the second named movement, tool mechanism mounted on the tool support, electrically operated means for actuating the tool mechanism, a normally open switch in the circuit to the first electrically operated means, connections between the means for actuating the tool mechanism and the means controlling the second named movement whereby when the tool actuating means is actuated, a circuit to said second electrically operated means is closed to cause the movable support to move to operating position, and means operated by said support when it has reached operating position for closing said normally open switch thereby to actuate the means producing the alternate relative movements of feed and withdrawal.

37. In a machine for producing gears, a work support, a tool support, means for automatically reciprocating one of said supports through a limited distance to effect alternate relative movements of feed and withdrawal between the tool and work supports, separate means for moving one of said supports through an extended distance from operating to loading position and vice versa, electrically operated means for controlling the first named movement, electrically operated means controlling the second named movement, tool mechanism mounted on the tool support, electrically operated means for actuating the tool mechanism, a normally open switch in the circuit to the first electrically operated means, connections between the means for actuating the tool mechanism and the means controlling the second named movement whereby when the tool actuating means is actuated, a circuit to said second electrically operated means is closed to cause the movable support to be moved to operative position, and means operated by said support when it has reached operating position for closing said switch thereby to actuate the means producing the alternate relative movements of feed and withdrawal, automatic stop mechanism operative after a predetermined number of movements of feed and withdrawal to break the circuits to said first two named electrically operated means, and means for automatically moving the specified support to loading position when said circuits are broken.

38. In a machine for producing gears, tool mechanism, a work head, a work spindle journaled in the work head, indexing mechanism for the work spindle, a cylinder, a clamping member reciprocable in said cylinder for movement to and from operative position and adapted, when in operating position, to engage the periphery of said work spindle to hold the spindle against rotation during cutting, means normally urging the clamping member to one of its positions, means for rotating the work spindle, when released, comprising a cylinder and a piston movable therein, means for supplying fluid-pressure alternately to opposite ends of said piston, and connections between said two cylinders whereby said piston may act as a valve governing the supply and exhaust of the motive fluid from the first cylinder.

39. In a machine for producing gears, a tool support, a work support, a work spindle journaled in the work support, means for imparting an alternate relative movement of feed and withdrawal between said supports comprising a cylinder and a piston reciprocable therein, a second cylinder, a clamping member reciprocable in the second cylinder for movement to and from operating position and adapted, when in operating position, to engage the periphery of said work spindle to hold the spindle against rotation during cutting, means normally urging the clamping member to one of its limit positions, means for rotating the work spindle, when released, to index said spindle comprising a third cylinder and a piston reciprocable therein, a reverse valve controlling the operation of the first piston, means operable by movement of the first piston for operating said valve, connections between said reverse valve and the last-named piston whereby said reverse valve controls the operation of the last-named piston, means operable to lock the reverse valve at one limit of its movement to cause the movable support to remain in its withdrawn position during indexing, hydraulically operable means for releasing said locking means, and connections between the second and third cylinders whereby the last-named piston acts as a valve governing the operation of the lock-release and of the work spindle clamping member.

ROBERT S. CONDON.
ALBERT P. SCHAUSEIL.